United States Patent
Meng et al.

(10) Patent No.: US 11,078,420 B2
(45) Date of Patent: Aug. 3, 2021

(54) LIQUID CRYSTAL COMPOSITION AND LIQUID CRYSTAL DISPLAY ELEMENT

(71) Applicant: Shijiazhuang Chengzhi Yonghua Display Material Co., Ltd, Shijiazhuang (CN)

(72) Inventors: Jinsong Meng, Shijiazhuang (CN); Ming Li, Shijiazhuang (CN); Kui Wang, Shijiazhuang (CN); Xing Zhang, Shijiazhuang (CN); Guoliang Yun, Shijiazhuang (CN); Zhian Liang, Shijiazhuang (CN); Yiping Wang, Shijiazhuang (CN); Gang Wen, Shijiazhuang (CN)

(73) Assignee: SHIJIAZHUANG CHENGZHI YONGHUA DISPLAY MATERIAL CO., LTD., Shijiazhuang (CN)

( * ) Notice: Subject to any disclaimer, the term of this patent is extended or adjusted under 35 U.S.C. 154(b) by 98 days.

(21) Appl. No.: 16/228,435

(22) Filed: Dec. 20, 2018

(65) Prior Publication Data
US 2019/0185751 A1    Jun. 20, 2019

(30) Foreign Application Priority Data

Dec. 20, 2017 (CN) .......................... 201711382287.9

(51) Int. Cl.
*G02F 1/1333* (2006.01)
*C09K 19/32* (2006.01)
*C09K 19/30* (2006.01)
*C09K 19/04* (2006.01)
*G02F 1/1362* (2006.01)
*C09K 19/12* (2006.01)
*C09K 19/54* (2006.01)

(52) U.S. Cl.
CPC .......... *C09K 19/32* (2013.01); *C09K 19/3003* (2013.01); *C09K 19/3028* (2013.01); *C09K 19/3066* (2013.01); *C09K 19/3098* (2013.01); C09K 2019/0448 (2013.01); C09K 2019/122 (2013.01); C09K 2019/123 (2013.01); C09K 2019/301 (2013.01); C09K 2019/3004 (2013.01); C09K 2019/3009 (2013.01); C09K 2019/3016 (2013.01); C09K 2019/3027 (2013.01); C09K 2019/3036 (2013.01); C09K 2019/548 (2013.01); *G02F 1/1362* (2013.01)

(58) Field of Classification Search
CPC .............. C09K 19/12; C09K 19/3003; C09K 19/3028; C09K 19/3066; C09K 19/3098; C09K 2019/0448; C09K 2019/122; C09K 2019/123; C09K 2019/3004; C09K 2019/3009; C09K 2019/301; C09K 2019/3016; C09K 2019/3027; C09K 2019/3036; C09K 2019/548; G02F 1/1333; G02F 1/1362
USPC ..................................................... 252/299.62
See application file for complete search history.

(56) References Cited

U.S. PATENT DOCUMENTS

| | | | |
|---|---|---|---|
| 2004/0222403 A1† | 11/2004 | Sasada | |
| 2008/0090026 A1† | 4/2008 | Bernatz | |
| 2019/0185750 A1* | 6/2019 | Meng | C09K 19/3028 |
| 2019/0185751 A1* | 6/2019 | Meng | C09K 19/3098 |
| 2019/0185752 A1* | 6/2019 | Wang | C09K 19/3402 |
| 2019/0316038 A1* | 10/2019 | Liang | C09K 19/3098 |

FOREIGN PATENT DOCUMENTS

CN         105219401 A  *  1/2016  ............. C09K 19/46

* cited by examiner
† cited by third party

*Primary Examiner* — Geraldina Visconti
(74) *Attorney, Agent, or Firm* — Muncy, Geissler, Olds and Lowe, P.C.

(57) ABSTRACT

Provided are a polymerizable compound represented by formula I and a liquid crystal composition comprising the polymerizable compound, particularly a PSVA liquid crystal composition for displays or TV applications and a PSA-IPS liquid crystal composition for an IPS mode; in particular, the polymerizable compound has a faster polymerization rate, and a "material system" formed from the selected polymerizable component and liquid crystal component has a lower rotary viscosity and better photoelectric properties, and has a high VHR after (UV) photoradiation, this avoiding the problem of the occurrence of residual images to final displays.

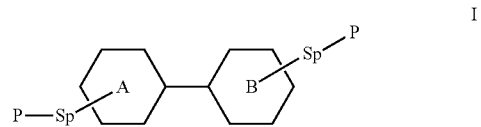

I

10 Claims, No Drawings

LIQUID CRYSTAL COMPOSITION AND LIQUID CRYSTAL DISPLAY ELEMENT

TECHNICAL FIELD

The present invention relates to the liquid crystal display field, and in particular relates to a liquid crystal composition formed by combining a specific polymerizable compound and a specific liquid crystal component and a liquid crystal display element or liquid crystal display comprising the liquid crystal composition.

BACKGROUND ART

Thin film transistor liquid crystal displays (TFT-LCDs) have undergone a long period of basic research, and after realising large-scale production and commercialisation, thin film transistor liquid crystal displays have become mainstream products in LCD applications due to the advantages of light weight, being environmentally friendly, high performance, etc., thereof: the application of TFT-LCD can be seen everywhere whether in small-sized mobile phone screens, large-sized notebook PCs or monitors or in large-sized liquid crystal televisions (LCD-TV).

Early commercial TFT-LCD products basically relate to using a TN display mode, and the largest problem thereof is a narrow viewing angle. With the increase in product size, especially the application in the TV field, an IPS display mode and a VA display mode, which have the characteristic of a wide viewing angle, have been sequentially developed and applied; in particular, based on the improvement of the VA display mode, the breakthrough development thereof has been achieved successively in major companies, which mainly depends on the advantages of a wide viewing angle, a high contrast, no need for frictional alignment, etc., of the VA mode itself; furthermore, the contrast of the VA mode display is less dependent on the optical anisotropy ($\Delta n$) of the liquid crystal, the thickness of the liquid crystal cell (d) and the wavelength ($\lambda$) of the incident light, which will necessarily make the VA mode become a very promising display technique.

However, the liquid crystal medium used in an active matrix addressing mode display element for the VA mode, etc., itself is not perfect; the defects, for example, the residual image level is significantly worse than that of a positive dielectric anisotropic display element, the response time is relatively slow, and the driving voltage is higher. At this point, some new types of VA display techniques have quietly emerged: for example, a PSVA technique realises a wide viewing angle display mode similar to that of MVA/PVA, and also simplifies a CF process, such that the aperture ratio is increased while lowering the CF cost; furthermore, a higher brightness is obtained, thereby obtaining a higher contrast. In addition, since the liquid crystal of the entire panel has a pretilt angle, there is no domino delay phenomenon, a faster response time can also be obtained while maintaining the same drive voltage, and the residual image level will also not be affected; however, due to Fine Slit densely distributed electrodes in pixels, if the electrode width cannot be evenly distributed, the problem of uneven display can easily occur. Like a UVVA technique, on the basis of keeping the advantages of the PSVA technique, since there is no Slit structure on the TFT side, the problem of display unevenness caused by uneven pixel electrode width is also improved. Although the display device is continuously developing, people are still always devoted to studying new liquid crystal compounds, such that liquid crystal media and the performances of display devices in which the liquid crystal media are used can continuously advance forward.

Polymerizable mesogenic units (RMs) are currently a very popular and important topic in the display industry, and possible application fields thereof include polymer stabilized alignment (PSA) liquid crystal display, polymer stabilized blue-phase (PS-BP) liquid crystal display, pattern retarder films, etc.

The PSA principle is being applied to different typical LC displays such as PSA-VA, PSA-OCB, PS-IPS/FFS and PS-TN liquid crystal displays. Taking the most widely used PSA-VA display as an example, the pretilt angle of the liquid crystal cell can be obtained by a PSA method, and the pretilt angle has a positive effect on the response time. For PSA-VA displays, standard MVA or PVA pixel and electrode designs can be used; however, if a specially patterned design is used the electrode design on one side and no protrusion design is used on the other end, the production can be significantly simplified while the display is imparted with a very good contrast and a very high light transmittance.

It has been found in the prior art that LC mixtures and RMs still have some disadvantages in applications in PSA displays. First, so far not every desired soluble RM is suitable for use in PSA displays; in addition, if it is desired to carry out a polymerization by means of a UV light without the addition of a photoinitiator (which may be advantageous for some applications), the choice becomes narrower; furthermore, a "material system" formed from an LC mixture (hereinafter also referred to as an "LC host mixture") in combination with the selected polymerizable component should have the lowest rotary viscosity and the best photoelectric performance for increasing the "voltage holding ratio" (VHR) to achieve effects. In terms of PSA-VA, a high VHR after irradiation using a (UV) light is very important; otherwise, the problems of the occurrence of residual images to the display, etc., may be finally caused. So far, not all combinations of LC mixtures and polymerizable components are suitable for PSA displays. This is mainly due to the effects in the aspects of the UV-sensitive wavelength of polymerizable units being too short, or no tilt angle or an insufficient tilt angle occurring after light irradiation, or the polymerizable component having a poorer homogeneity after light irradiation, or the VHR after UV is lower for TFT display applications.

SUMMARY OF THE INVENTION

The present invention provides a polymerizable compound, a liquid crystal composition formed by combining such a polymerizable compound with a specific liquid crystal component, particularly a PSVA liquid crystal composition for displays or TV applications and a PSA-IPS liquid crystal composition for an IPS mode, and a liquid crystal display element or liquid crystal display comprising this liquid crystal composition; in particular, the polymerizable compound has a faster polymerization rate, and a "material system" formed from the selected polymerizable component and liquid crystal component has a lower rotary viscosity and better photoelectric properties, and has a high VHR after (UV) photoradiation, this avoiding the problem of the occurrence of residual images to final displays.

In order to achieve the above-mentioned beneficial technical effects, the present invention provides a polymerizable liquid crystal compound represented by formula I:

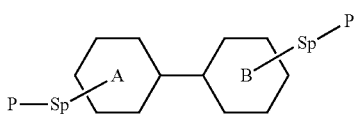

wherein

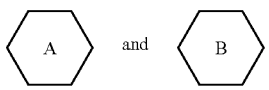

each independently represent

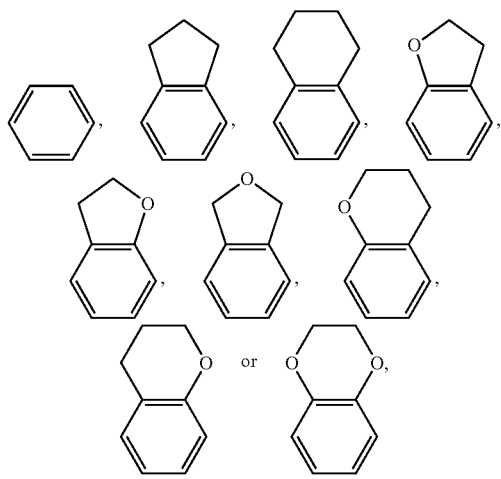

and said

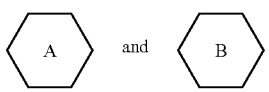

do not simultaneously represent

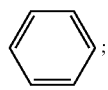

one or more H in the groups represented by

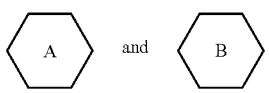

may be each be independently substituted with group S, with group S representing a C1-C5 alkyl group, a C1-C5 alkoxy group, a fluorine-substituted C1-C5 alkyl group, a fluorine-substituted C1-C5 alkoxy group, a halogen or P-Sp, wherein any one or more unconnected $CH_2$ may be independently replaced by —O—, —S—, —CO—, —$CH_2$O—, —O$CH_2$—, —COO—, —OOC—, an acrylate group or a methacrylate group;

each P independently represents

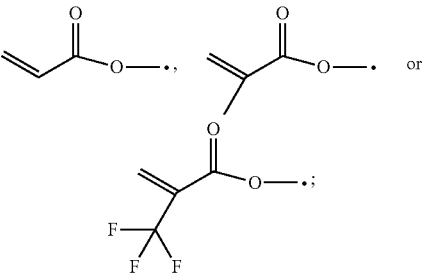

and each Sp independently represents a single bond, a C1-C5 alkyl group, a C1-C5 alkenyl group, wherein any one or more unconnected $CH_2$ may be replaced by —O—, —S—, —CO—, —$CH_2$O—, —O$CH_2$—, —COO—, —OOC— or an acrylate group.

The present invention further provides a liquid crystal composition comprising one or more compounds represented by formula I as a first component, one or more compounds represented by formula II as a second component, and one or more compounds represented by formula III as a third component:

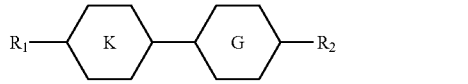

wherein $R_1$, $R_2$, $R_3$, and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more unconnected $CH_2$ in the groups represented by $R_3$ and $R_4$ may be substituted with cyclopentyl, cyclobutyl or cyclopropyl;

$Z_1$ and $Z_2$ each independently represent a single bond, —$CH_2CH_2$— or —$CH_2O$—;

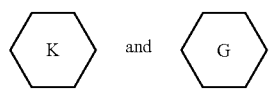

each independently represent
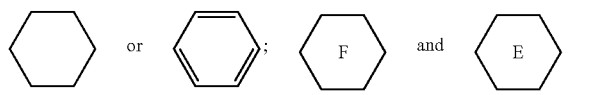
each independently represent one or more of
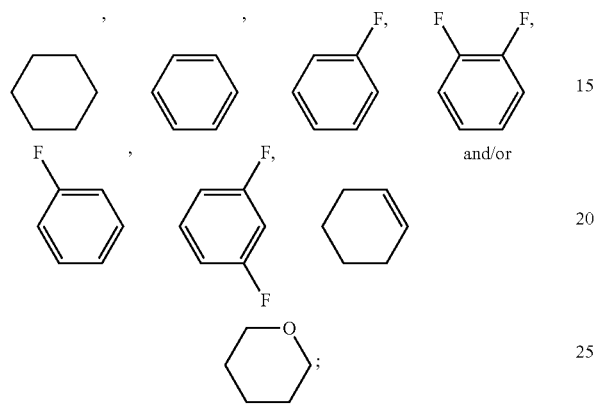
m represents 1 or 2; and
n represents 0, 1 or 2.
The compound represented by formula I is preferably a compound represented by formulas I-1 to I-23:
I-1
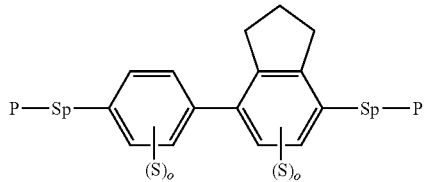
I-2
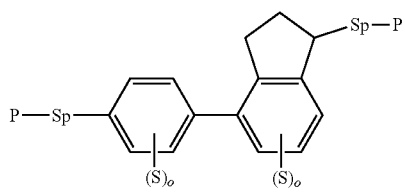
I-3
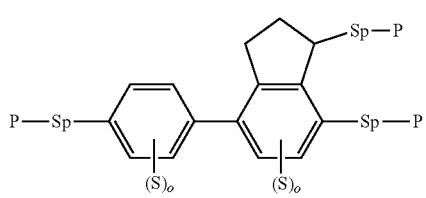
I-4
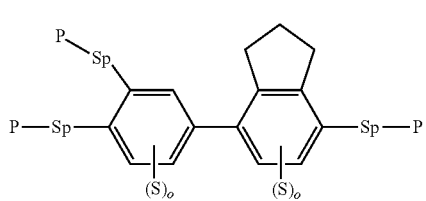
-continued
I-5
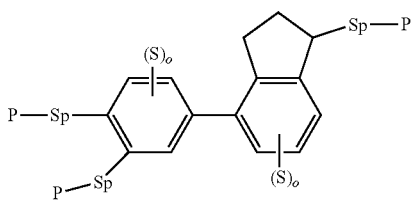
I-6
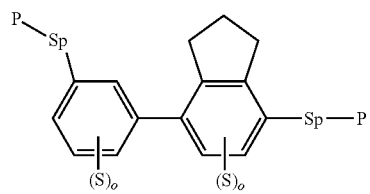
I-7
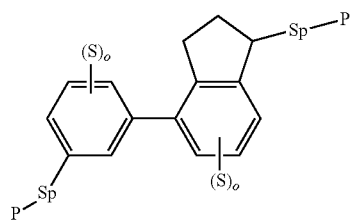
I-8
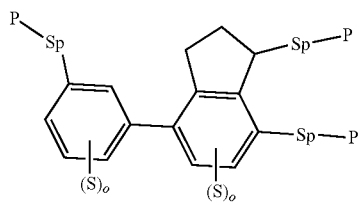
I-9
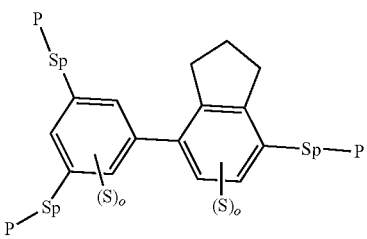
I-10
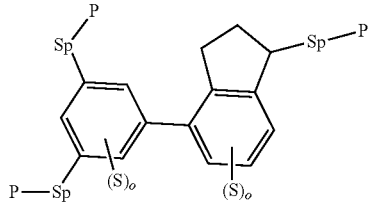
I-11
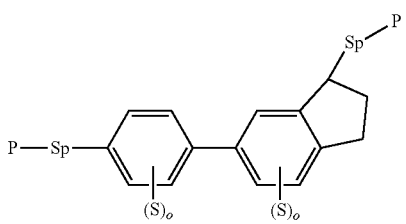

I-12 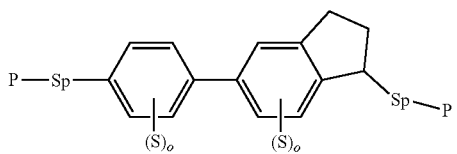

I-13 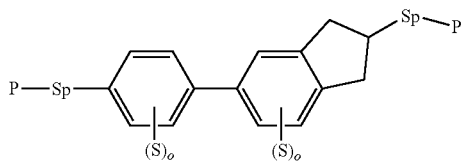

I-14 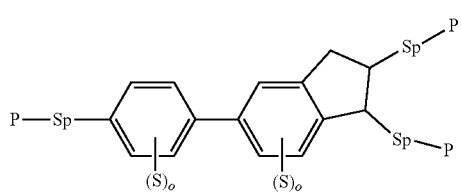

I-15 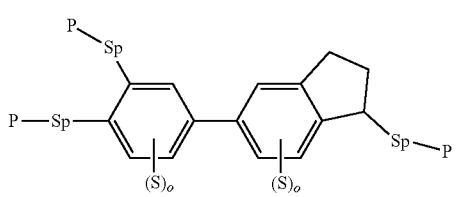

I-16 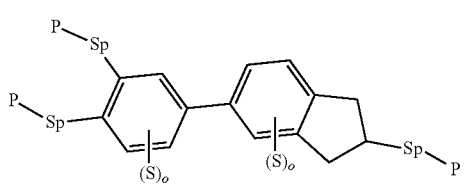

I-17 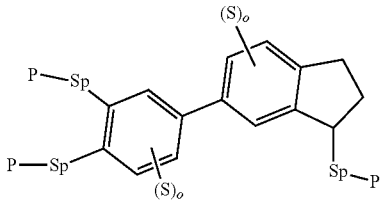

I-18 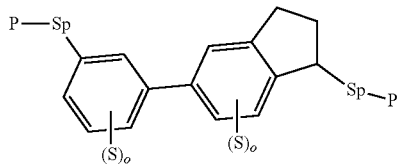

I-19 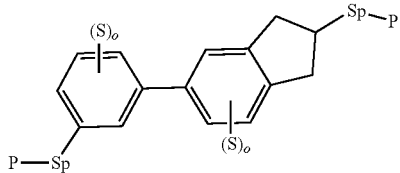

I-20 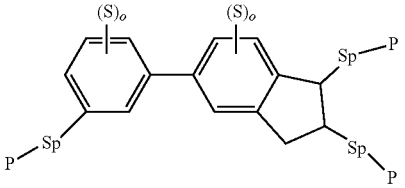

I-21 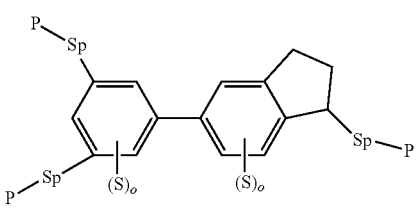

I-22 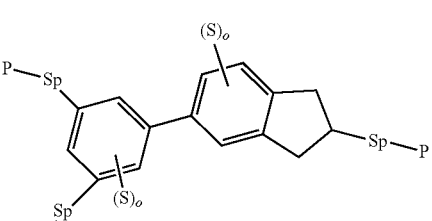

I-23 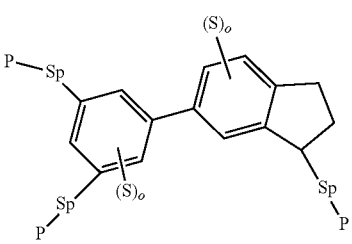

wherein each S independently represents H, a C1-C5 alkyl group, a C1-C5 alkoxy group, a fluorine-substituted C1-C5 alkyl group, a fluorine-substituted C1-C5 alkoxy group, F or Cl, wherein any one or more unconnected CH$_2$ may be independently replaced by —O—, —S—, —CO—, —CH$_2$O—, —OCH$_2$—, —COO—, —OOC— or an acrylate group or a methacrylate group;

each P independently represents

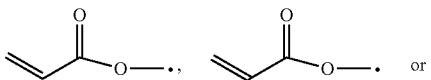 or

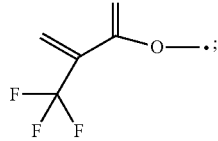

each Sp independently represents a single bond, a C1-C5 alkyl group, a C1-C5 alkenyl group, wherein any one or more unconnected CH$_2$ may be replaced by —O—, —S—, —CO—, —CH$_2$O—, —OCH$_2$—, —COO—, —OOC— or an acrylate group;

and each o independently represents 0, 1, 2 or 3.

Furthermore, it is characterized in that the compound represented by formula I is preferably a compound represented by formulas I-1-1 to I-23-4:
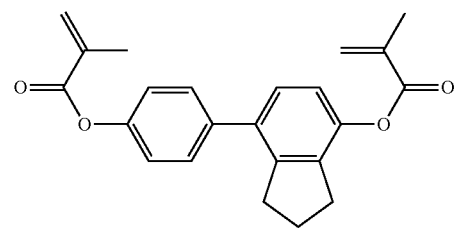
I-1-1
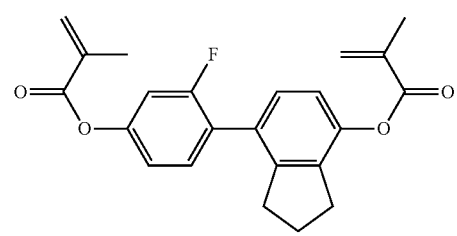
I-1-2
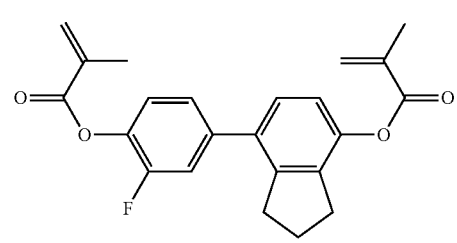
I-1-3
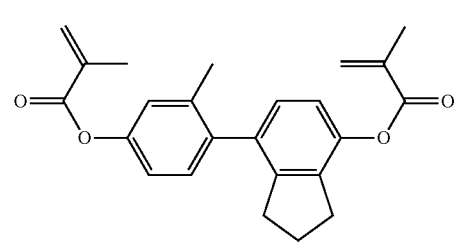
I-1-4
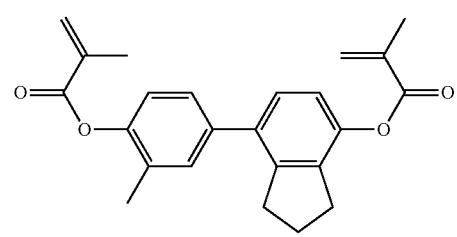
I-1-5
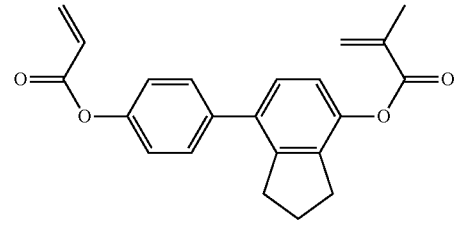
I-1-6
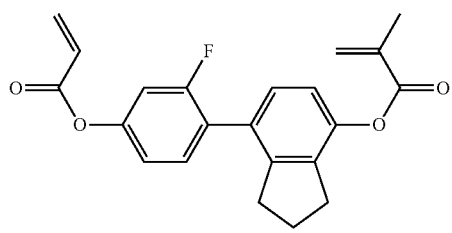
I-1-7
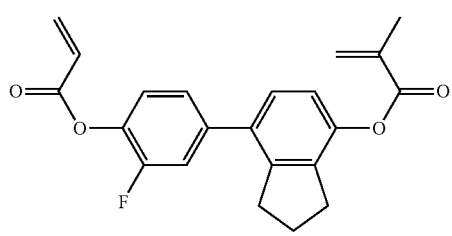
I-1-8
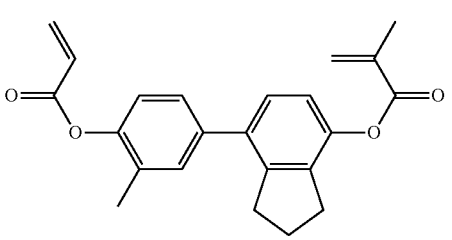
I-1-10
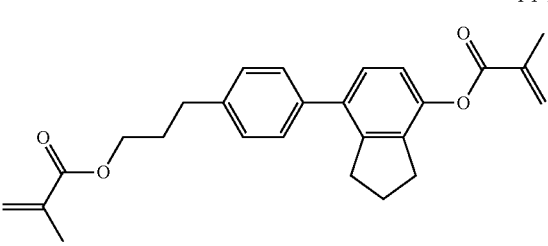
I-1-11
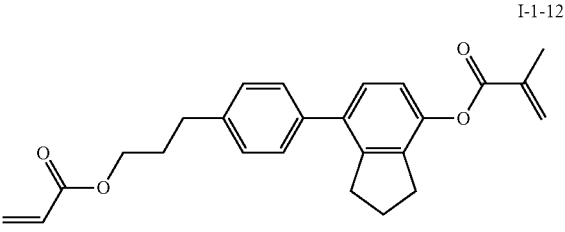
I-1-12
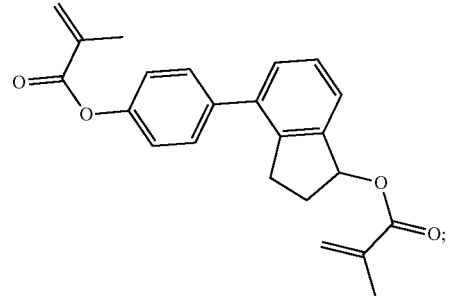
I-2-1

I-2-2
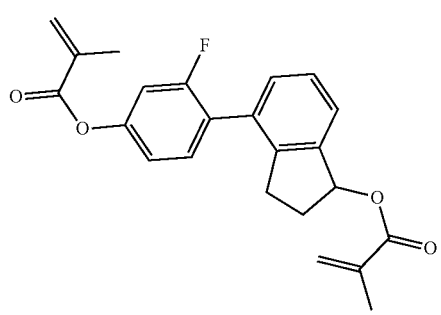
I-2-3
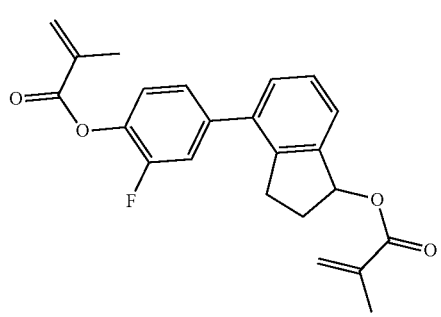
I-2-4
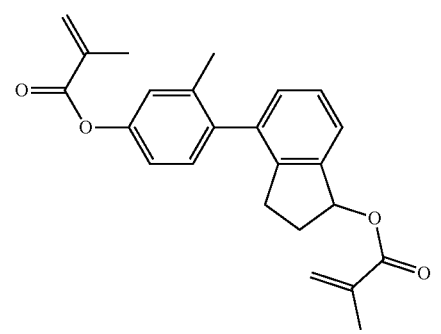
I-2-5
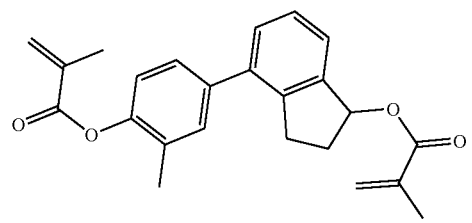
I-2-6
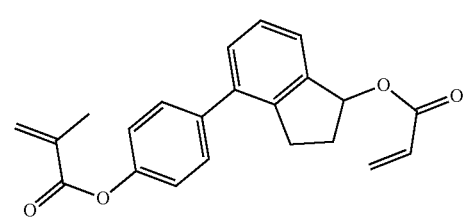
I-2-7
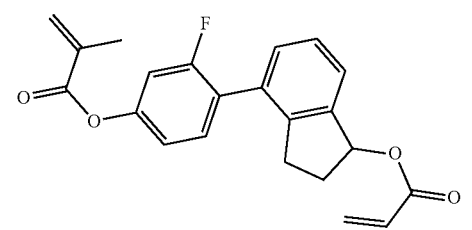
I-2-8
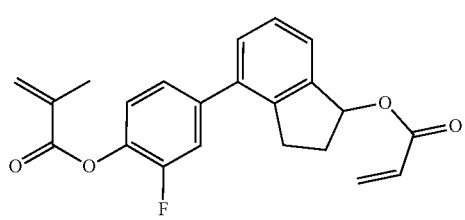
I-2-9
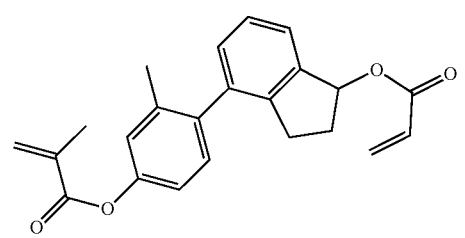
I-2-10
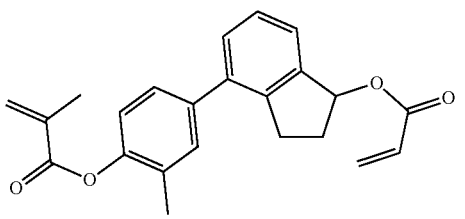
I-2-11
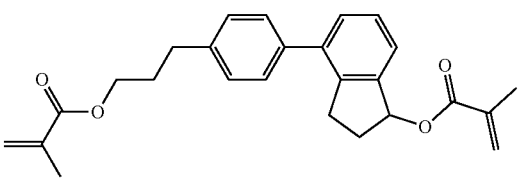
I-2-12
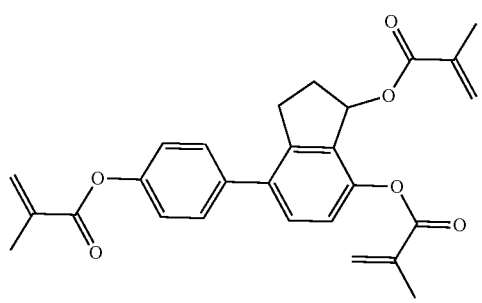
I-3-1
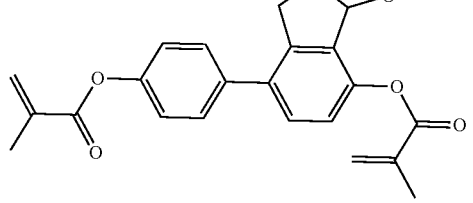

I-3-2
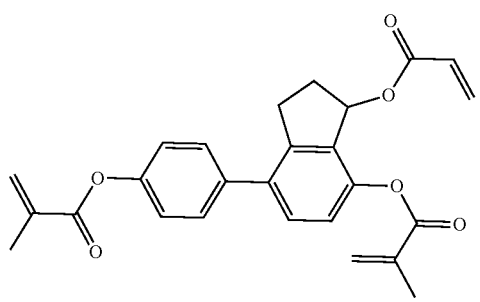
I-3-3
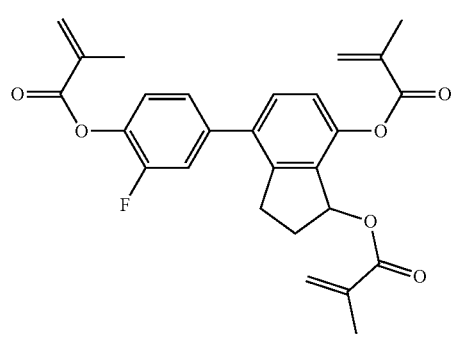
I-3-4
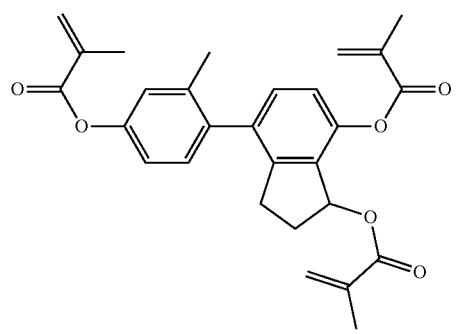
I-3-5
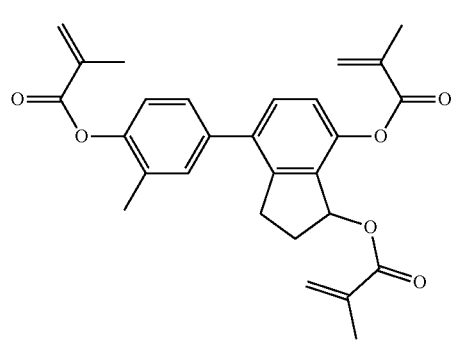
I-3-6
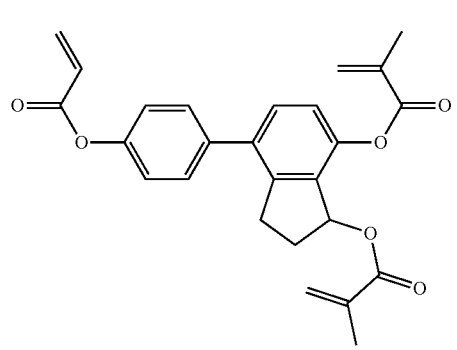
I-3-7
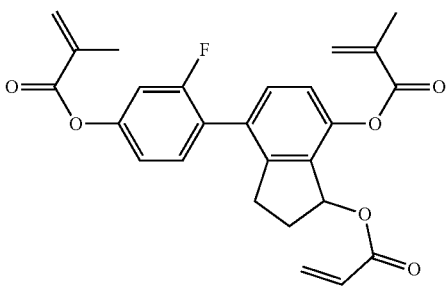
I-3-8
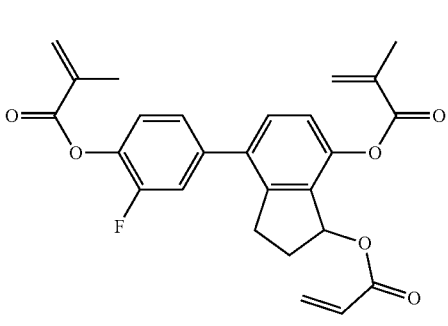
I-3-9
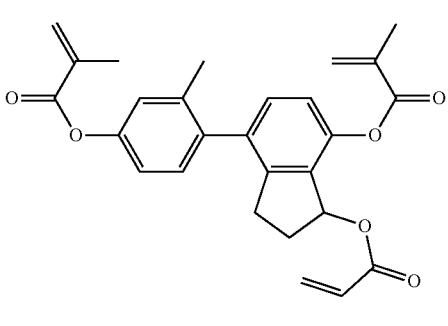
I-3-10
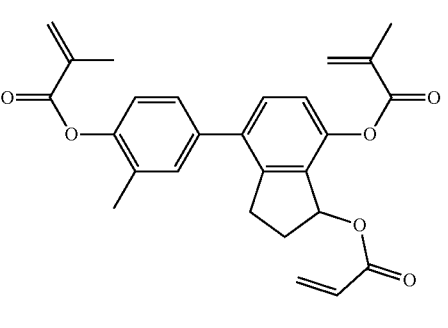
I-3-11
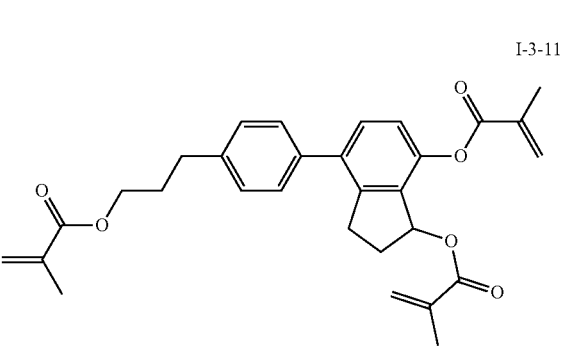

-continued
I-3-12
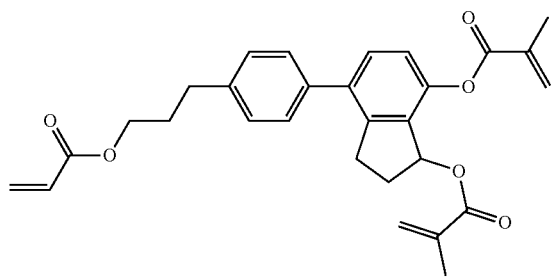
I-3-13
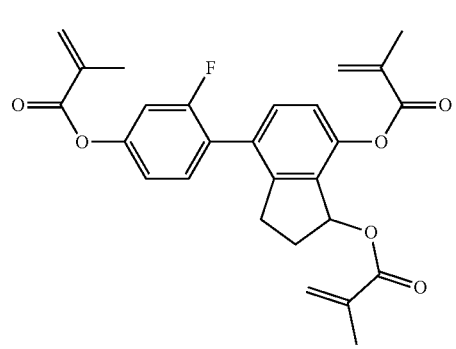
I-4-1
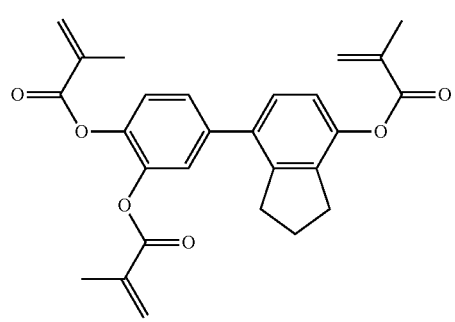
I-4-2
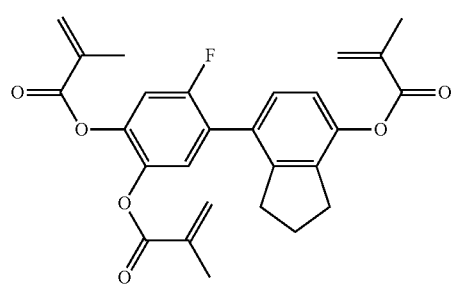
I-4-3
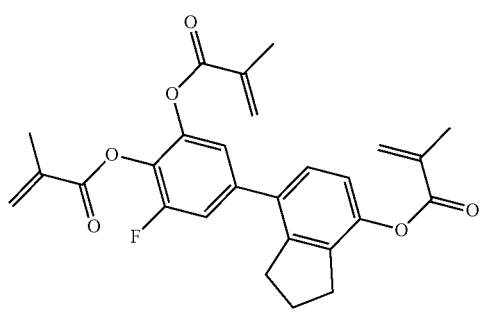
I-5-1
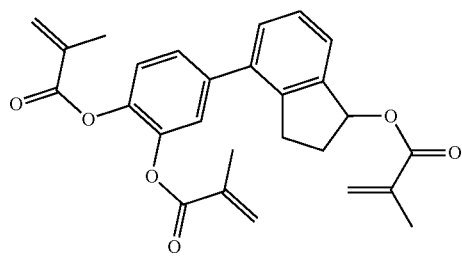
I-5-2
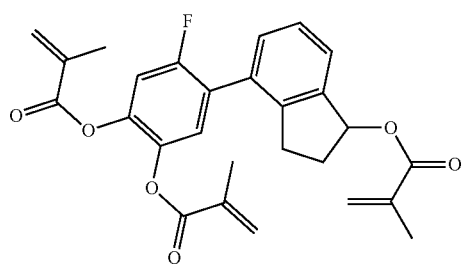
I-5-3
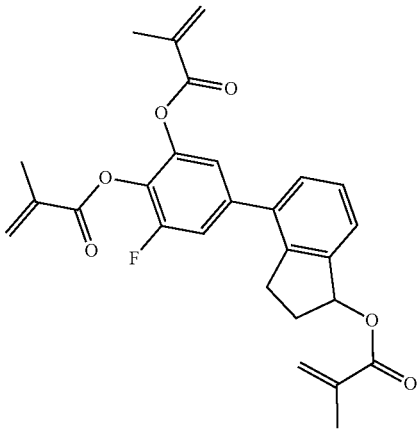
I-5-4
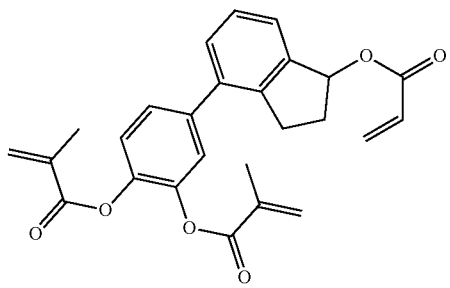
I-5-5
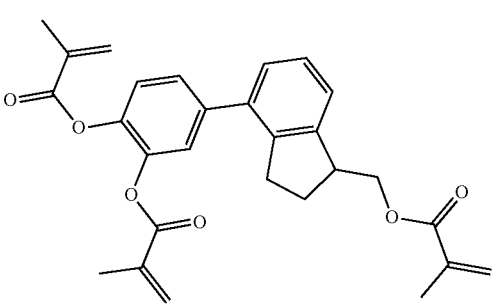

I-5-6
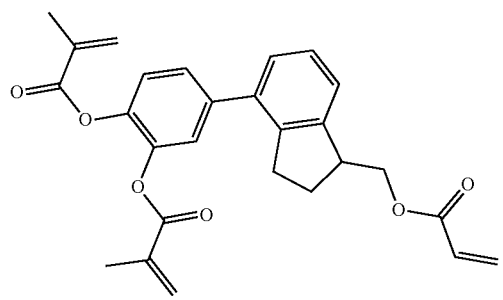
I-6-1
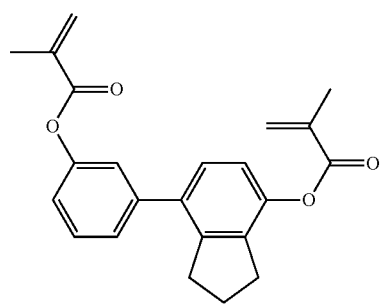
I-6-2
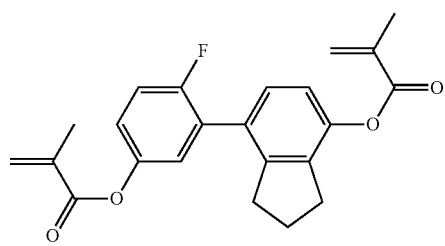
I-6-3
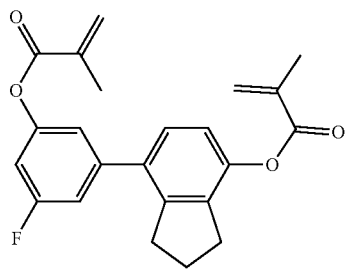
I-6-4
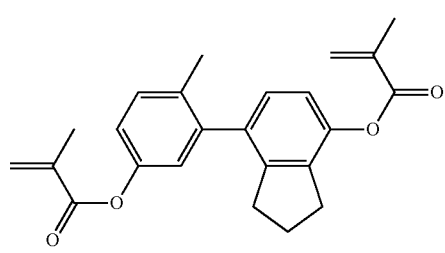
I-6-5
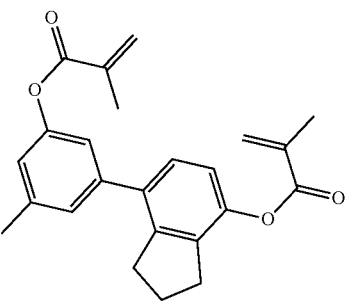
I-6-6
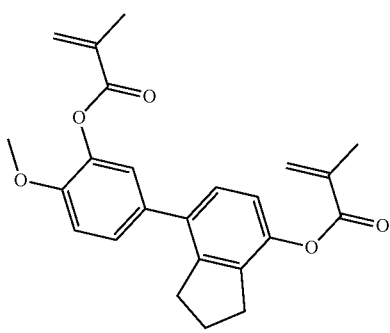
I-7-1
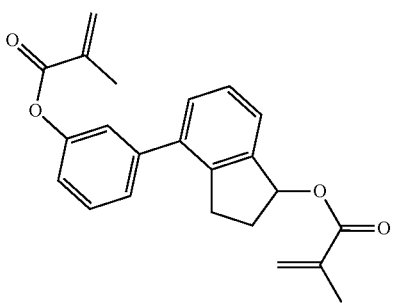
I-7-2
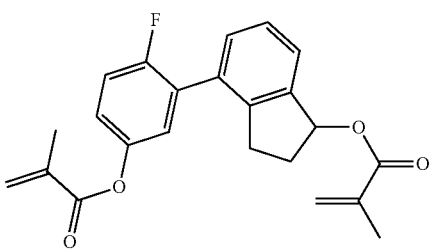
I-7-3
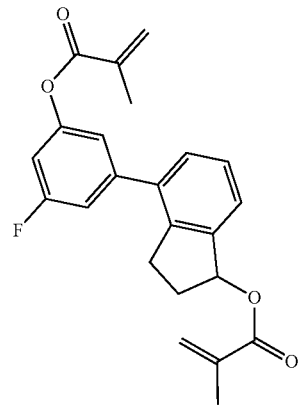

I-7-4
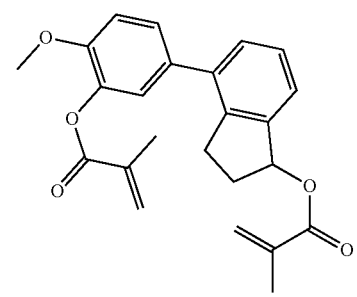
I-7-5
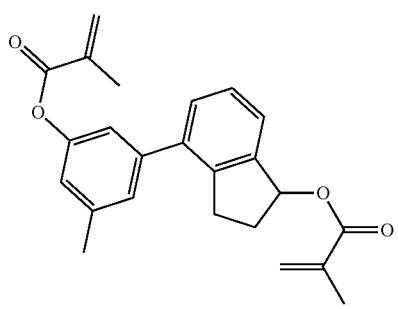
I-7-6
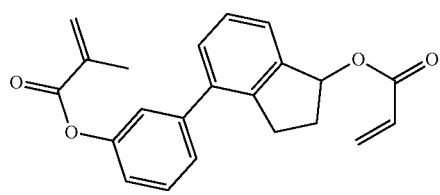
I-7-7
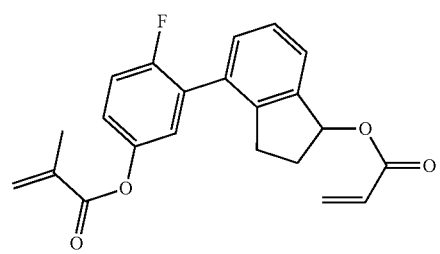
I-7-8
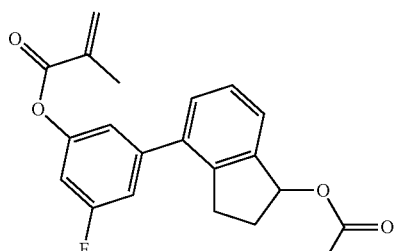
I-7-9
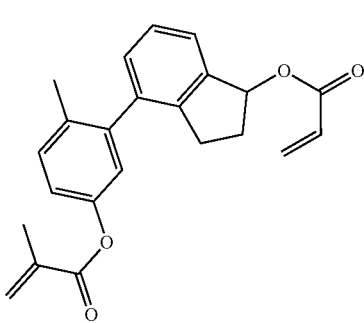
I-7-10
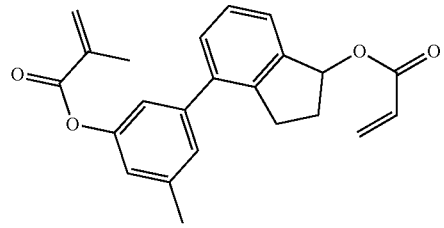
I-8-1
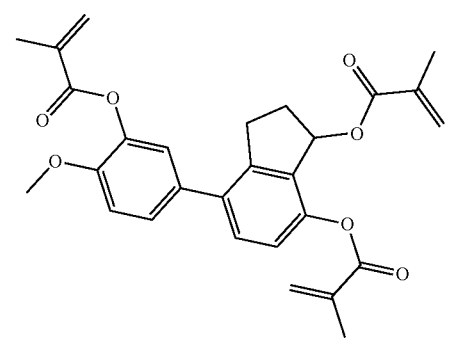
I-8-2
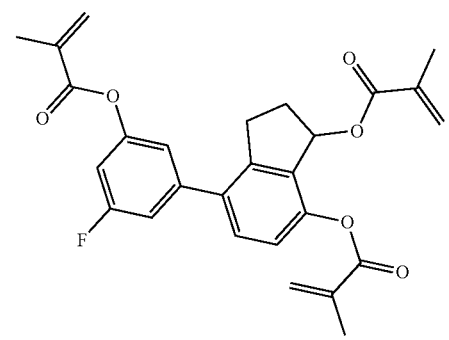
I-8-3
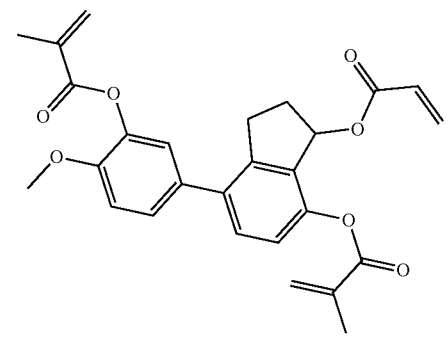
I-8-4
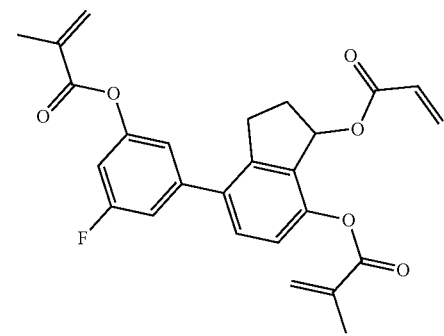

I-9-1
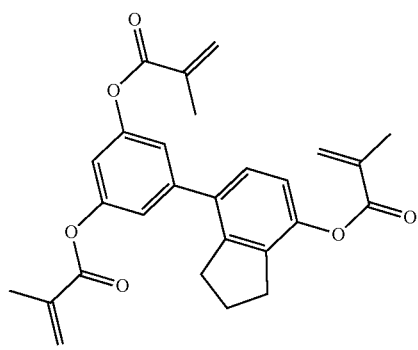
I-9-2
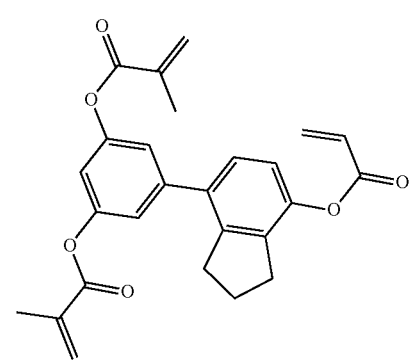
I-10-1
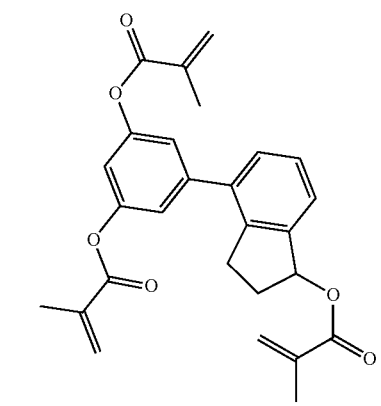
I-10-2
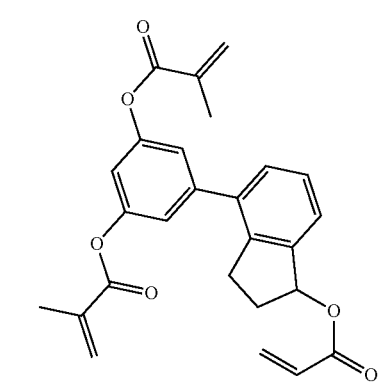
I-11-1
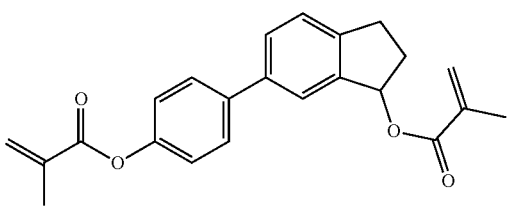
I-11-2
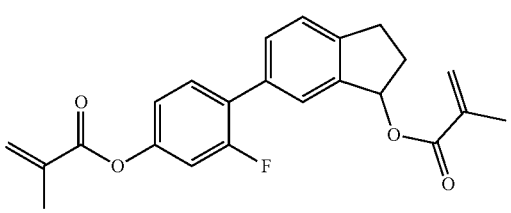
I-11-3
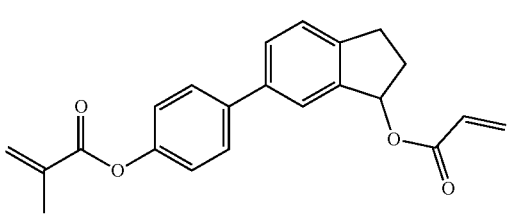
I-12-1
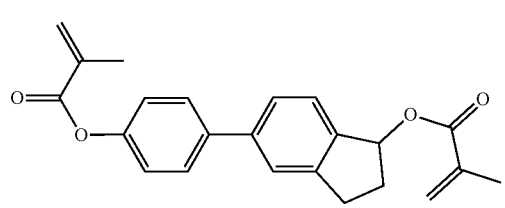
I-12-2
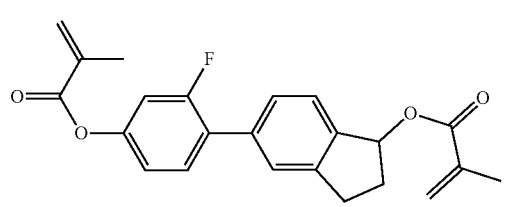
I-12-3
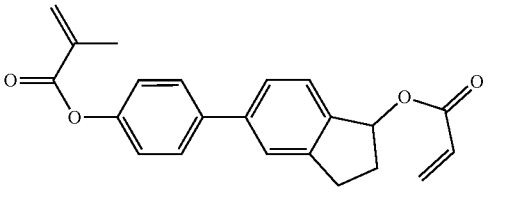
I-12-4
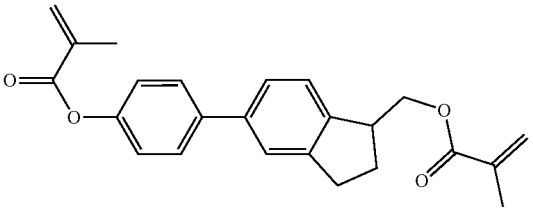

I-12-5
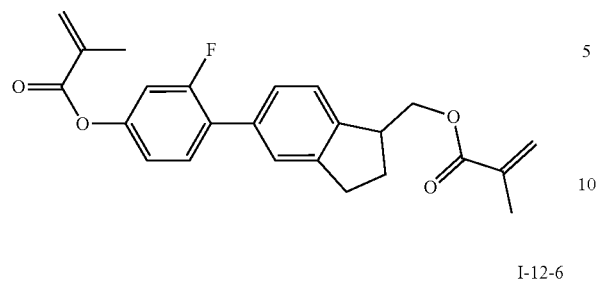
I-12-6
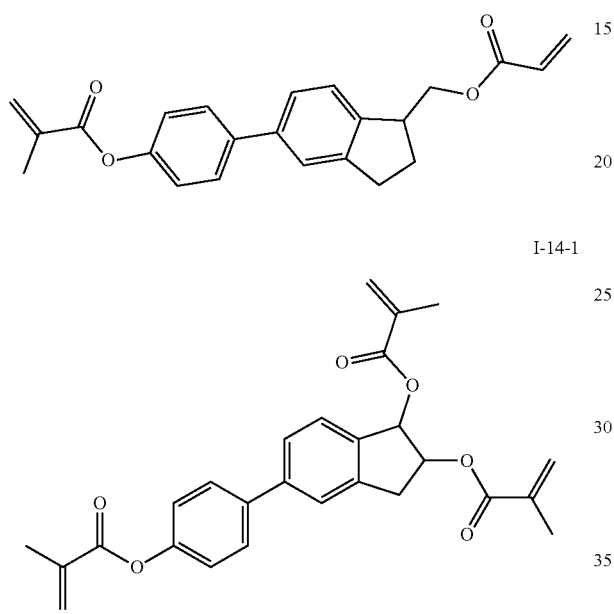
I-14-1
I-14-2
I-14-3
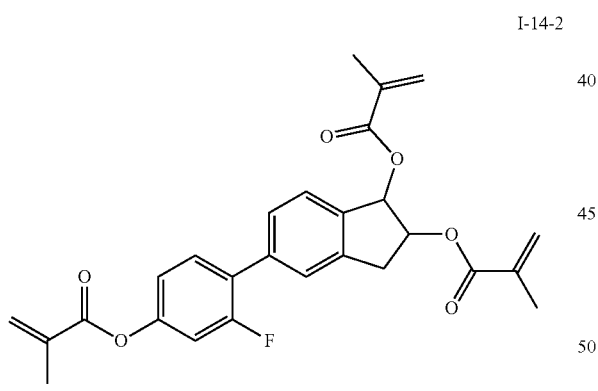
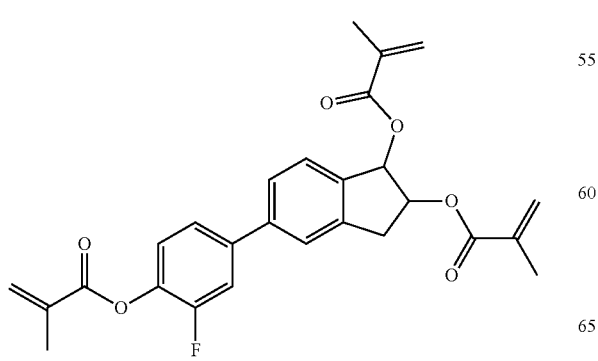
I-15-1
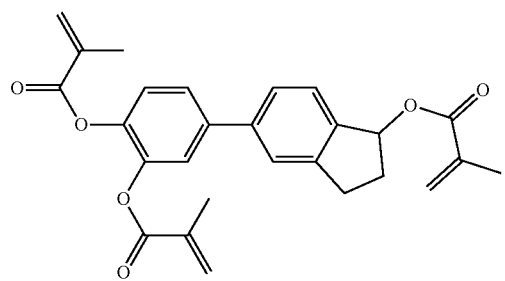
I-15-2
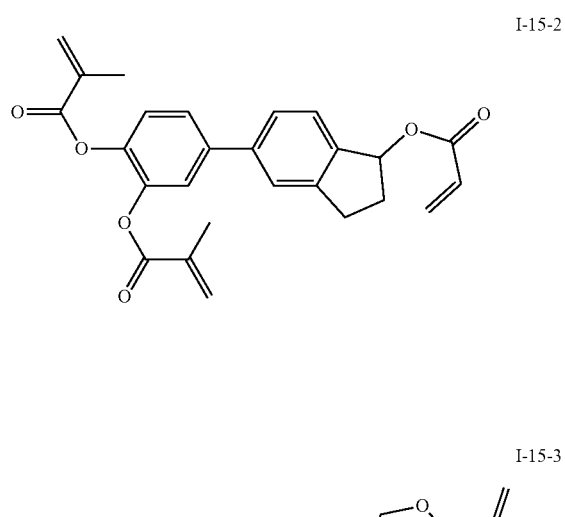
I-15-3
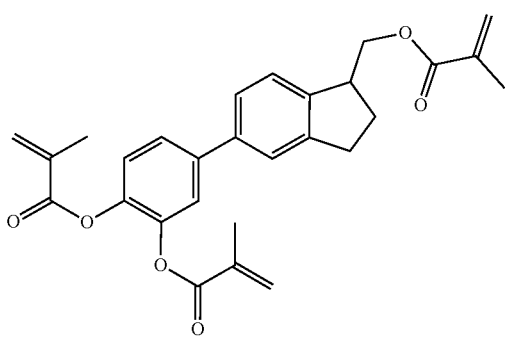
I-15-4
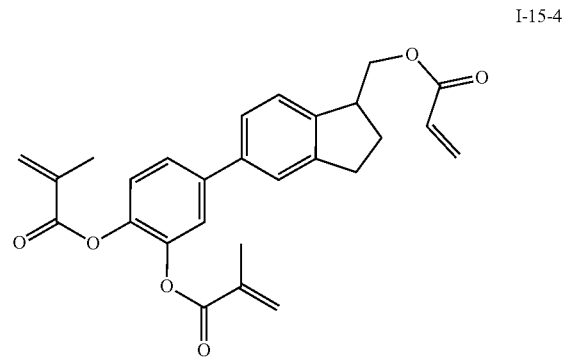

I-16-1
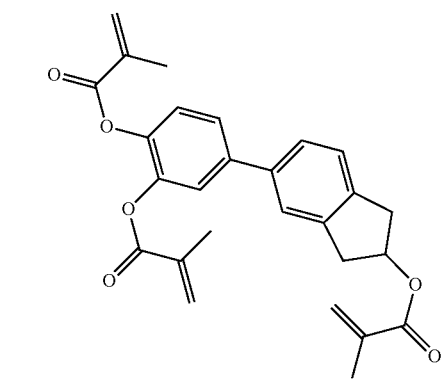
I-16-2
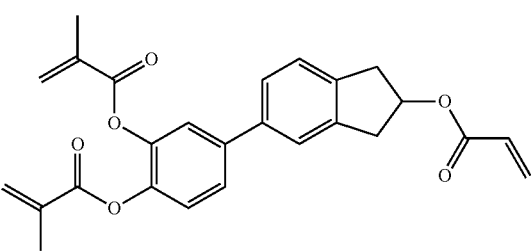
I-16-3
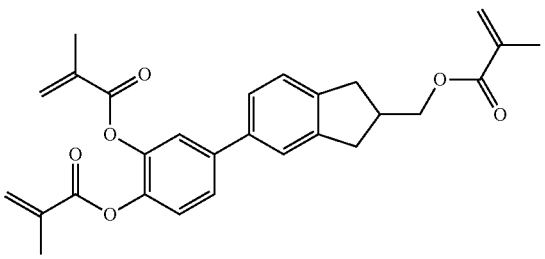
I-16-4
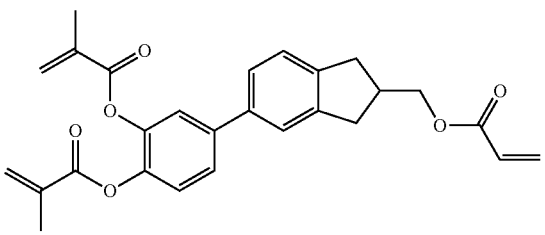
I-17-1
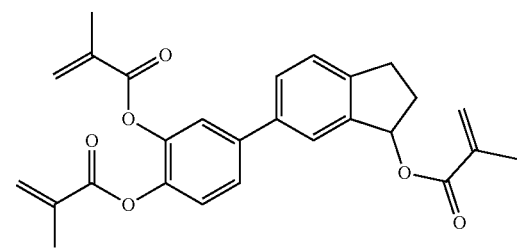
I-17-2
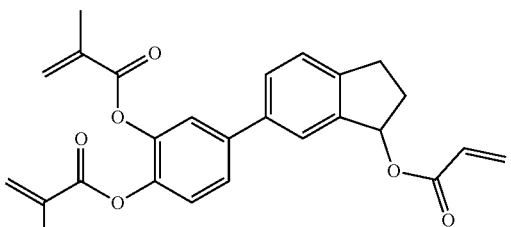
I-17-3
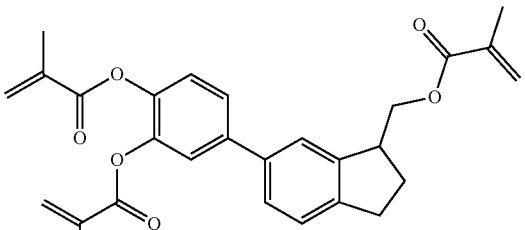
I-17-4
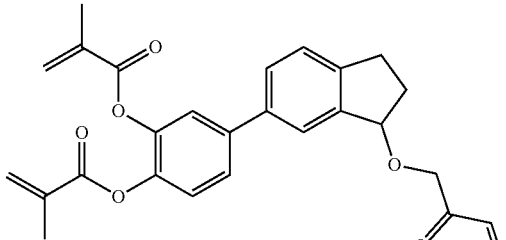
I-18-1
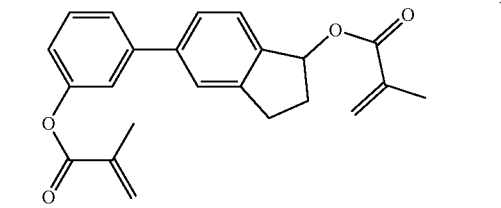
I-18-2
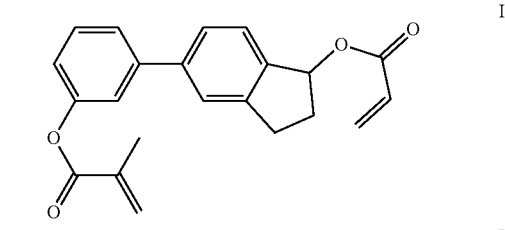
I-18-3
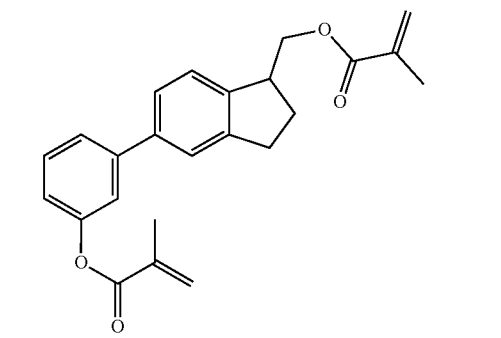

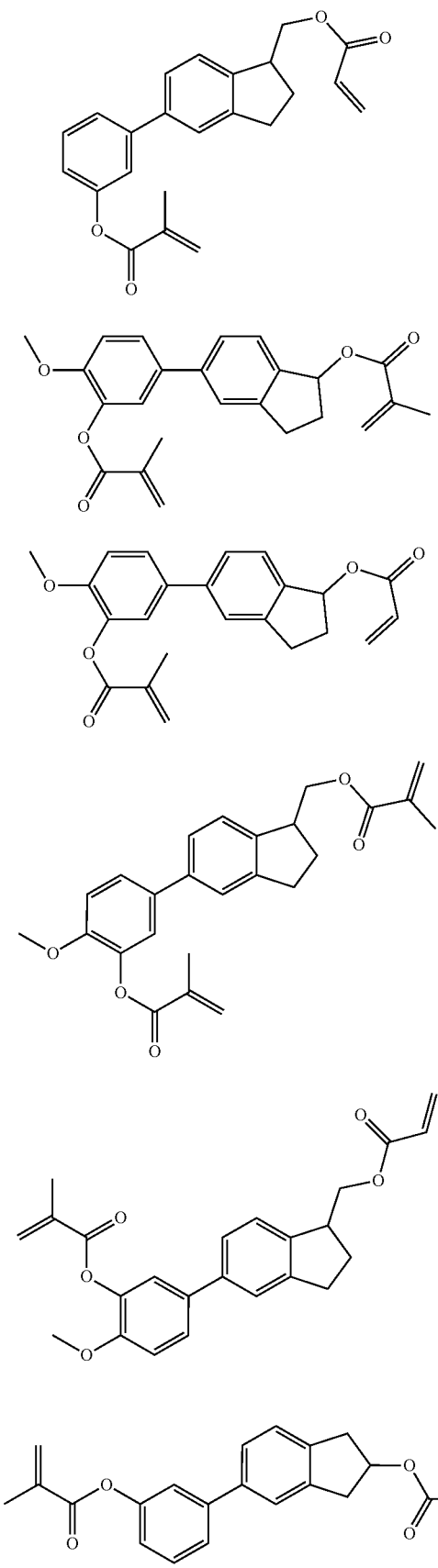
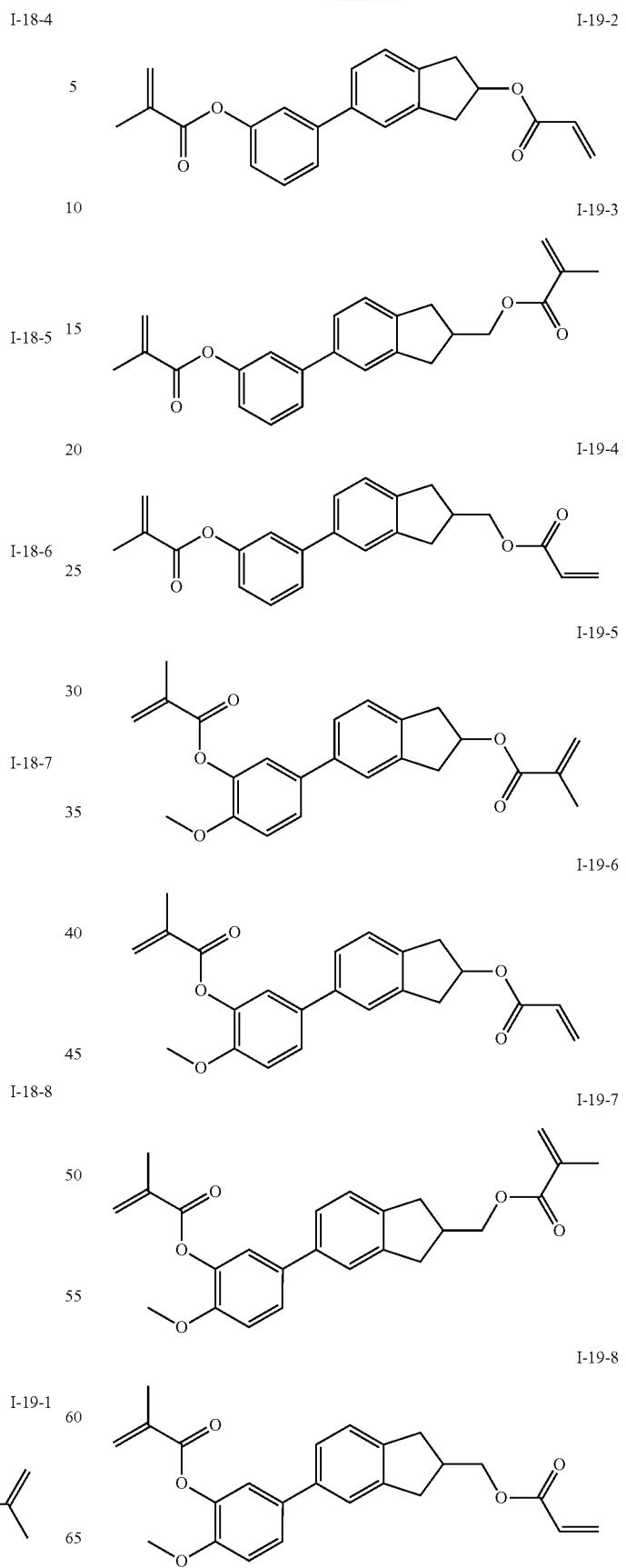

I-20-1
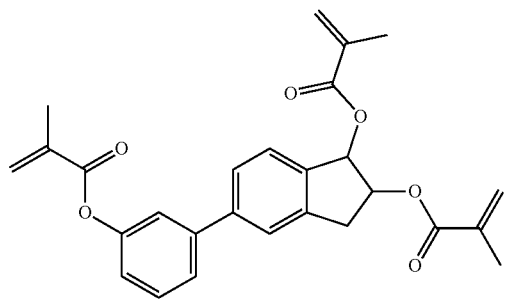
I-20-2
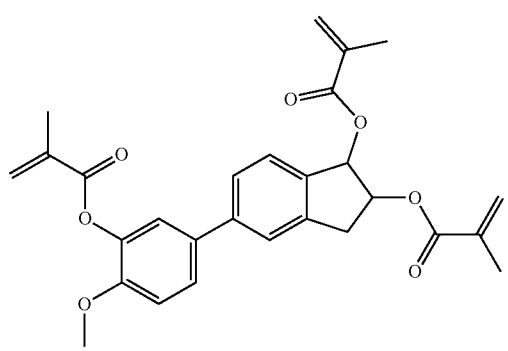
I-20-3
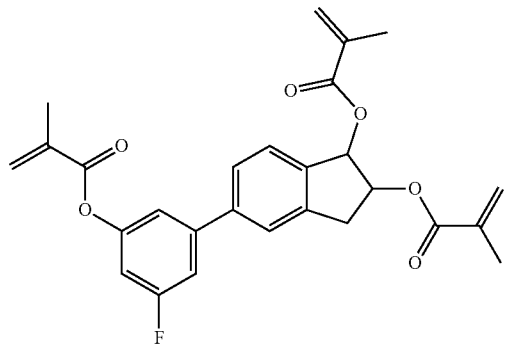
I-21-1
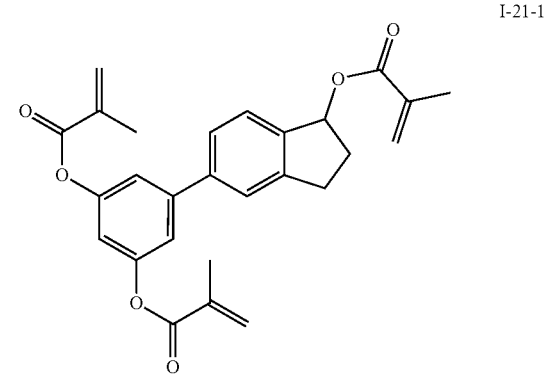
I-21-2
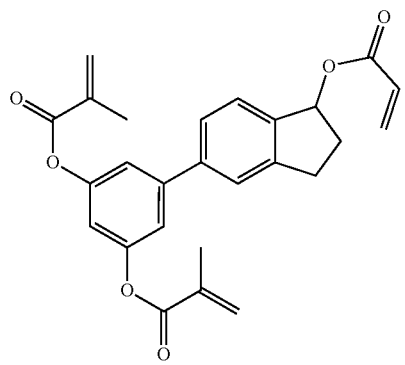
I-21-3
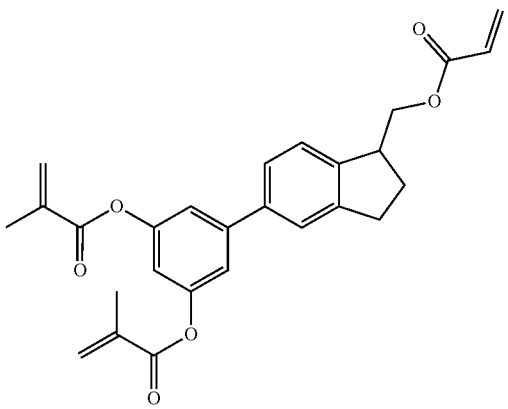
I-21-4
I-22-1
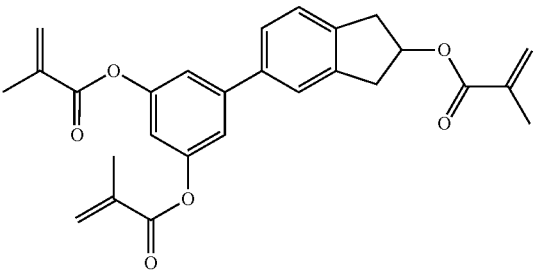

I-22-2
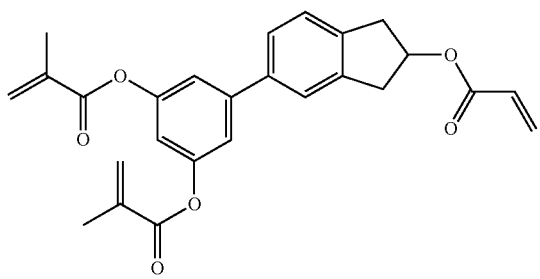
I-22-3
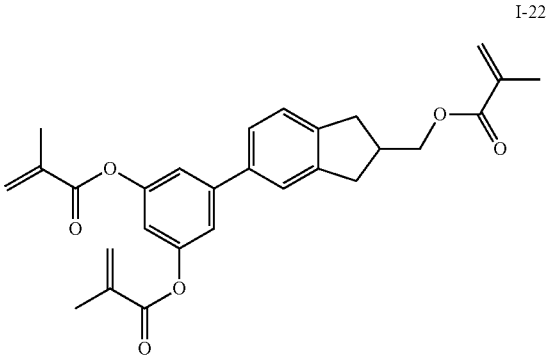
I-22-4
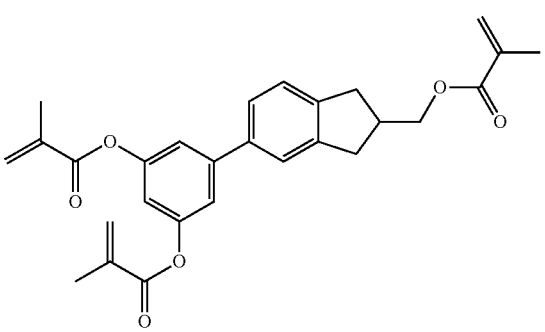
I-23-1
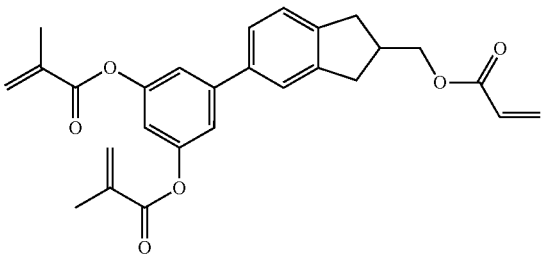
I-23-2
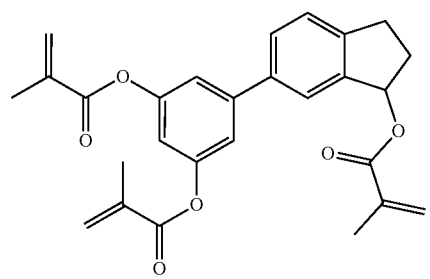
I-23-3
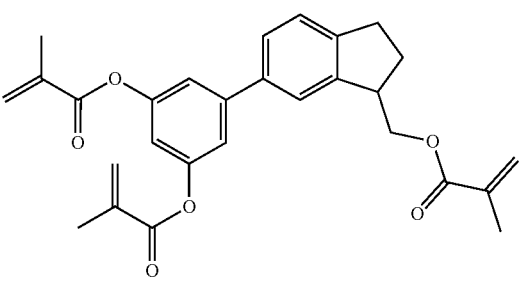
I-23-4
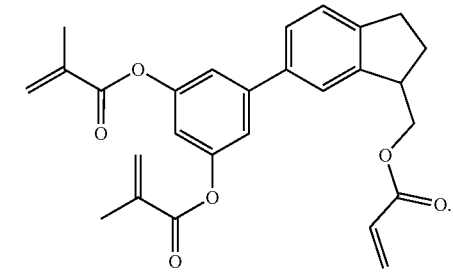
Said one or more compounds represented by formula II are preferably one or two compounds represented by formulas II-1 to II-15; and said one or more compounds represented by formula III are preferably one or more compounds represented by formulas III-1 to III-12:
II-1
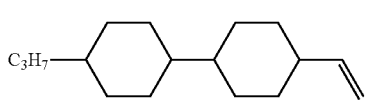
II-2
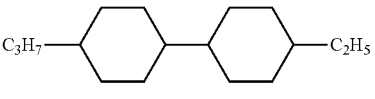
II-3
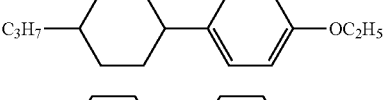
II-4
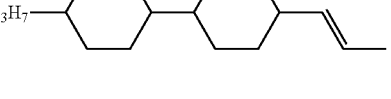
II-5
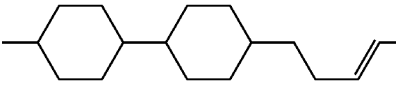
II-6
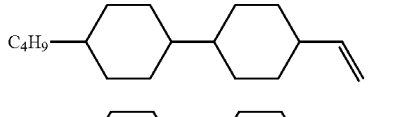
II-7
II-8

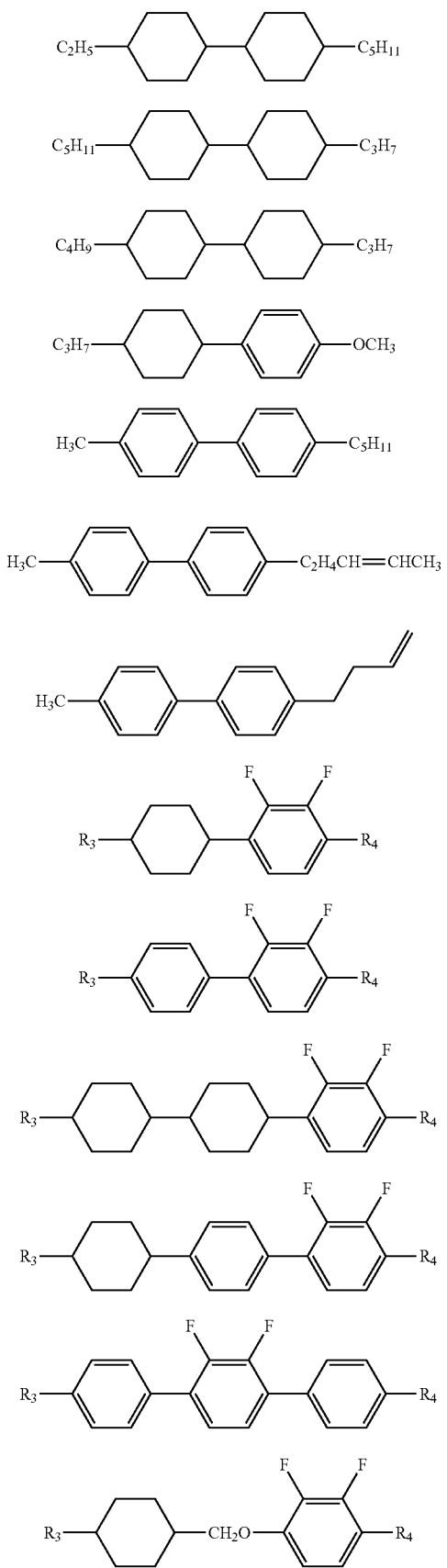
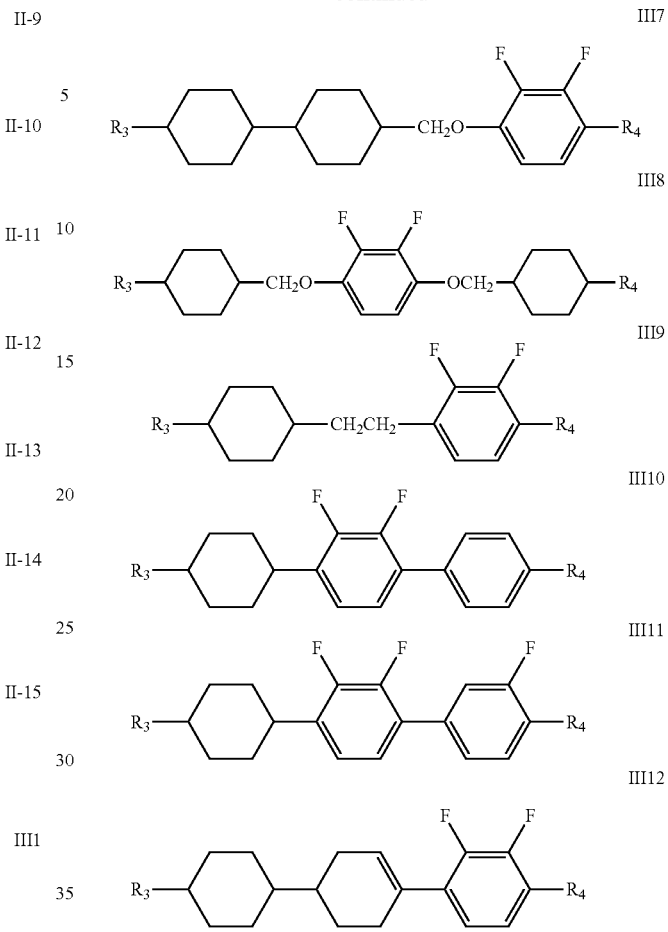

wherein $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more unconnected $CH_2$ in the groups represented by $R_3$ and $R_4$ may be substituted with cyclopentyl, cyclobutyl or cyclopropyl.

For displays using these liquid crystal compositions, after a compound represented by formula I is added to an LC medium and the LC medium is introduced into an LC cell, pre-tilting of liquid crystal molecules can be formed by means of UV photopolymerization or crosslinking under the application of a voltage between electrodes. This is advantageous for simplifying the LCD manufacturing process, increasing the response speed, and reducing the threshold voltage.

The compound represented by formula I provided by the present invention has the advantages of a good intermiscibility with other monomers, a good ultraviolet resistance, etc. As a reactive mesogen (RM), it has the advantages of a good intermiscibility, a high charge holding ratio (VHR), a high polymerization activity (less monomer residue), etc., and is very suitable for use as an RM for PSA (polymer supported alignment) and PS (polymer stabilized) mode liquid crystal mixtures, especially in the case of PSA-VA and PSA-IPS.

The amount (in mass percentage) of the polymerizable compound of formula I added to the liquid crystal composition is preferably between 0.01% and 1%, further preferably between 0.03% and 0.2%.

The amount (in mass percentage) of the compound represented by formula II added to the liquid crystal composition is preferably between 15% and 60%, further preferably between 20% and 40%.

The amount (in mass percentage) of the compound represented by formula III added to the liquid crystal composition is preferably between 20% and 60%, further preferably between 30% and 50%.

Said liquid crystal composition may be a negative liquid crystal composition, and may further comprise one or more compounds represented by formula IV:

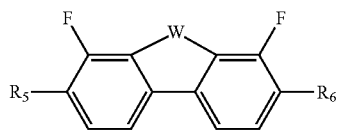

IV wherein $R_5$ and $R_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in the groups represented by $R_5$ and $R_6$ may be substituted with cyclopentyl, cyclobutyl or cyclopropyl;

and W represents O, S or —$CH_2O$—.

The compound represented by formula IV is preferably

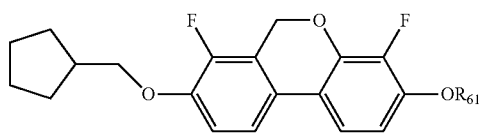

IV-1

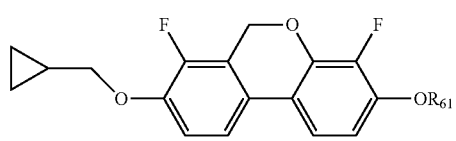

IV-2

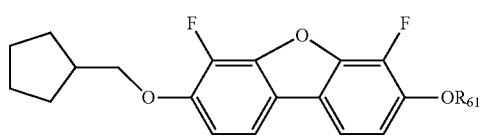

IV-3

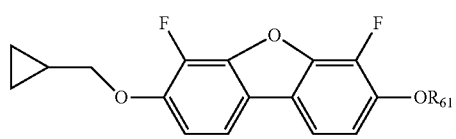

IV-4

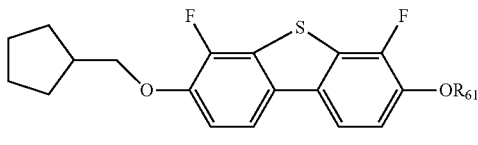

IV-5

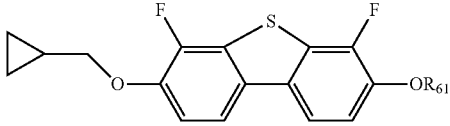

IV-6 wherein each $R_{61}$ independently represents an alkyl group having a carbon atom number of 2-6.

Said liquid crystal composition may further comprise one or more compounds represented by formula V

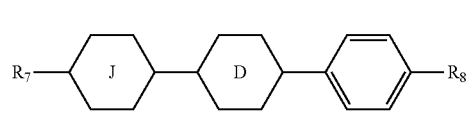

V wherein $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8;

and

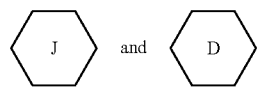

each independently represent 1,4-phenylene, 1,4-cyclohexylene or 1,4-cyclohexenylene.

The compound represented by formula V is preferably

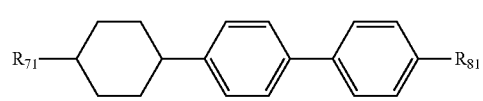

V-1

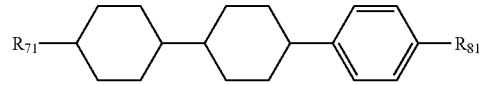

V-2

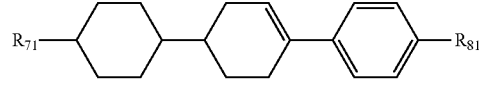

V-3

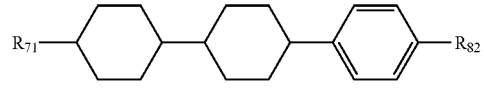

V-4 wherein $R_{71}$ and $R_{81}$ each independently represent an alkyl group having a carbon atom number of 2-6 or an alkenyl group having an atom number of 2-6;

$R_{82}$ represents an alkoxy group having a carbon atom number of 1-5; and $R_{71}$ and $R_{81}$ are more preferably vinyl, 2-propenyl or 3-pentenyl.

Said liquid crystal composition may further comprise one or more compounds represented by formula VI

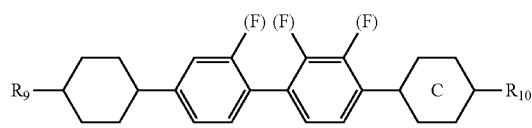

VI wherein $R_9$ and $R_{10}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8;

represents 1,4-phenylene, 1,4-cyclohexyene or 1,4-cyclohexenylene;

and each (F) independently represents H or F.

The compound represented by formula VI is preferably

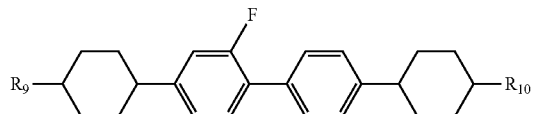

VI-1

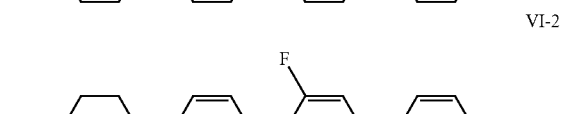

VI-2

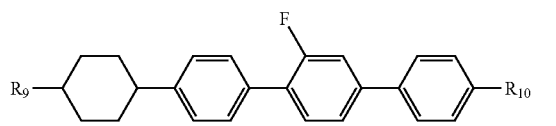

VI-3 wherein $R_9$ and $R_{10}$ each independently preferably represent an alkyl group having a carbon atom number of 2-6 or an alkenyl group having an atom number of 2-6;

To the liquid crystal compound of the present invention, various functional dopants may be further added, wherein the contents of the dopants are preferably between 0.01% and 1%, and these dopants are mainly an antioxidant, an ultraviolet absorber and a chiral agent.

The antioxidant and the ultraviolet absorber are preferably:

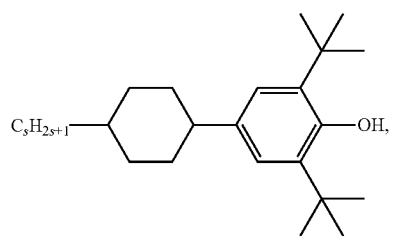 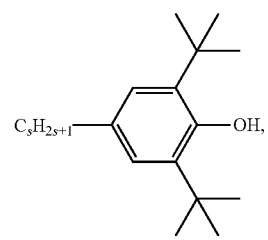

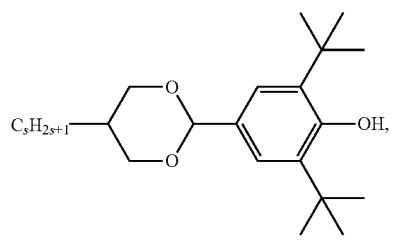 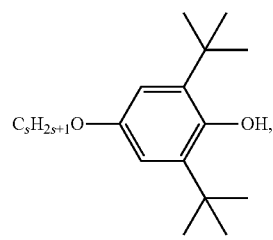

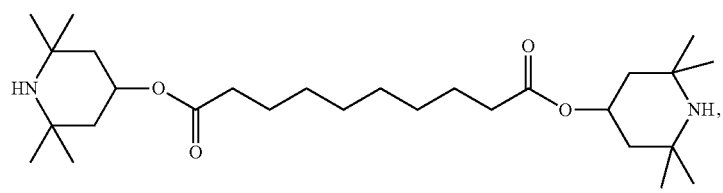

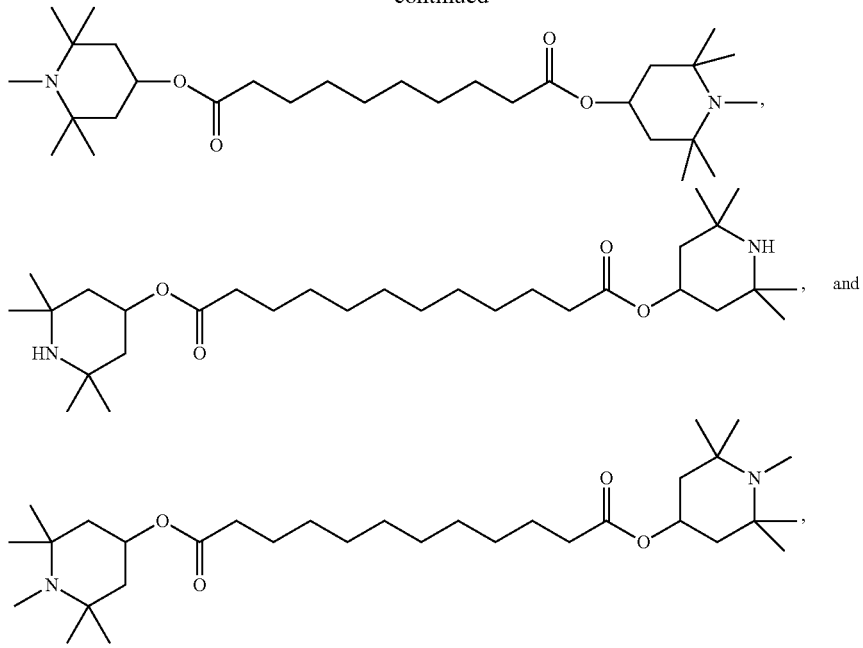

S representing an integer of from 1 to 10.

The present invention further relates to a liquid crystal display element or liquid crystal display comprising any liquid crystal composition mentioned above. Said display element or display is an active matrix display element or display or a passive matrix display element or display.

Said liquid crystal display element or liquid crystal display is preferably an active matrix addressing liquid crystal display element or liquid crystal display.

Said active matrix display element or display is specifically a PSVA-TFT or IPS-TFT liquid crystal display element or display.

DETAILED DESCRIPTION OF EMBODIMENTS

The present invention is further described in conjunction with particular examples below, but the present invention is not limited to the following examples. Said methods are all conventional methods, unless otherwise specified. Said raw materials are all commercially available, unless otherwise specified.

The reaction process is generally monitored through TLC, and the post-treatments after the reaction is completed are generally water washing, extracting, combining organic phases and then drying, evaporating and removing the solvent under a reduced pressure, recrystallization and column chromatographic separation; and a person skilled in the art would be able to achieve the present invention according to the following description.

In the present specification, the percentages are mass percentages, the temperatures are in degree Celsius (° C.), and the specific meanings of other symbols and the test conditions are as follows:

Cp represents the clearing point of the liquid crystal ($T_a$), as measured by means of a DSC quantitative method;

S-N represents the melting point ($T_m$) for the transformation of a liquid crystal from a crystal state to a nematic phase;

$\Delta n$ represents an optical anisotropy, $n_o$ is the refractive index of an ordinary light, $n_c$ is the refractive index of an extraordinary light, with the test conditions being: 25±2° C., 589 nm and using an abbe refractometer for testing;

$\Delta\varepsilon$ represents the dielectric anisotropy, $\Delta\varepsilon=\varepsilon_{//}-\varepsilon_{\perp}$, wherein the $\varepsilon_{//}$ is a dielectric constant parallel to a molecular axis, and $\varepsilon_{\perp}$ is a dielectric constant perpendicular to the molecular axis, with the test conditions being: 25±0.5° C., using 20-micron parallel cells, and using INSTEC: ALCT-IR1 for testing;

γ1 represents a rotary viscosity (mPa·s), with the test conditions being: 25±0.5° C., using 20-micron parallel cells, and using INSTEC: ALCT-IR1 for testing; and ρ represents an electrical resistivity (Ω·cm), with the test conditions being: 25±2° C., and the test instruments being a TOYO SR6517 high resistance instrument and an LE-21 liquid electrode.

VHR represents a voltage holding ratio (%), with the test conditions being: 20±2° C., a voltage of ±5 V, a pulse width of 10 ms, and a voltage holding time of 16.7 ms. The test equipment is a TOYO Model 6254 liquid crystal performance comprehensive tester.

T represents a response time (ms), with the test instrument being DMS-501 and the test conditions being: 25±0.5° C., a test cell that is a 3.3-micron IPS test cell, an electrode spacing and an electrode width, both of which are 10 microns, and an included angle between the frictional direction and the electrode of 10°.

T (%) represents a transmittance, wherein T (%)= 100%*bright state (Vop) luminance/light source luminance, with the test instrument being DMS501, and the test conditions being: 25±0.5° C., a test cell that is a 3.3-micron IPS test cell, an electrode spacing and an electrode width, both of which are 10 microns, and an included angle between the frictional direction and the electrode of 10°.

The conditions for the ultraviolet photopolymerization of the polymerizable compound involve using ultraviolet light with a wavelength of 313 nm and an irradiation light intensity of 0.5 Mw/cm²

In the examples of the invention of the present application, liquid crystal monomer structures are represented by codes, and the codes for ring structures, end groups and linking groups of liquid crystals are represented as in Tables (I) and (II) below

TABLE I

| Corresponding code for ring structure | |
|---|---|
| Ring structure | Corresponding code |
|  | C |
|  | P |
| 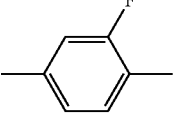 | G |
| 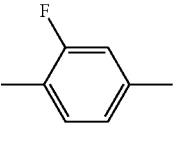 | Gi |
| 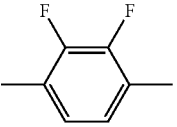 | Y |
| 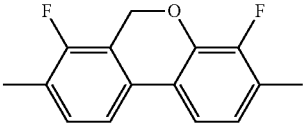 | Sa |
| 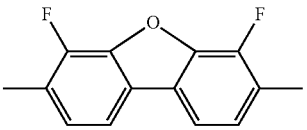 | Sb |
| 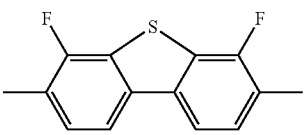 | Sc |

TABLE II

| Corresponding code for end group and linking group | |
|---|---|
| End group and linking group | Corresponding code |
| $C_nH_{2n+1}$— | n- |
| $C_nH_{2n+1}O$— | nO— |
| —$OCF_3$ | —OT |
| —$CF_2O$— | -Q- |
| —$CH_2O$— | —O— |
| —F | —F |
| —CN | —CN |
| —$CH_2CH_2$— | -E- |
| —CH=CH— | —V— |
| —C≡C— | —W— |
| —COO— | —COO— |
| —CH=CH—$C_nH_{2n+1}$ | Vn— |
| 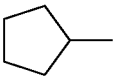 | C(5)— |
| 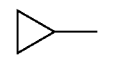 | C(3)— |

EXAMPLES

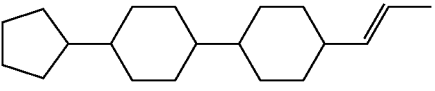

CC-C(5)-V1

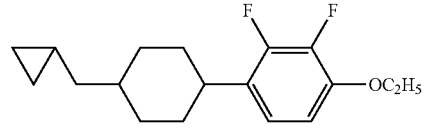

CY-C(3)1-O2

The following specific embodiments are used to illustrate the present invention:

Preparation of Polymerizable Compound

Example 1

The structural formula of the polymerizable compound is as represented by the following formula I-1-1:

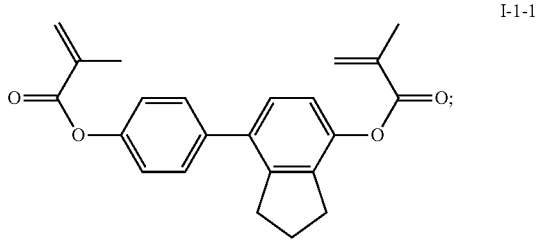 [SMILES: C=C(C)C(=O)Oc1ccc(-c2ccc(OC(=O)C(=C)C)c3c2CCC3)cc1]

I-1-1 and the route of the preparation thereof is as follows:

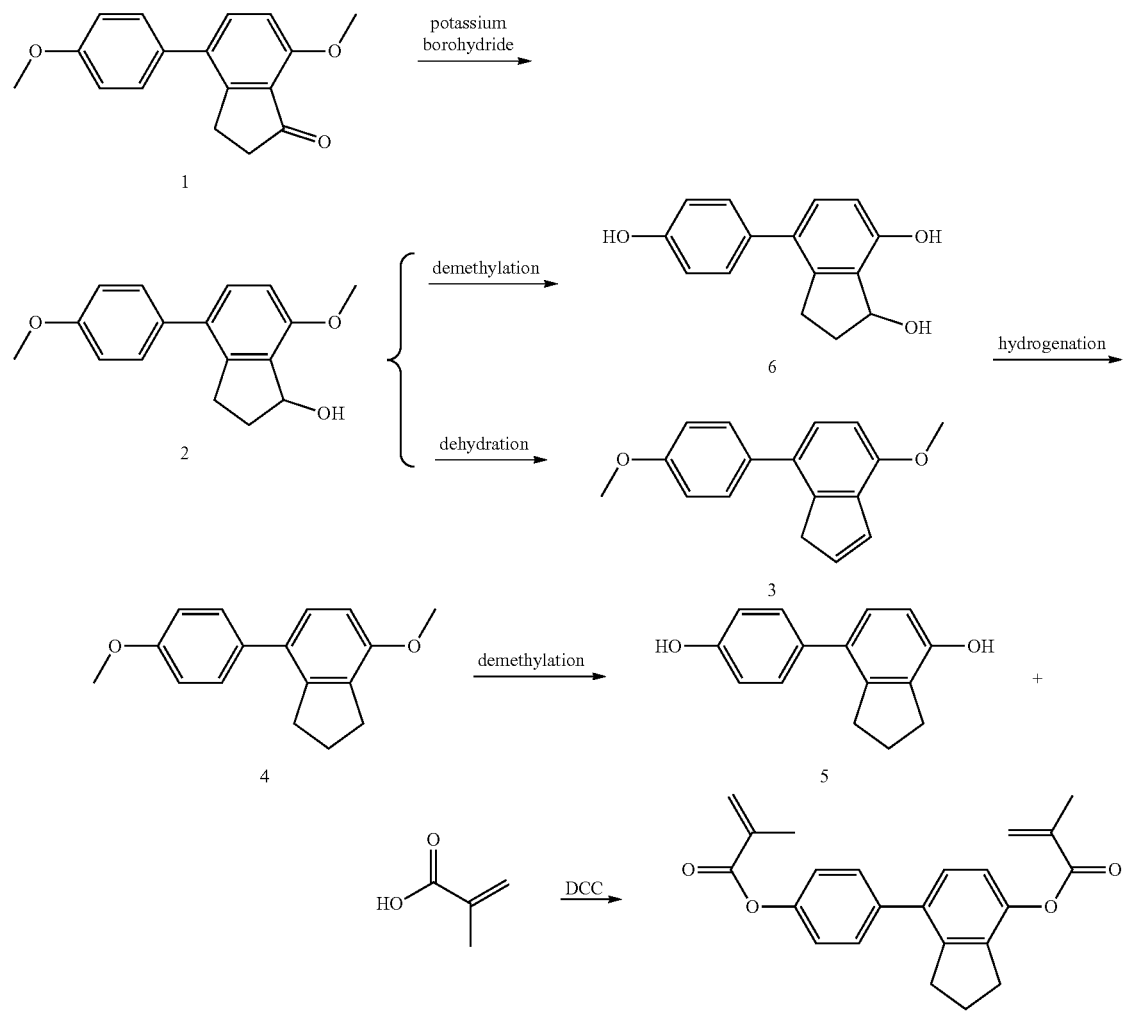

Specific operation procedures of the preparation:

Intermediate 2

To a 2 L three-necked flask, 0.1 mole of intermediate 1, 0.5 L of tetrahydrofuran, and 0.02 L of water are added, the temperature is reduced to 0° C., 0.15 moles of potassium borohydride is added in portions, the temperature is controlled at 0° C. for a reaction for 3 h, and the temperature is naturally raised to room temperature (about 25° C.) for a reaction at room temperature for 8 hours. 100 L of water is added to the system, the pH is then adjusted to 6-7 with dilute acid, the system is subjected to liquid separation, and the aqueous phase is subjected to extraction with ethyl acetate, dried over anhydrous sodium sulfate and subjected to rotary drying to give intermediate 2.

Intermediate 3

To a 1 L three-necked flask, intermediate 2 from the above step, 5 g of p-toluenesulfonic acid, and 0.5 L of toluene are added, and the system is stirred and warmed to reflux for water separation for 2 hours. The system is poured into a column containing 20 g of silica gel, and rinsed with 0.5 L of toluene, and the eluent is washed three times with water to neutral, and subjected to rotary drying to give intermediate 3.

Intermediate 4

To a 2 L three-necked flask, intermediate 3 from the above step, 0.5 L of toluene, 0.1 L of anhydrous ethanol, and 10 g of palladium on carbon (5%) are added, evacuation is carried out 5 times with nitrogen gas and 3 times with hydrogen gas, hydrogenation is carried for 3 hours, the system is poured into a column containing 20 g of silica gel, and rinsed with 0.5 L of toluene, and the eluent is washed three times with water to neutral, and subjected to rotary drying to give intermediate 4

Intermediate 5

To a 2 L three-necked flask, intermediate 4 from the above step and 0.5 L of dichloromethane are added, the mixture is cooled to 0° C. under stirring, 3 folds by mole of boron tribromide diethyl ether is dropwise added, the temperature is controlled at 0° C. or less, the dropwise addition is completed within 1 h, the temperature is controlled at 0° C. for reaction for 12 h, the reaction liquid is poured to 1 kg of water, stirred for 15 minutes and subjected to liquid separation to separate out most (about 0.5 L) of the dichloromethane, 0.5 L of ethyl acetate is added to the aqueous phase, the aqueous phase is stirred until the solid is completely dissolved, and is subjected to liquid separation, the aqueous phase is subjected to extraction with 0.2 L×2 of ethyl acetate, the organic phases are combined, washed with water and subjected to clean water separation, 0.5 kg of anhydrous sodium sulfate is added for drying for 4 hours, the solvent is removed by means of rotary drying, and recrystallization is carried out using 5 folds of petroleum ether to give intermediate 5

Product I-1-1

To a 1 L three-necked flask, 0.02 moles of intermediate 5, 0.05 moles of methacrylic acid, and 0.5 L of toluene are added, the temperature is reduced to 0° C. under the protection of nitrogen, the temperature is controlled at 0-5° C., 0.09 moles of DCC is added, and after the addition is complete, the temperature is naturally raised to room temperature (about 25° C.) for reaction for 8 hours. 500 ml of water is added, liquid separation is carried out, the aqueous phase is extracted with 100 ml×2 of toluene, the organic phases are combined and washed with 500 ml×2 of a saline solution, after the washing is complete, the organic phase is dried over anhydrous sodium sulfate and evaporated to dryness, 30 g of silica gel and 3 folds of petroleum ether (90-120° C.) are taken for passing a column, the column is rinsed with 2 folds of petroleum ether (90-120° C.), and after evaporation, 2 folds of ethanol is used for recrystallisation to give product I-1-1.

By using a similar method,

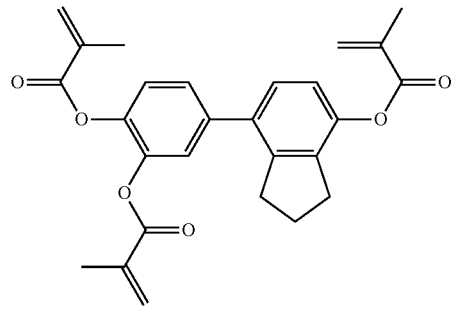

I-4-1

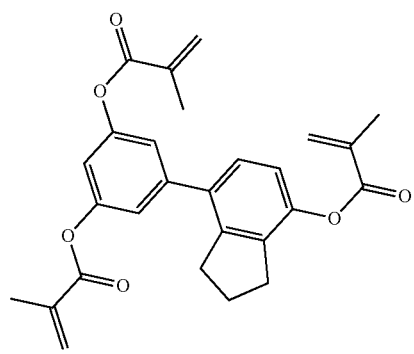

I-9-1 are synthesized.

Example 2

The structural formula of the polymerizable compound is as represented by the following formula I-3-1:

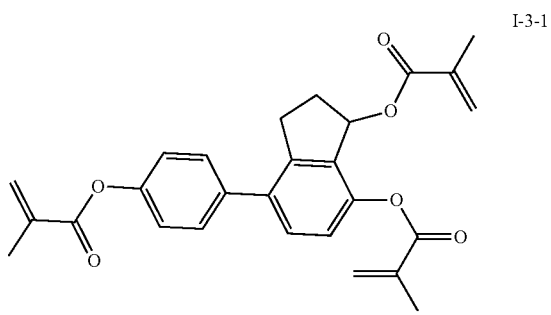 [SMILES: C=C(C)C(=O)Oc1ccc(-c2ccc(OC(=O)C(=C)C)c3c2CCC3OC(=O)C(=C)C)cc1]

I-3-1

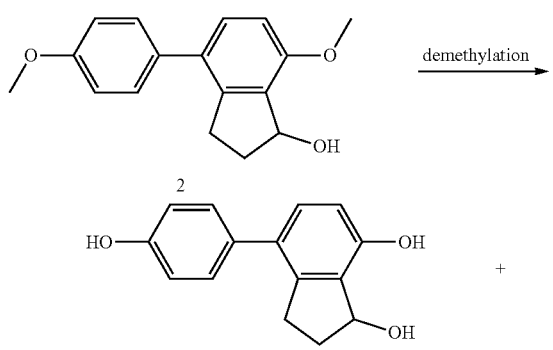

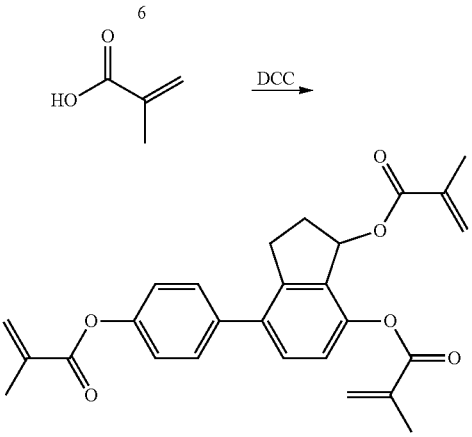

Intermediate 6

To a 2 L three-necked flask, 0.1 mole of intermediate 2 and 0.8 L of dichloromethane are added, the mixture is cooled to 0° C. under stirring, 3 folds by mole of boron tribromide diethyl ether is dropwise added, the temperature is controlled at 0° C. or less, the dropwise addition is completed within 1 h, the temperature is controlled at 0° C. for reaction for 12 h, the reaction liquid is poured to 1 kg of water, stirred for 15 minutes and subjected to liquid separation to separate out most (about 0.8 L) of the dichloromethane, 0.5 L of ethyl acetate is added to the aqueous phase, the aqueous phase is stirred until the solid is completely dissolved, and is subjected to liquid separation, the aqueous phase is subjected to extraction with 0.2 L×2 of ethyl acetate, the organic phases are combined, washed with water and subjected to clean water separation, 0.5 kg of anhydrous sodium sulfate is added for drying for 4 hours, the solvent is removed by means of rotary drying, and recrystallization is carried out using 5 folds of petroleum ether to give intermediate 6.

Product I-3-1

To a 1 L three-necked flask, 0.05 moles of intermediate 6, 0.2 moles of methacrylic acid, and 0.5 L of toluene are added, the temperature is reduced to 0° C. under the protection of nitrogen, the temperature is controlled at 0-5° C., 0.25 moles of DCC is added, and after the addition is complete, the temperature is naturally raised to room temperature (about 25° C.) for reaction for 12 hours. 500 ml of water is added, liquid separation is carried out, the aqueous phase is extracted with 100 ml×2 of toluene, the organic phases are combined and washed with 500 ml×2 of a saline solution, after the washing is complete, the organic phase is dried over anhydrous sodium sulfate and evaporated to dryness, 30 g of silica gel and 3 folds of petroleum ether (90-120° C.) are taken for passing a column, the column is rinsed with 2 folds of petroleum ether (90-120° C.), and after evaporation, 2 folds of ethanol is used for recrystallisation to give product I-3-1.

By using a similar method,

I-8-1

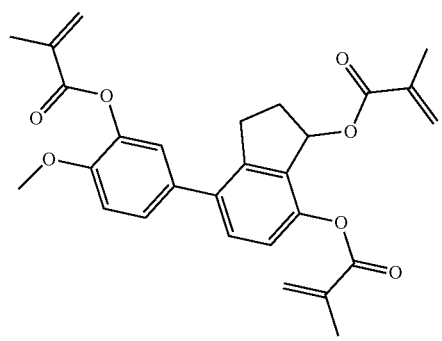

I-8-2 are synthesized.

Example 3

The structural formula of the polymerizable compound is as represented by the following formula I-12-1:

I-12-1

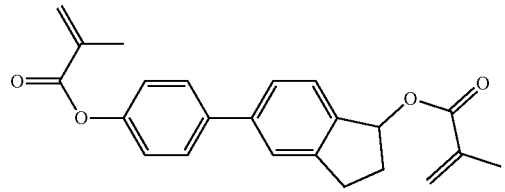

I-12-1

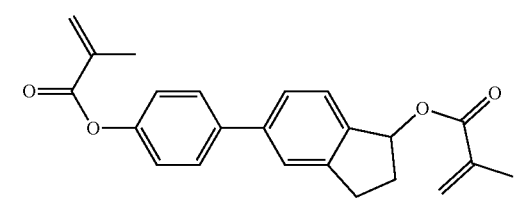

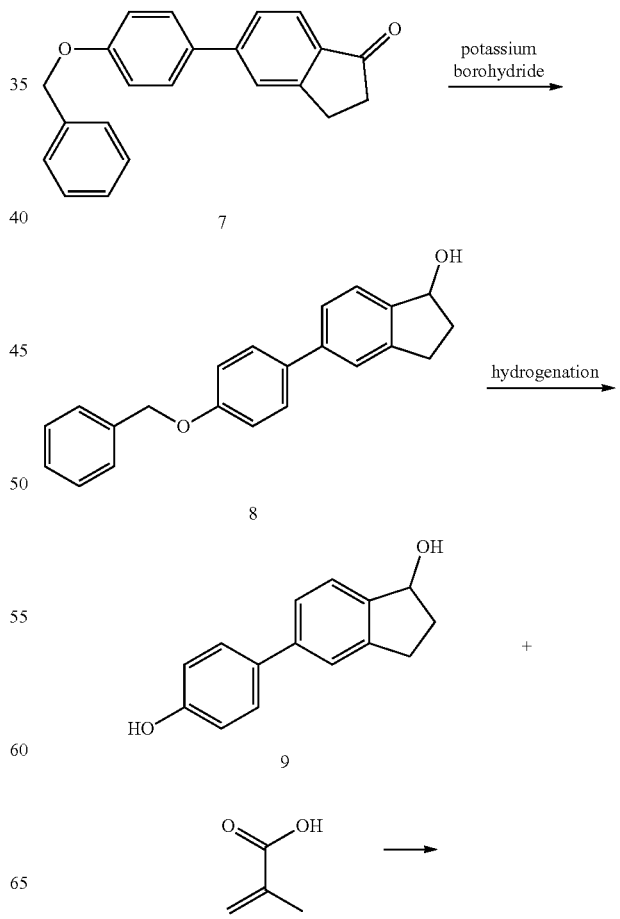

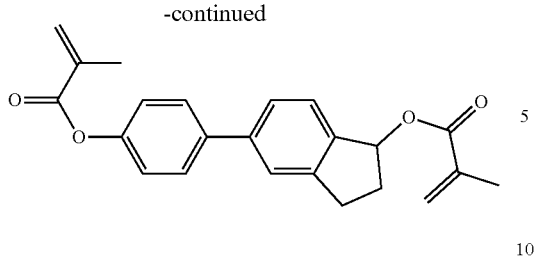

Intermediate 8

To a 2 L three-necked flask, 0.1 mole of intermediate 7, 0.5 L of tetrahydrofuran, and 0.02 L of water are added, the temperature is reduced to 0° C., 0.15 moles of potassium borohydride is added in portions, the temperature is controlled at 0° C. for reaction for 3 h, and the temperature is naturally raised to room temperature (about 25° C.) for reaction at room temperature for 8 hours. 100 L of water is added to the system, the pH is then adjusted to 6-7 with dilute acid, the system is subjected to liquid separation, and the aqueous phase is subjected to extraction with ethyl acetate, dried over anhydrous sodium sulfate and subjected to rotary drying to give intermediate 8

Intermediate 9

To a 2 L three-necked flask, 0.08 moles of intermediate 8, 0.8 L of toluene, 0.1 L of absolute ethanol, and 10 g of palladium on carbon (5%) are added, evacuation is carried out 5 times with nitrogen gas and 3 times with hydrogen gas, hydrogenation is carried for 3 hours, the system is poured into a column containing 20 g of silica gel, and rinsed with 0.5 L of toluene, and the eluent is washed three times with water to neutral, and subjected to rotary drying to give intermediate 9

Product I-12-1

To a 1 L three-necked flask, 0.05 moles of intermediate 9, 0.15 moles of methacrylic acid, and 0.5 L of toluene are added, the temperature is reduced to 0° C. under the protection of nitrogen, the temperature is controlled at 0-5° C., 0.25 moles of DCC is added, and after the addition is complete, the temperature is naturally raised to room temperature (about 25° C.) for reaction for 12 hours. 500 ml of water is added, liquid separation is carried out, the aqueous phase is extracted with 100 ml×2 of toluene, the organic phases are combined and washed with 500 ml×2 of a saline solution, after the washing is complete, the organic phase is dried over anhydrous sodium sulfate and evaporated to dryness, 30 g of silica gel and 3 folds of petroleum ether (90-120° C.) are taken for passing a column, the column is rinsed with 2 folds of petroleum ether (90-120° C.), and after evaporation, 2 folds of ethanol is used for recrystallisation to give product I-12-1

By using a similar synthesis method, products of

I-12-2

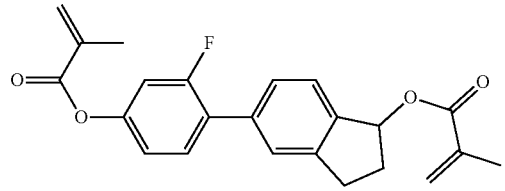

I-15-1

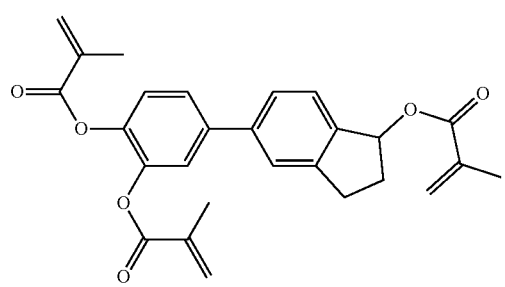

I-16-1

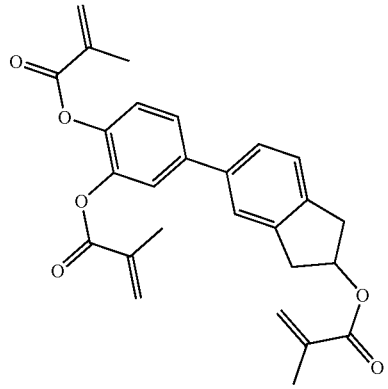

are obtained.

Example 4

The structural formula of the polymerizable compound is as represented by the following formula I-14-1:

I-14-1

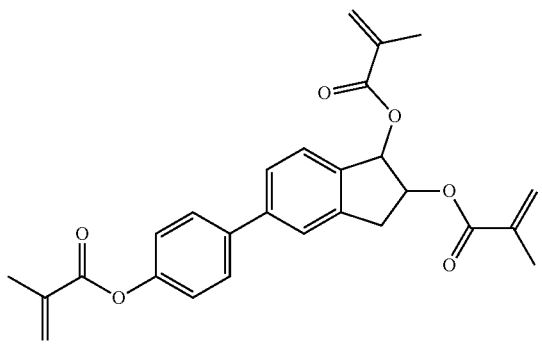 [SMILES: C=C(C)C(=O)Oc1ccc(-c2ccc3c(c2)CC(OC(=O)C(=C)C)C3OC(=O)C(=C)C)cc1]

the route of the preparation thereof is as follows:

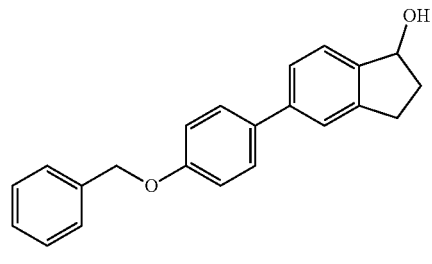

8 dehydration →

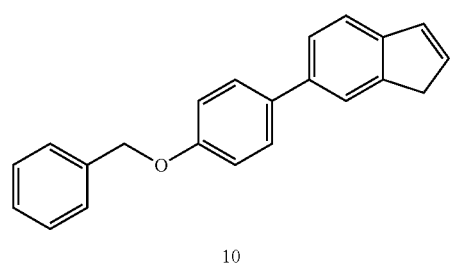

10 oxidation →

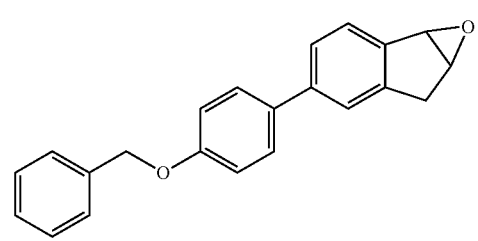

11

→

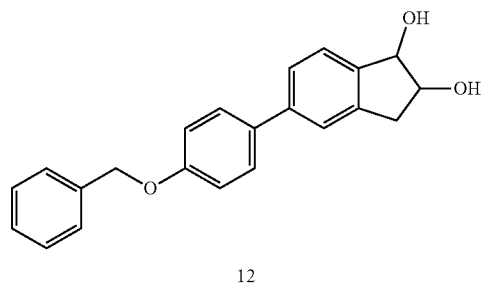

12

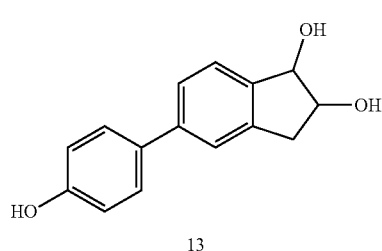

13

+

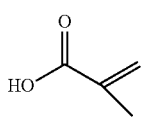

DCC →

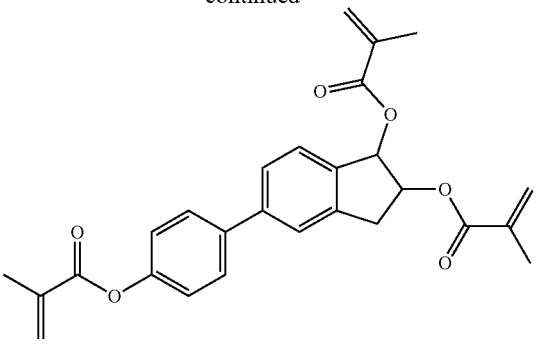

Specific operation procedures of the preparation:

Intermediate 10

To a 1 L three-necked flask, 0.1 mole of intermediate 8, 5 g of p-toluenesulfonic acid, and 0.5 L of toluene are added, and the system is stirred and warmed to reflux for water separation for 2 hours. The system is poured into a column containing 20 g of silica gel, and rinsed with 0.5 L of toluene, and the eluent is washed three times with water to neutral, and subjected to rotary drying to give intermediate 10.

Intermediate 11

To a 1 L three-necked flask, 0.05 moles of a raw material and 0.5 L of dichloromethane are added, the temperature is reduced to 0° C., N2 is provided for protection, and metachloroperbenzoic acid is added in portions, and after the addition is completed, the mixture is stirred at room temperature overnight. After the reaction is completed, 20 g of silica gel is added to the system, the system is subjected to rotary drying, and passed through a column for separation to obtain intermediate 11

Intermediate 12

To a 1 L three-necked flask, 0.04 moles of intermediate 11, 0.5 L of toluene, 0.1 L of absolute ethanol, and 10 g of palladium on carbon (5%) are added, evacuation is carried out 5 times with nitrogen gas and 3 times with hydrogen gas, hydrogenation is carried for 3 hours, the system is poured into a column containing 20 g of silica gel, and rinsed with 0.5 L of toluene, and the eluent is washed three times with water to neutral, and subjected to rotary drying to give intermediate 12

Product I-14-1

To a 1 L three-necked flask, 0.03 moles of intermediate 12, 0.15 moles of methacrylic acid, and 0.5 L of toluene are added, the temperature is reduced to 0° C. under the protection of nitrogen, the temperature is controlled at 0-5° C., 0.25 moles of DCC is added, and after the addition is complete, the temperature is naturally raised to room temperature (about 25° C.) for reaction for 12 hours. 500 ml of water is added, liquid separation is carried out, the aqueous phase is extracted with 100 ml×2 of toluene, the organic phases are combined and washed with 500 ml×2 of a saline solution, after the washing is complete, the organic phase is dried over anhydrous sodium sulfate and evaporated to dryness, 30 g of silica gel and 3 folds of petroleum ether (90-120° C.) are taken for passing a column, the column is rinsed with 2 folds of petroleum ether (90-120° C.), and after evaporation, 2 folds of ethanol is used for recrystallisation to give product I-14-1

By using a similar method, products of

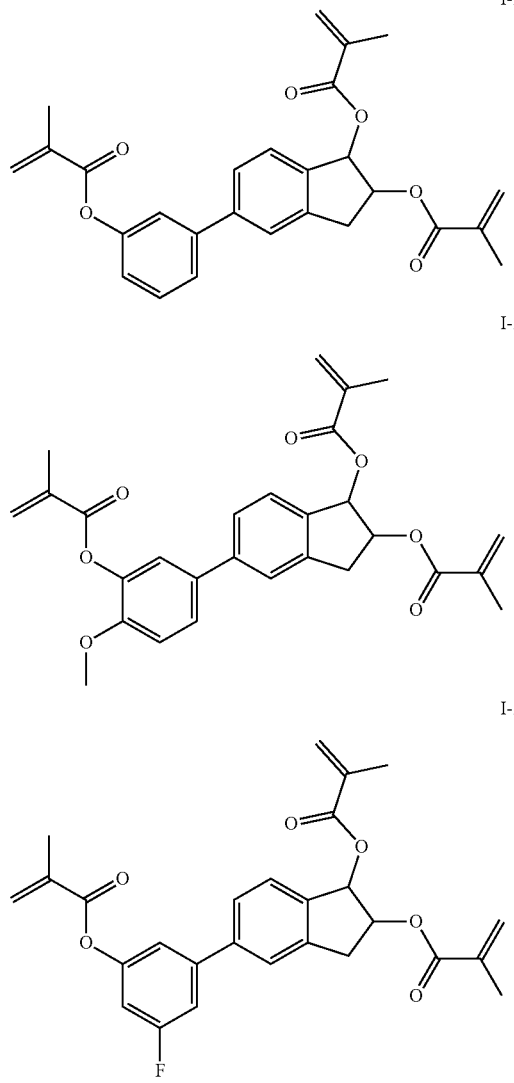

are obtained

Example 5

The structural formula of the polymerizable compound is as represented by the following formula I-3-2:

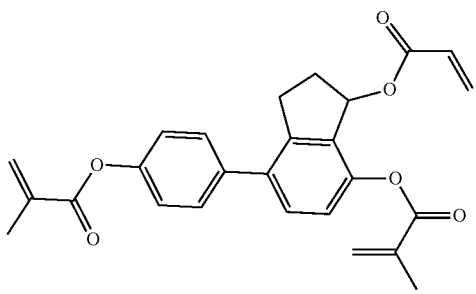

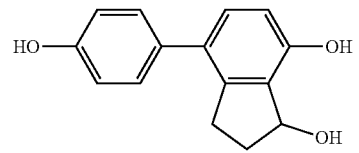

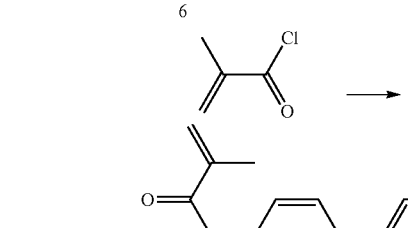

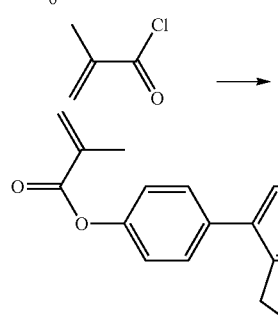

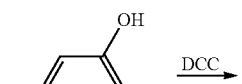

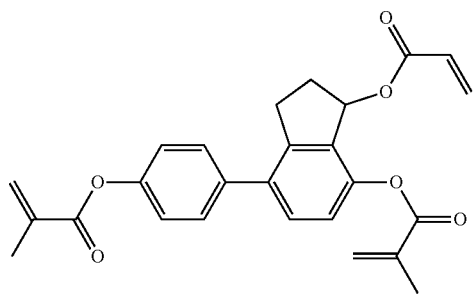

Intermediate 14

To a 1 L three-necked flask, 0.1 mole of intermediate 6, 0.22 moles of methacryloyl chloride, 0.15 L of triethylamine and 0.5 L of toluene are added, and the reaction is carried out at room temperature (about 25° C.) for 12 hours. 500 ml of water is added, liquid separation is carried out, the aqueous phase is extracted with 100 ml×2 of toluene, the organic phases are combined and washed with 500 ml×2 of a saline solution, after the washing is complete, the organic phase is dried over anhydrous sodium sulfate and evaporated to dryness, 30 g of silica gel and 3 folds of petroleum ether (90-120° C.) are taken for passing a column, the column is rinsed with 2 folds of petroleum ether (90-120° C.), and after evaporation, 2 folds of ethanol is used for recrystallisation to give intermediate 14.

Product I-3-2

To a 1 L three-necked flask, 0.05 moles of intermediate 6, 0.06 moles of acrylic acid, and 0.5 L of toluene are added, the temperature is reduced to 0° C. under the protection of nitrogen, the temperature is controlled at 0-5° C., 0.25 moles of DCC is added, and after the addition is complete, the temperature is naturally raised to room temperature (about 25° C.) for reaction for 12 hours. 500 ml of water is added, liquid separation is carried out, the aqueous phase is extracted with 100 ml×2 of toluene, the organic phases are combined and washed with 500 ml×2 of a saline solution, after the washing is complete, the organic phase is dried over anhydrous sodium sulfate and evaporated to dryness, 30 g of silica gel and 3 folds of petroleum ether (90-120° C.) are taken for passing a column, the column is rinsed with 2 folds of petroleum ether (90-120° C.), and after evaporation, 2 folds of ethanol is used for recrystallisation to give product I-3-2.

By using similar conditions, products of

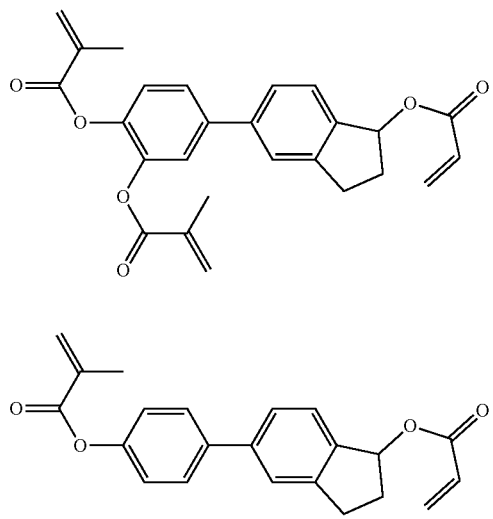

are obtained

Example 6

The structural formula of the polymerizable compound is as represented by the following formula I-9-14:

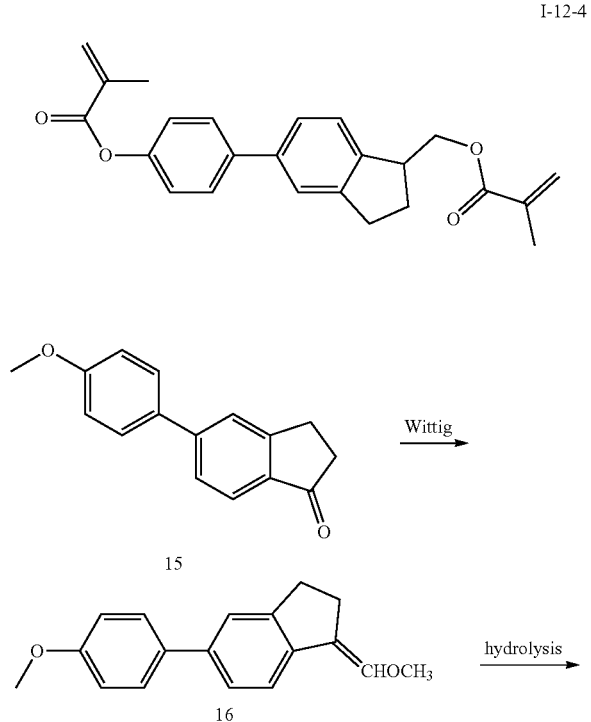

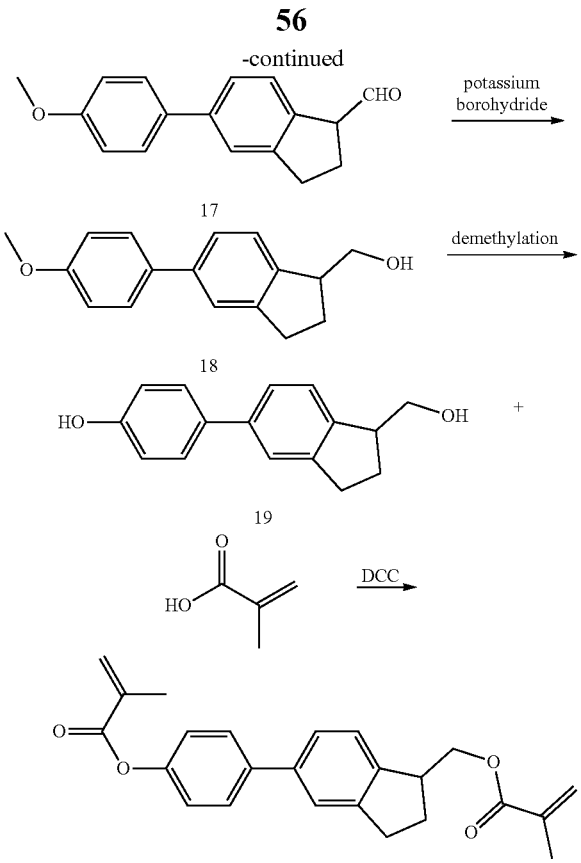

Specific operation procedures of the preparation:

Intermediate 16

To a 5 L three-necked flask, 0.1 mole of a chloromethyl ether triphenylphosphine salt and 0.8 L of tetrahydrofuran are added, the mixture is cooled to 0° C. under stirring, 0.11 moles of potassium tert-butoxide is added in portions, and after the addition is complete, the temperature is controlled at 0-5° C. for reaction for 2 h. Raw material 15 is dissolved in 10 folds of tetrahydrofuran, the tetrahydrofuran is dropwise added to a reaction flask, the temperature is controlled at 0-5° C., and after the dropwise addition for reaction is completed in 3 hours, the temperature is naturally raised to room temperature (about 25° C.) for reaction at room temperature for 8 hours. 1 L of water is added to the system, the system is subjected to liquid separation, the aqueous phase is subjected to extraction with petroleum ether, washed with aqueous ethanol three times, dried over anhydrous sodium sulfate, and subjected to rotary drying, and recrystallization is carried out with aqueous ethanol to give intermediate 16.

Intermediate 17

To a 2 L three-necked flask, intermediate 16 from the above step, 0.5 L of dichloromethane and 0.5 L of acetone are added, the mixture is cooled to 0° C. under stirring, an aqueous hydrochloric acid solution is dropwise added, the temperature is controlled at 0-10° C. or less, the dropwise addition is completed within 1 h, the temperature is controlled at 0° C. for reaction for 12 h, the reaction liquid is poured to 1 kg of water, stirred for 15 minutes and subjected to liquid separation to separate out most (about 0.5 L) of the dichloromethane, 0.5 L of dichloromethane is added to the aqueous phase, the aqueous phase is stirred until the solid is completely dissolved, and is subjected to liquid separation, the aqueous phase is subjected to extraction with 0.2 L×2 of dichloromethane, the organic phases are combined, washed with water and subjected to clean water separation, 0.5 kg of anhydrous sodium sulfate is added for drying for 4 hours, the solvent is removed by means of rotary drying, and recrystallization is carried out using 5 folds of petroleum ether to give intermediate 17.

Intermediate 18

To a 2 L three-necked flask, 0.05 moles of intermediate 17, 0.5 L of tetrahydrofuran, and 0.02 L of water are added, the temperature is reduced to 0° C., 0.1 mole of potassium borohydride is added in portions, the temperature is controlled at 0° C. for reaction for 3 h, and the temperature is naturally raised to room temperature (about 25° C.) for reaction at room temperature for 8 hours. 100 L of water is added to the system, the pH is then adjusted to 6-7 with dilute acid, the system is subjected to liquid separation, and the aqueous phase is subjected to extraction with ethyl acetate, dried over anhydrous sodium sulfate and subjected to rotary drying to give intermediate 18.

Intermediate 19

To a 2 L three-necked flask, intermediate 18 from the above step and 0.5 L of dichloromethane are added, the mixture is cooled to 0° C. under stirring, 4.5 folds by mole of boron tribromide is dropwise added, the temperature is controlled at 0° C. or less, the dropwise addition is completed within 1 h, the temperature is controlled at 0° C. for reaction for 12 h, the reaction liquid is poured to 1 kg of water, stirred for 15 minutes and subjected to liquid separation to separate out most (about 0.5 L) of the dichloromethane, 0.5 L of ethyl acetate is added to the aqueous phase, the aqueous phase is stirred until the solid is completely dissolved, and is subjected to liquid separation, the aqueous phase is subjected to extraction with 0.2 L×2 of ethyl acetate, the organic phases are combined, washed with water and subjected to clean water separation, 0.5 kg of anhydrous sodium sulfate is added for drying for 4 hours, the solvent is removed by means of rotary drying, and recrystallization is carried out using 5 folds of petroleum ether to give intermediate 19

Product I-12-4

To a 1 L three-necked flask, 0.02 moles of intermediate 19, 0.07 moles of methacrylic acid, and 0.5 L of toluene are added, the temperature is reduced to 0° C. under the protection of nitrogen, the temperature is controlled at 0-5° C., 0.09 moles of DCC is added, and after the addition is complete, the temperature is naturally raised to room temperature (about 25° C.) for reaction for 8 hours. 500 ml of water is added, liquid separation is carried out, the aqueous phase is extracted with 100 ml×2 of toluene, the organic phases are combined and washed with 500 ml×2 of a saline solution, after the washing is complete, the organic phase is dried over anhydrous sodium sulfate and evaporated to dryness, 30 g of silica gel and 3 folds of petroleum ether (90-120° C.) are taken for passing a column, the column is rinsed with 2 folds of petroleum ether (90-120° C.), and after evaporation, 2 folds of ethanol is used for recrystallisation to give product I-12-4

By using similar process conditions, the following monomers are prepared:

I-12-6

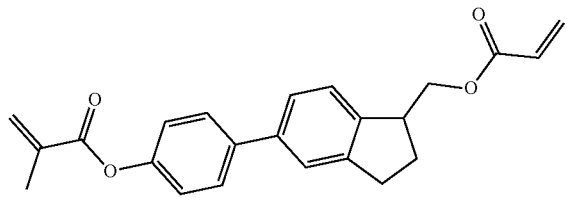

I-15-3

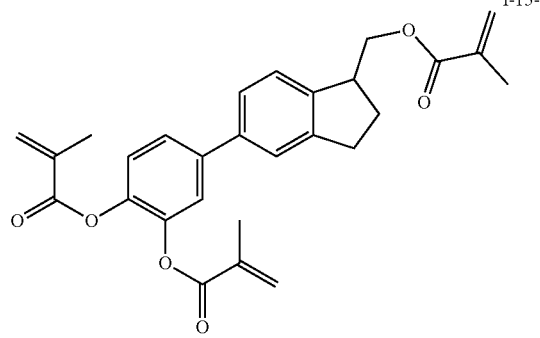

I-16-3

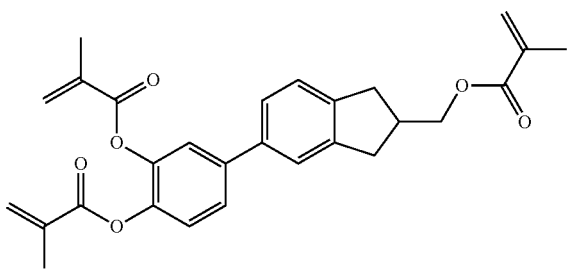

I-17-4

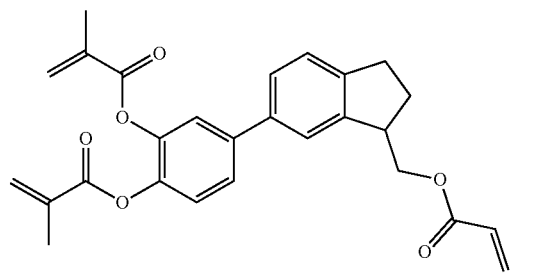

I-21-3

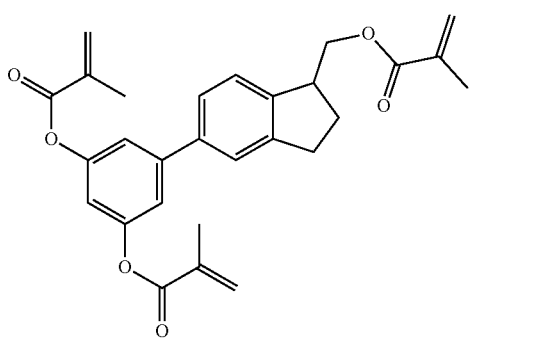

59

Comparative Example 1 (RM-1)

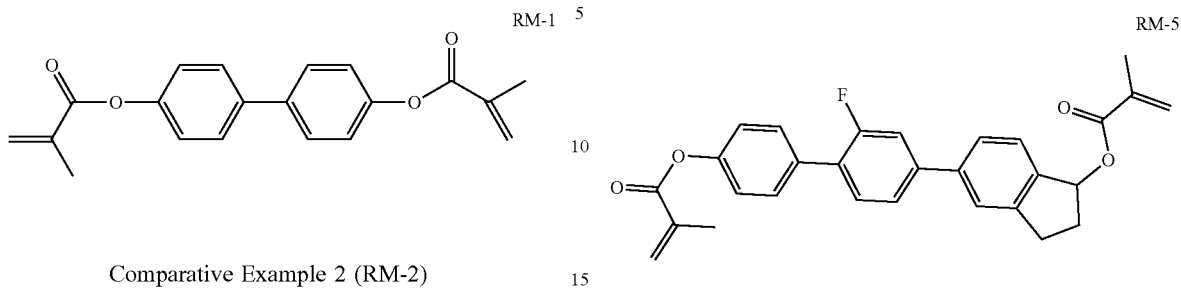

Comparative Example 2 (RM-2)

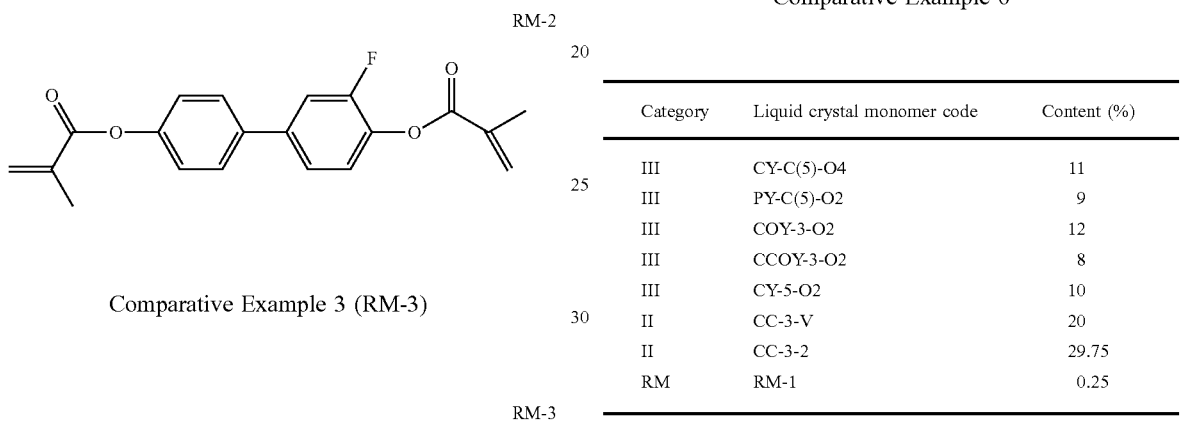

Comparative Example 3 (RM-3)

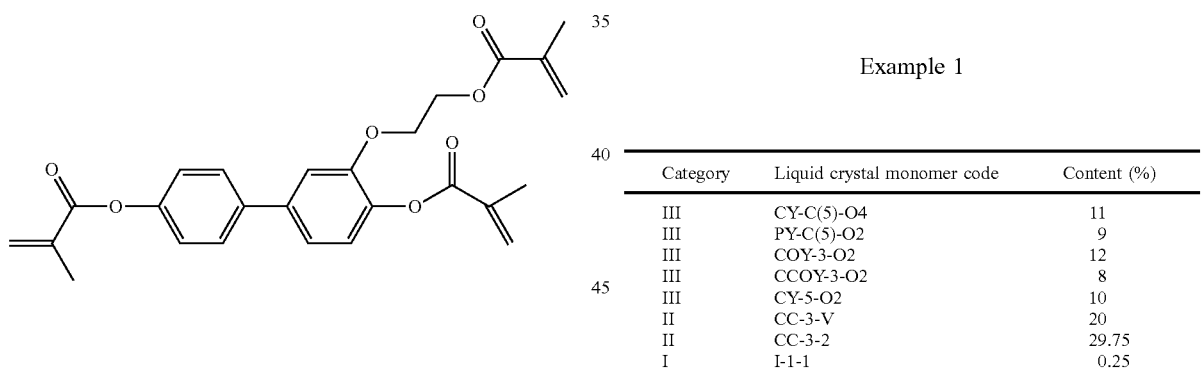

Comparative Example 4 (RM-4)

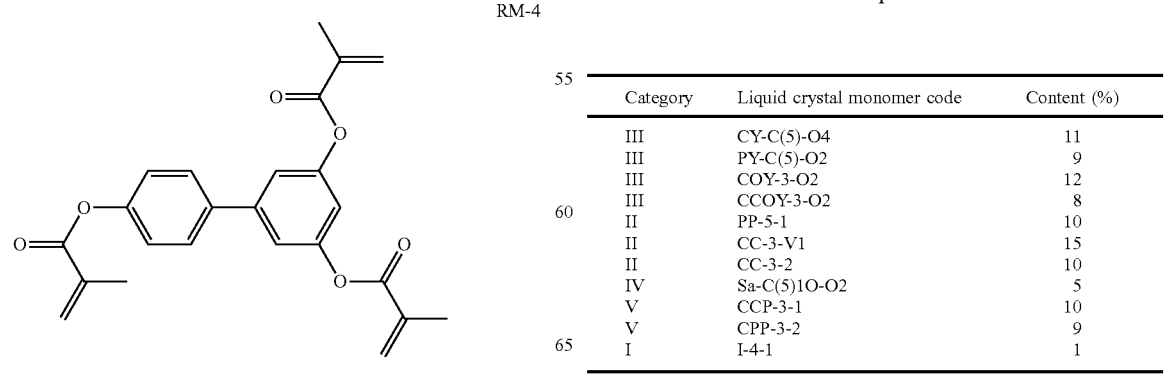

60

Comparative Example 5 (RM-5)

Comparative Example 6

| Category | Liquid crystal monomer code | Content (%) |
|---|---|---|
| III | CY-C(5)-O4 | 11 |
| III | PY-C(5)-O2 | 9 |
| III | COY-3-O2 | 12 |
| III | CCOY-3-O2 | 8 |
| III | CY-5-O2 | 10 |
| II | CC-3-V | 20 |
| II | CC-3-2 | 29.75 |
| RM | RM-1 | 0.25 |

Example 1

| Category | Liquid crystal monomer code | Content (%) |
|---|---|---|
| III | CY-C(5)-O4 | 11 |
| III | PY-C(5)-O2 | 9 |
| III | COY-3-O2 | 12 |
| III | CCOY-3-O2 | 8 |
| III | CY-5-O2 | 10 |
| II | CC-3-V | 20 |
| II | CC-3-2 | 29.75 |
| I | I-1-1 | 0.25 |

Example 2

| Category | Liquid crystal monomer code | Content (%) |
|---|---|---|
| III | CY-C(5)-O4 | 11 |
| III | PY-C(5)-O2 | 9 |
| III | COY-3-O2 | 12 |
| III | CCOY-3-O2 | 8 |
| II | PP-5-1 | 10 |
| II | CC-3-V1 | 15 |
| II | CC-3-2 | 10 |
| IV | Sa-C(5)1O-O2 | 5 |
| V | CCP-3-1 | 10 |
| V | CPP-3-2 | 9 |
| I | I-4-1 | 1 |

Example 3

| Category | Liquid crystal monomer code | Content (%) |
|---|---|---|
| III | CCY-C(5)-O4 | 11 |
| III | CPY-C(5)-O2 | 9 |
| III | CCY-3-O2 | 12 |
| IV | Sa-C(3) 1O-O4 | 8 |
| II | PP-1-2V | 10 |
| II | CC-3-V1 | 25 |
| II | CP-3-O2 | 5 |
| V | CLP-3-1 | 12 |
| V | CPP-3-O2 | 7.8 |
| I | I-3-1 | 0.2 |

Example 4

| Category | Liquid crystal monomer code | Content (%) |
|---|---|---|
| III | CCY-3-O2 | 11 |
| III | CPY-3-O2 | 9 |
| III | PYP-3-O2 | 12 |
| III | CLY-5-O2 | 10 |
| IV | Sb-C(5) 1O-O4 | 8 |
| II | PP-5-1 | 10 |
| II | CC-3-V | 25 |
| II | CC-3-2 | 5 |
| V | CCP-3-1 | 4.8 |
| VI | CPGIP-5-2 | 5 |
| I | I-8-1 | 0.2 |

Example 5

| Category | Liquid crystal monomer code | Content (%) |
|---|---|---|
| III | CCY-3-O2 | 11 |
| III | CPY-3-O2 | 9 |
| III | PYP-3-O2 | 10 |
| III | CCOY-5-O2 | 10 |
| III | COY-3-O2 | 10 |
| IV | Sb-C(5) 1O-O4 | 10 |
| II | CC-3-V | 20 |
| V | CCP-3-1 | 4.9 |
| V | CPP-V-1 | 5 |
| VI | CGPC-3-1 | 10 |
| I | I-12-1 | 0.1 |

Example 6

| Category | Liquid crystal monomer code | Content (%) |
|---|---|---|
| III | CY-C(5)-O4 | 11 |
| III | PY-C(5)-O2 | 9 |
| III | COY-3-O2 | 12 |
| III | CCOY-3-O2 | 8 |
| III | CY-5-O2 | 10 |
| II | CC-3-V | 20 |
| II | CC-3-2 | 29.75 |
| I | I-15-1 | 0.25 |

Example 7

| Category | Liquid crystal monomer code | Content (%) |
|---|---|---|
| III | CY-C(5)-O4 | 11 |
| III | PY-C(5)-O2 | 9 |
| III | COY-3-O2 | 12 |
| III | CCOY-3-O2 | 8 |
| II | PP-5-1 | 10 |
| II | CC-3-V1 | 15 |
| II | CC-3-2 | 10 |
| IV | Sa-C(5)1O-O2 | 5 |
| V | CCP-3-1 | 10 |
| V | CPP-3-2 | 9 |
| I | I-16-1 | 1 |

Example 8

| Category | Liquid crystal monomer code | Content (%) |
|---|---|---|
| III | CCY-C(5)-O4 | 11 |
| III | CPY-C(5)-O2 | 9 |
| III | CCY-3-O2 | 12 |
| IV | Sa-C(3) 1O-O4 | 8 |
| II | PP-1-2V | 10 |
| II | CC-3-V1 | 25 |
| II | CP-3-O2 | 5 |
| V | CLP-3-1 | 12 |
| V | CPP-3-O2 | 7.8 |
| I | I-14-1 | 0.2 |

Example 9

| Category | Liquid crystal monomer code | Content (%) |
|---|---|---|
| III | CCY-3-O2 | 11 |
| III | CPY-3-O2 | 9 |
| III | PYP-3-O2 | 12 |
| III | CLY-5-O2 | 10 |
| IV | Sb-C(5) 1O-O4 | 8 |
| II | PP-5-1 | 10 |
| II | CC-3-V | 25 |
| II | CC-3-2 | 5 |
| V | CCP-3-1 | 4.8 |
| VI | CPGIP-5-2 | 5 |
| I | I-3-2 | 0.2 |

Example 10

| Category | Liquid crystal monomer code | Content (%) |
|---|---|---|
| III | CCY-3-O2 | 11 |
| III | CPY-3-O2 | 9 |
| III | PYP-3-O2 | 10 |
| III | CCOY-5-O2 | 10 |
| III | COY-3-O2 | 10 |
| IV | Sb-C(5) 1O-O4 | 10 |
| II | CC-3-V | 20 |
| V | CCP-3-1 | 4.9 |
| V | CPP-V-1 | 5 |
| VI | CGPC-3-1 | 10 |
| I | I-15-2 | 0.1 |

1. Conversion rate of polymerizable compound

Determination of the Rate of Polymerization of a Liquid Crystal Medium Prepared from a Polymerizable Compound in a Liquid Crystal Display Device:

to a mixture in Comparative Example 6, from which RM-1 is omitted, as parent MUTY, polymerizable compound RMs of Examples 1-6 are respectively added thereto in an amount of 2500 ppm; for comparison, equivalent amounts of the RMs of Comparative Examples 1-5 are respectively added to the MUTY, liquid crystal media are prepared by means of the above-mentioned liquid crystal medium preparation method, the liquid crystal media are injected into liquid crystal cells, the PSA panel process is simulated, and the rate of polymerization thereof is determined, with the specific conditions being: UV1: 80 mW/cm$^2$@365 nm, 200 s; and UV2: 5 mW/cm$^2$@365 nm, 120 min, and the liquid crystal cells are further cut open for HPLC analysis, with the results being as shown in table 4 below.

| Sample composition | Addition amount | Residual amount | Conversion rate | Tilt angle after UV |
|---|---|---|---|---|
| (Comparative Example 1) RM-1 | 2500 | 478 | 81% | 81.2 |
| (Comparative Example 2) RM-2 | 2500 | 617 | 75% | 83.1 |
| (Comparative Example 3) RM-3 | 2500 | 560 | 78% | 87.2 |
| (Comparative Example 4) RM-4 | 2500 | 400 | 84% | 88.1 |
| (Comparative Example 5) RM-5 | 2500 | 120 | 95% | 78.2 |
| I-1-1; | 2500 | 460 | 82% | 82.1 |
| I-4-1 | 2500 | 370 | 85% | 84.1 |
| I-9-1 | 2500 | 368 | 85% | 85.2 |
| I-3-1 | 2500 | 350 | 86% | 84.5 |
| I-8-1 | 2500 | 340 | 86% | 85.5 |
| I-8-2 | 2500 | 368 | 85% | 84.2 |
| I-12-1 | 2500 | 465 | 81% | 82.3 |
| I-12-2 | 2500 | 480 | 81% | 83.1 |
| I-15-1 | 2500 | 360 | 86% | 85.3 |
| I-16-1 | 2500 | 380 | 85% | 85.2 |
| I-14-1 | 2500 | 300 | 88% | 80.2 |
| I-20-1 | 2500 | 300 | 88% | 81.2 |
| I-20-2 | 2500 | 290 | 88% | 80.2 |
| I-20-3 | 2500 | 310 | 88% | 82.2 |

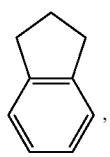

As can be seen from the conversion rate, due to the presence of the reaction rate is accelerated and the conversion rate is increased within the same time, and the polymerizable compound provided by the present invention is superior to the prior art of the comparative examples.

In addition, with the same rapid reaction time as in Comparative Example 4, there is also a uniform, fine and dense particle morphology, and the formed pretilt angle is optimized. It can be seen that the angles formed by Comparative Example 3 and Comparative Example 4 are too large, that is, smaller pretilt angles, which will cause the response time to be slow. After the introduction of

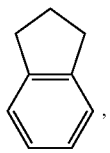

the pretilt angle is improved, and therefore the response time can be shortened.

However, due to the reaction time being too fast, Comparative Example 5 results in the formed particles being larger and uneven and the formed pretilt angle being too large, causing a phenomenon of light leakage. The polymerizable compound provided by the present invention results in the formed particles being uniform and an appropriate pretilt angle while maintaining a faster reaction time, the technical advantages being obvious.

2. Response Time

Mixtures prepared from various polymerizable compounds and liquid crystal compounds are injected into devices. After the polymeric compounds are polymerized by means of irradiation with ultraviolet light, the response times of the devices are measured. Where a mixture of a polymeric compound and a liquid crystal compound is not added, the response time is slow. Therefore, it can be concluded that the combination of the polymeric compound and the liquid crystal compound, referred to in the present invention, is effective in shortening the response time.

| Example | Response time (ms) |
|---|---|
| Comparative Example 5 | 15.3 |
| Example 1 | 11.2 |
| Example 2 | 7.9 |
| Example 3 | 10.3 |
| Example 4 | 8.4 |
| Example 5 | 9.2 |
| Example 6 | 10.2 |
| Example 7 | 9.6 |
| Example 8 | 9.5 |
| Example 9 | 8.2 |
| Example 10 | 9.3 |

3. Reliability

Mixtures prepared from various polymerizable compounds and liquid crystal compounds are injected into test cells. After the polymeric compound is polymerized by means of irradiation with ultraviolet light, the voltage holding ratio (VHR) is measured under the conditions of ultraviolet light, high temperature, etc., and a highly reliable liquid crystal, i.e., having a high VHR (16.7 ms), is preferred.

| Example | VHR (16.7 ms) (%) |
|---|---|
| Comparative Example 5 | 99.0 |
| Example 1 | 99.81 |
| Example 2 | 99.90 |
| Example 3 | 99.81 |
| Example 4 | 99.93 |
| Example 5 | 99.70 |
| Example 6 | 99.81 |
| Example 7 | 99.90 |
| Example 8 | 99.81 |
| Example 9 | 99.93 |
| Example 10 | 99.70 |

The invention claimed is:
1. A polymerizable liquid crystal compound represented by formulas I-1 to I-23:
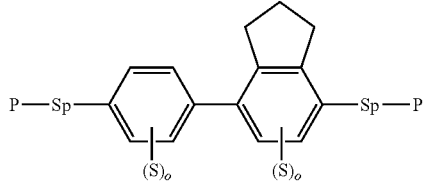
I-1
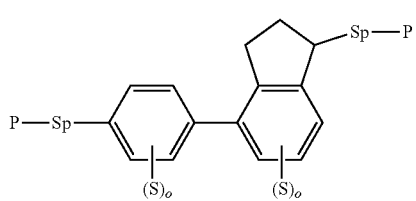
I-2
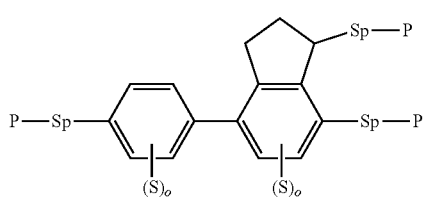
I-3
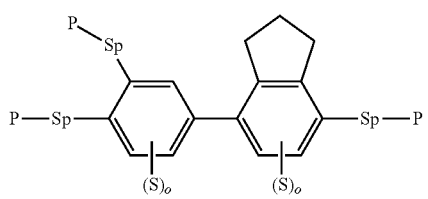
I-4
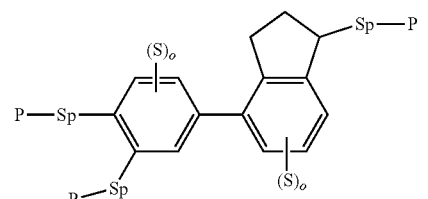
I-5
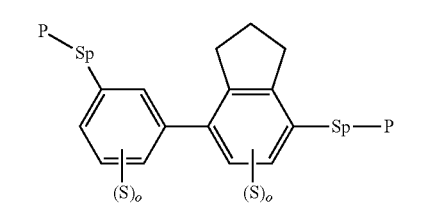
I-6
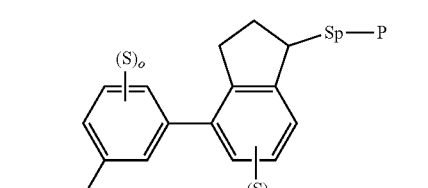
I-7
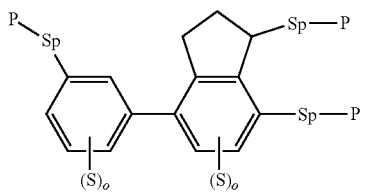
I-8
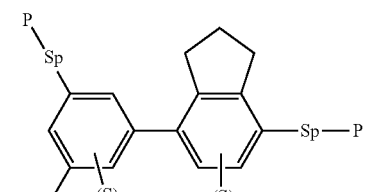
I-9
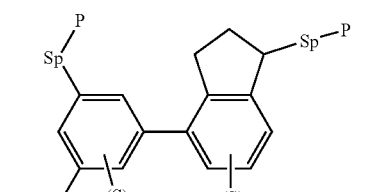
I-10
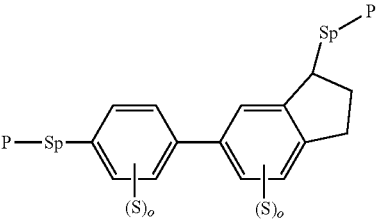
I-11
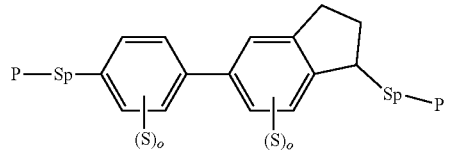
I-12
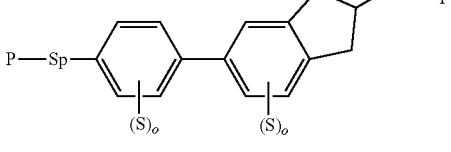
I-13
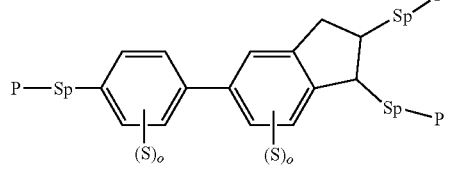
I-14
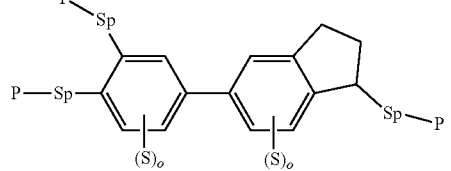
I-15

-continued

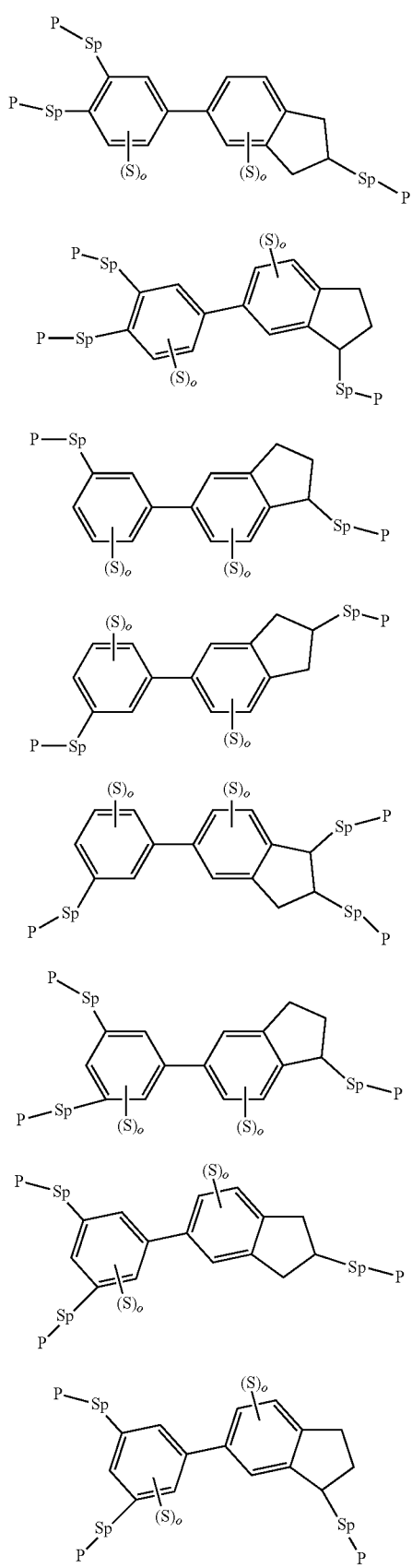

I-16

I-17

I-18

I-19

I-20

I-21

I-22

I-23 wherein each S independently represents H, a C1-C5 alkyl group, a C1-C5 alkoxy group, a fluorine-substituted C1-C5 alkyl group, a fluorine-substituted C1-C5 alkoxy group, F or Cl, wherein any one or more unconnected CH$_2$ may be independently replaced by —O—, —S—, —CO—, —CH$_2$O—, —OCH$_2$—, —COO—, —OOC— or an acrylate group or a methacrylate group;

each P independently represents

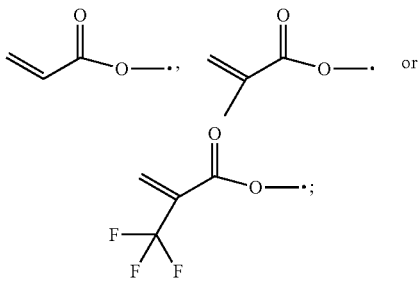

each Sp independently represents a single bond, a C1-C5 alkyl group, a C1-C5 alkenyl group, wherein any one or more unconnected CH$_2$ may be replaced by —O—, —S—, —CO—, —CH$_2$O—, —OCH$_2$—, —COO—, —OOC— or an acrylate group;

and each o independently represents 0, 1, 2 or 3.

2. The polymerizable liquid crystal compound according to claim 1, wherein the compound represented by formula I-1 to I-23 is a compound represented by formulas I-1-1 to I-23-4:

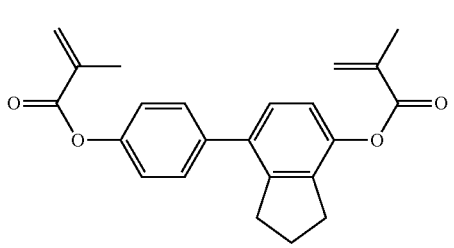

I-1-1

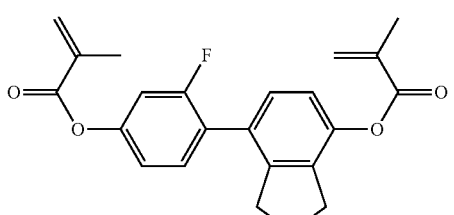

I-1-2

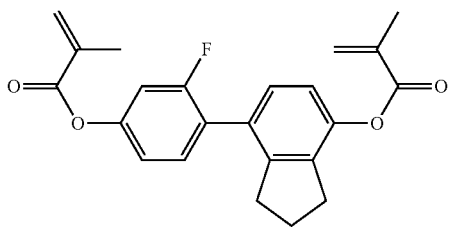

I-1-3

-continued
I-1-4
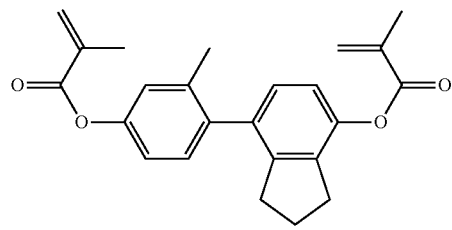
I-1-5
I-1-6
I-1-7
I-1-8
I-1-9
I-1-10
-continued
I-1-11
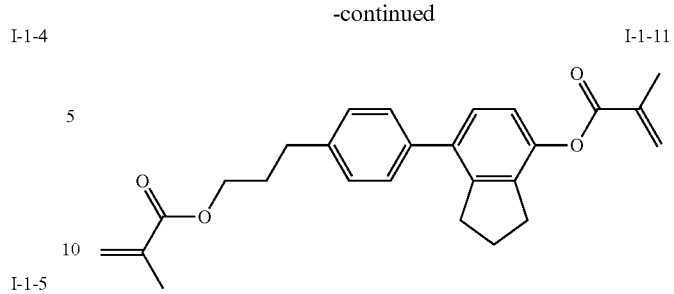
I-1-12
I-2-1
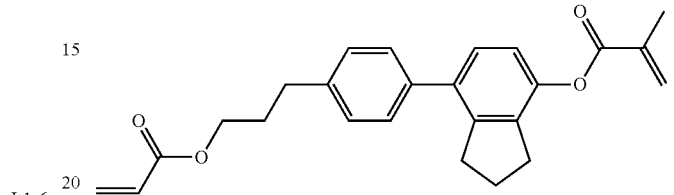
I-2-2
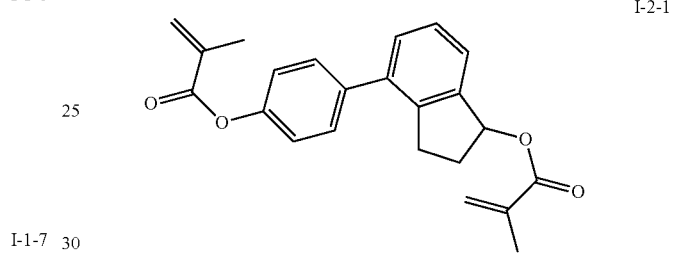
I-2-3
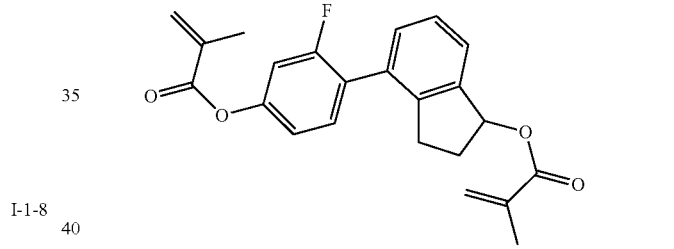
I-2-4
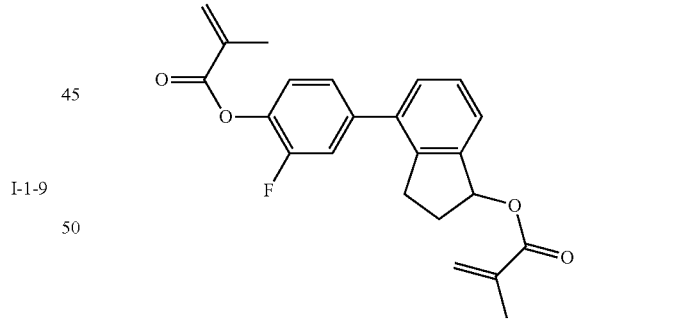

I-2-5
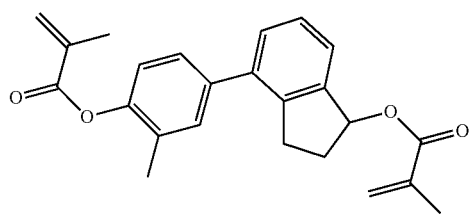
I-2-6
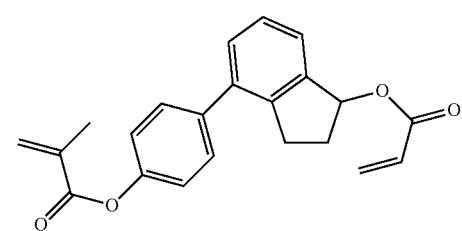
I-2-7
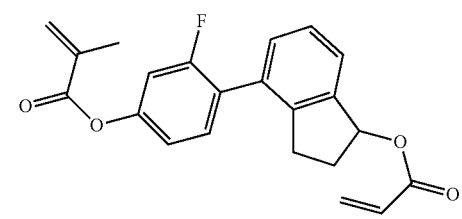
I-2-8
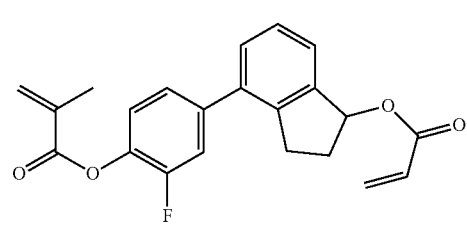
I-2-9
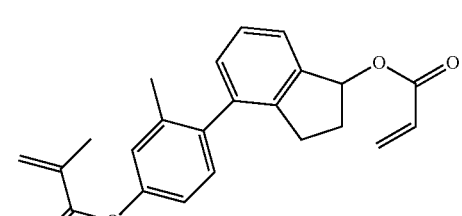
I-2-10
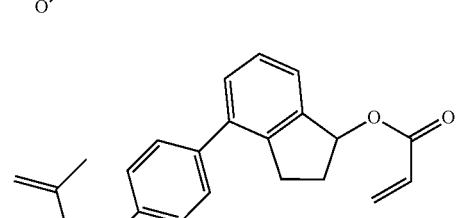
I-2-11
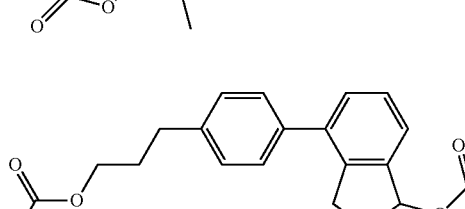
I-2-12
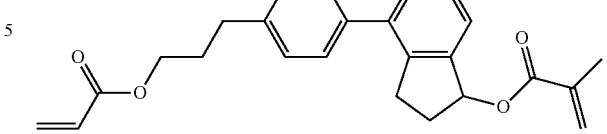
I-3-1
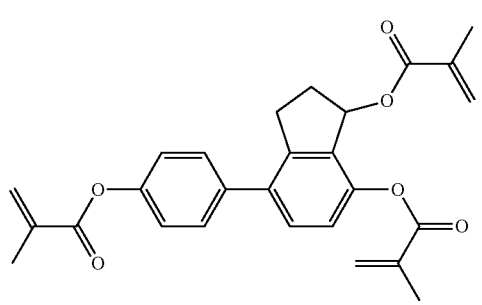
I-3-2
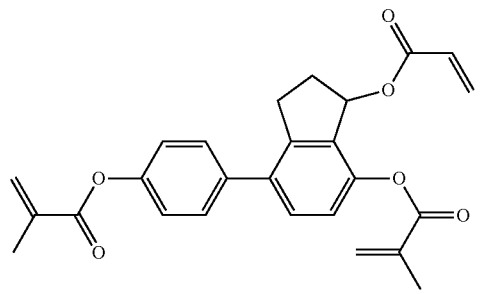
I-3-3
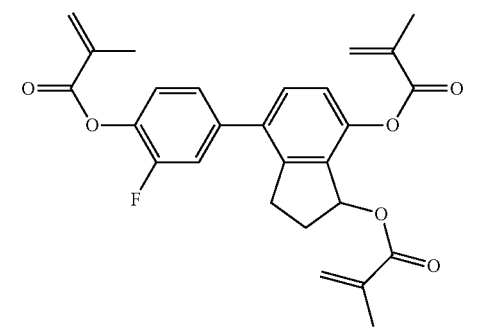
I-3-4
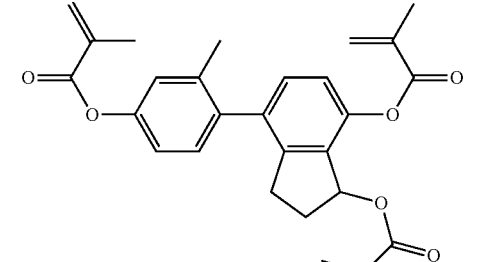

I-3-5
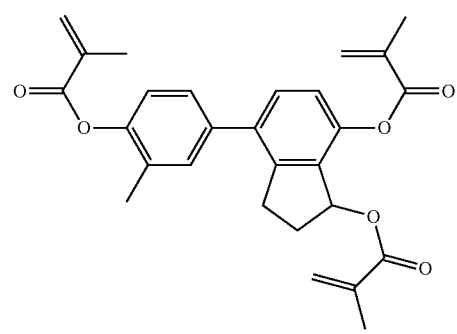
I-3-6
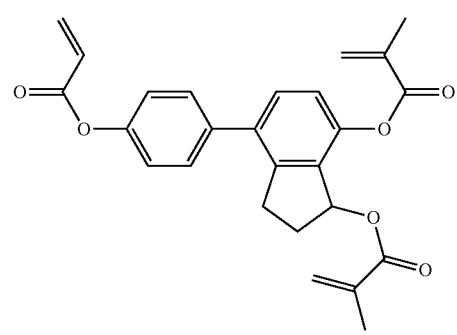
I-3-7
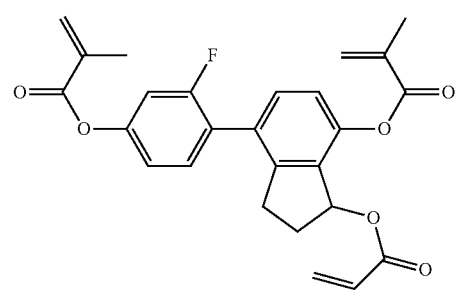
I-3-8
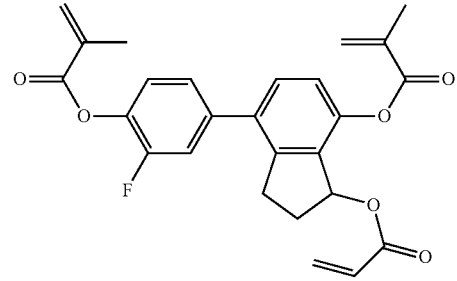
I-3-9
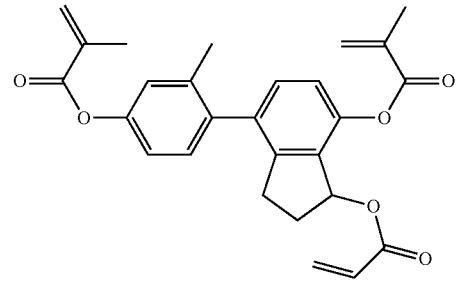
I-3-10
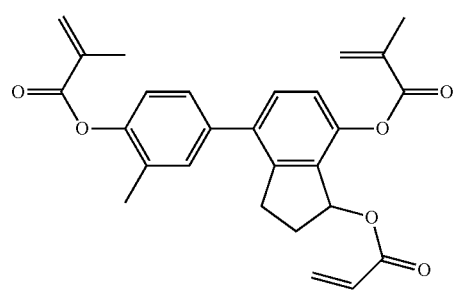
I-3-11
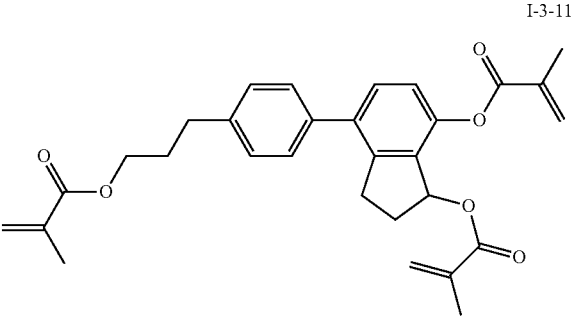
I-3-12
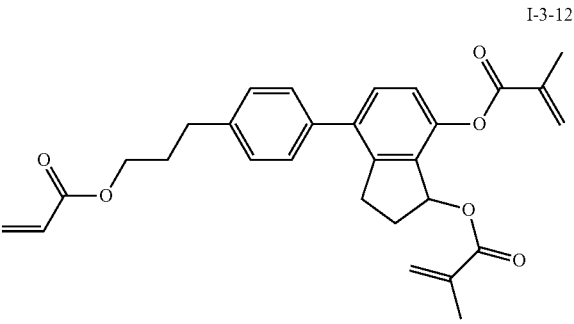
I-3-13
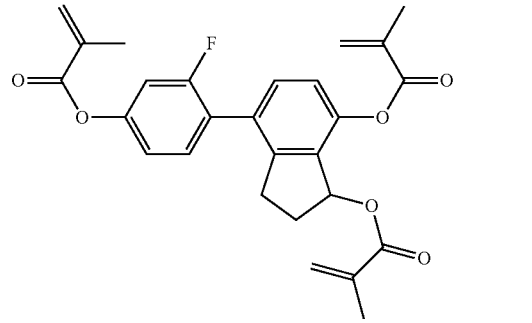
I-4-1
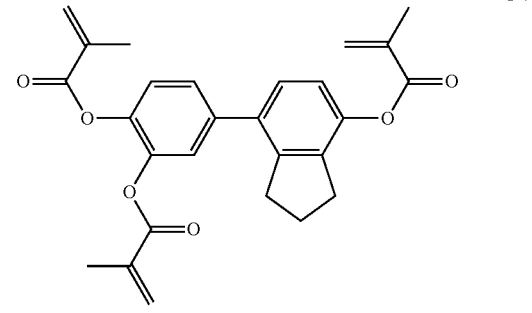

I-4-2
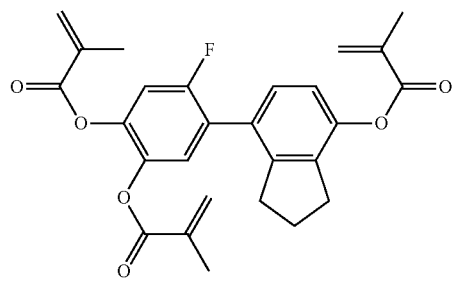
I-4-3
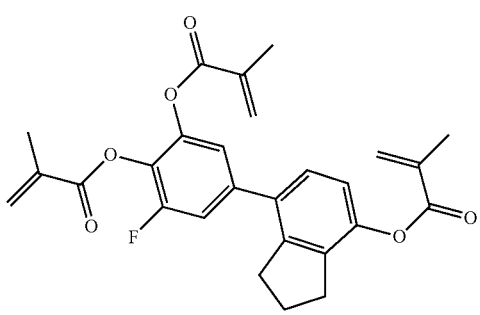
I-5-1
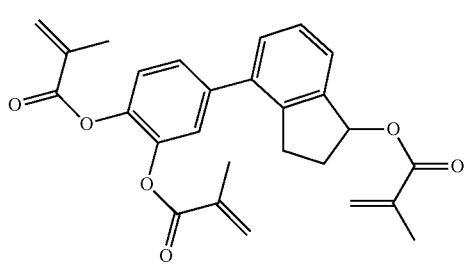
I-5-2
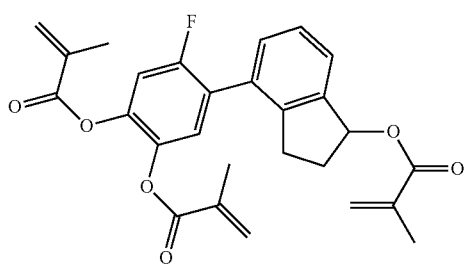
I-5-3
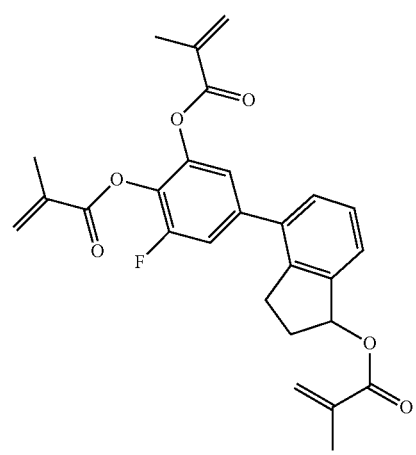
I-5-4
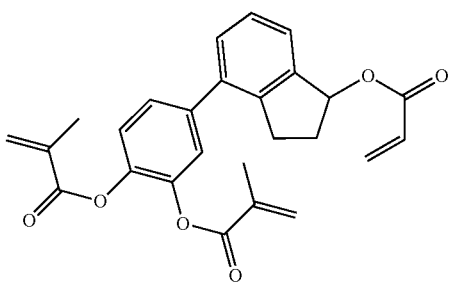
I-5-5
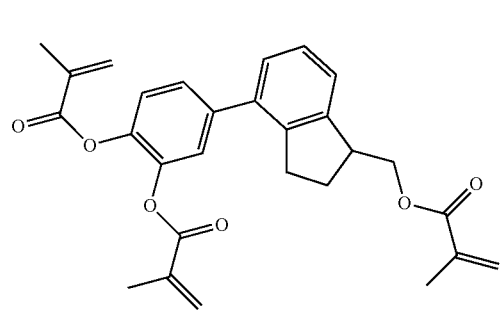
I-5-6
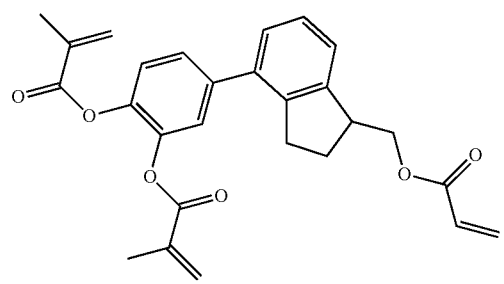
I-6-1
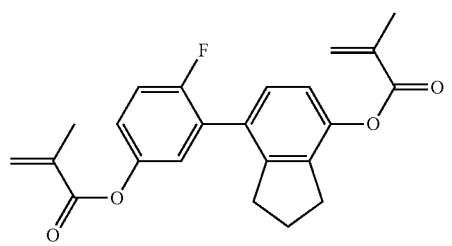
I-6-2
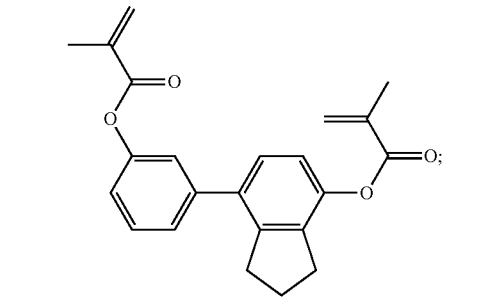

I-6-3
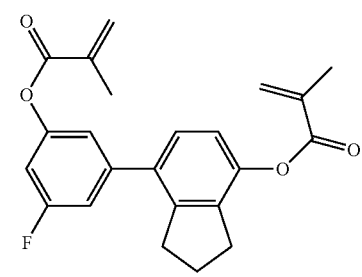
I-6-4
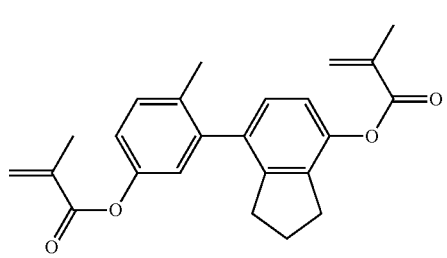
I-6-5
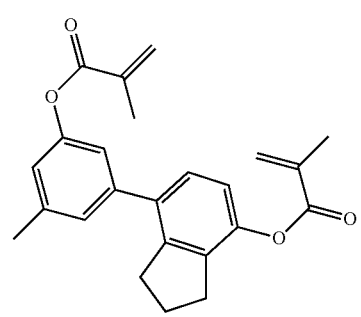
I-6-6
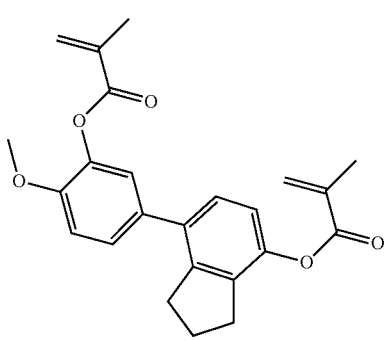
I-7-1
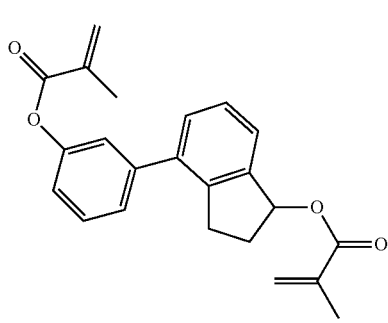
I-7-2
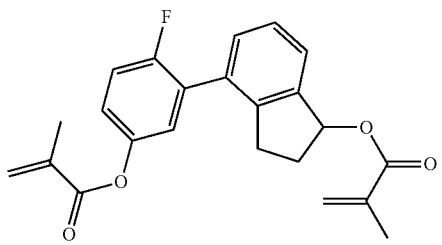
I-7-3
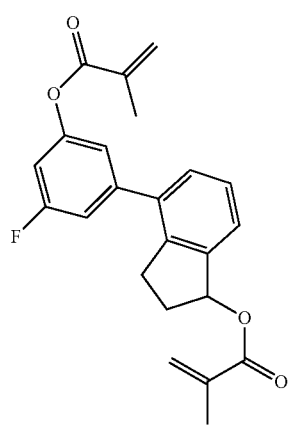
I-7-4
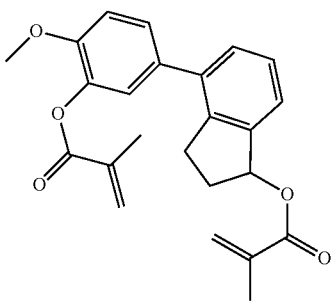
I-7-5
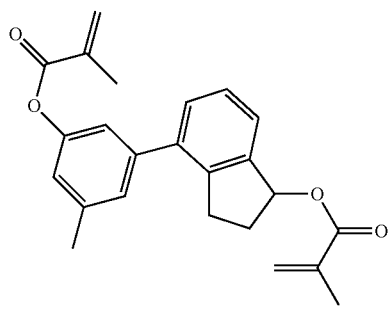
I-7-6
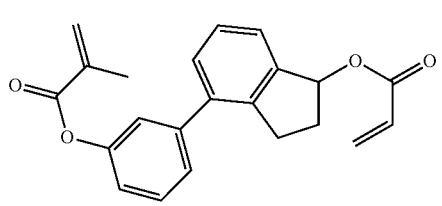

-continued
I-7-7
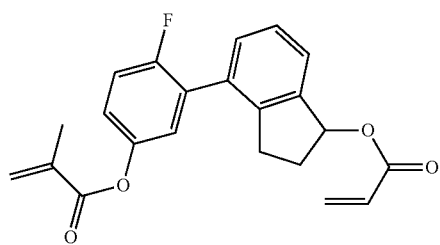
I-7-8
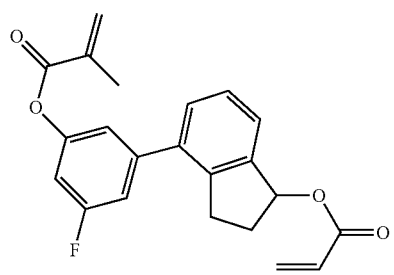
I-7-9
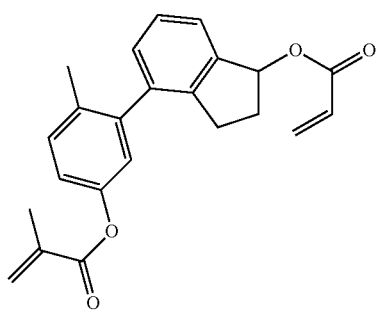
I-7-10
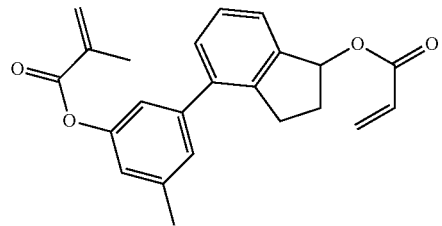
I-8-1
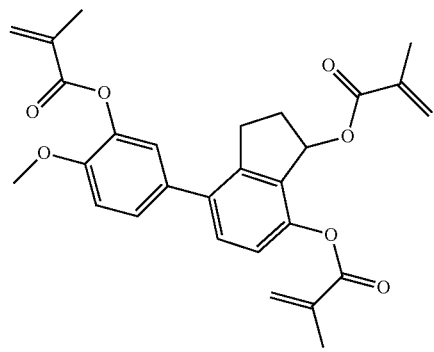
-continued
I-8-2
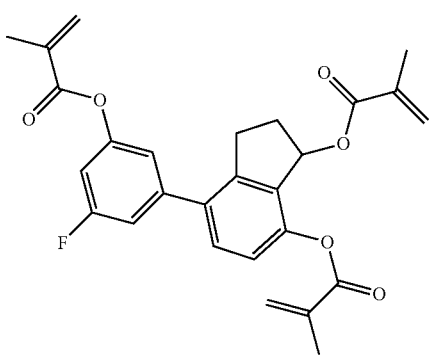
I-8-3
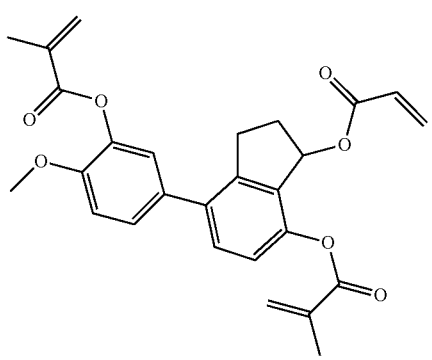
I-8-4
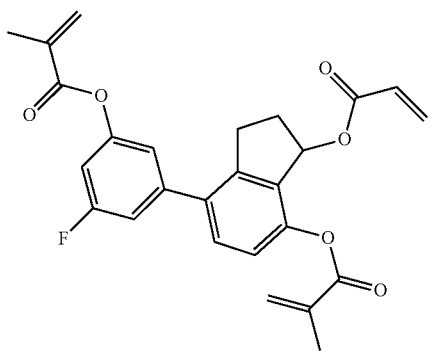
I-9-1
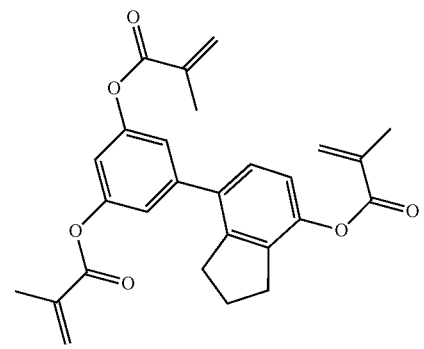

I-9-2
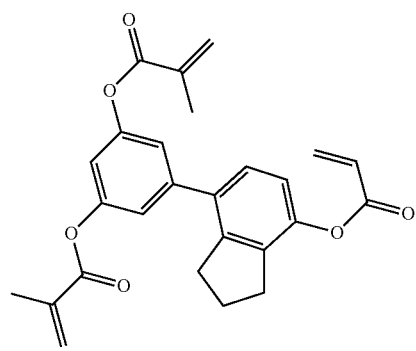
I-10-1
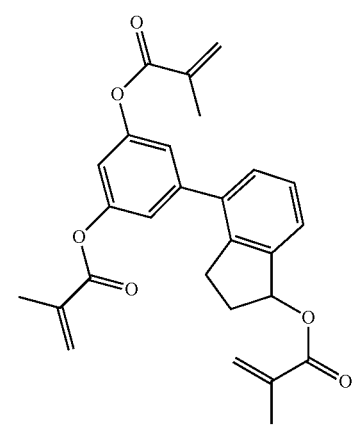
I-10-2
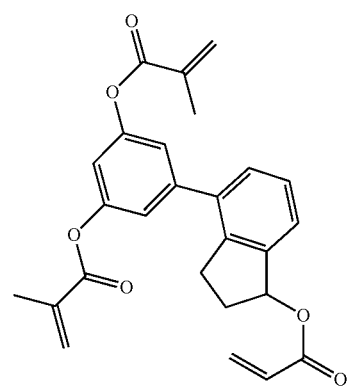
I-11-1
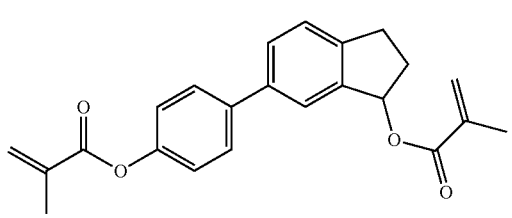
I-11-2
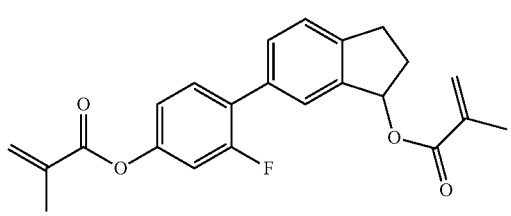
I-11-3
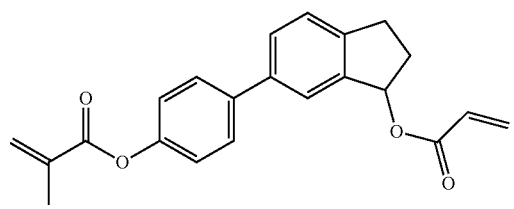
I-12-1
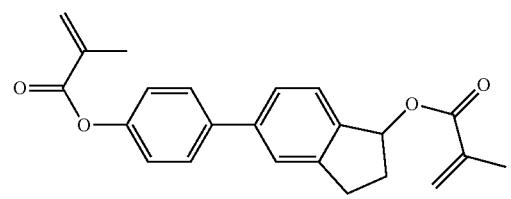
I-12-2
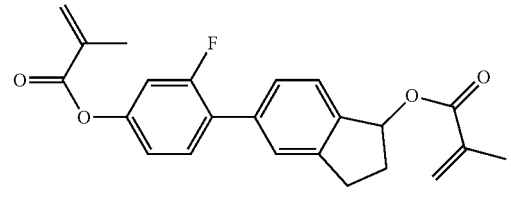
I-12-3
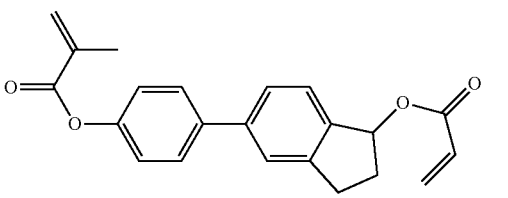
I-12-4
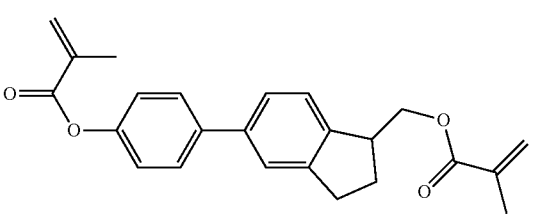
I-12-5
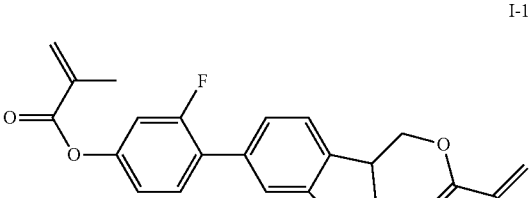
I-12-6
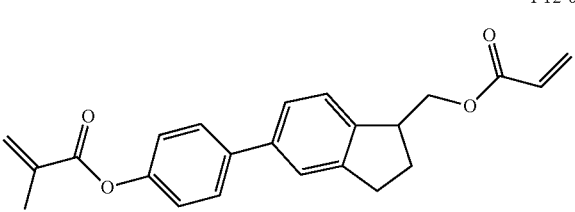

I-14-1
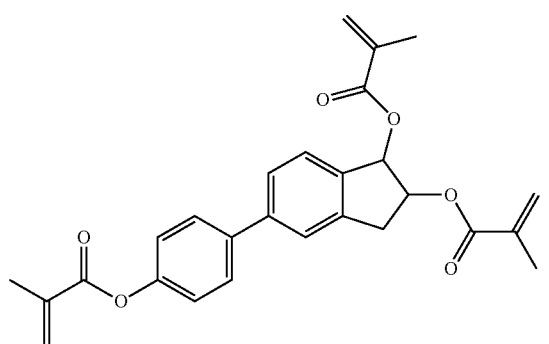
I-15-2
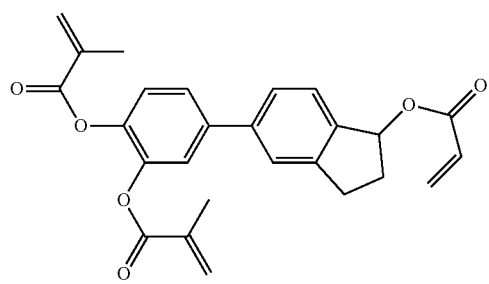
I-14-2
I-15-3
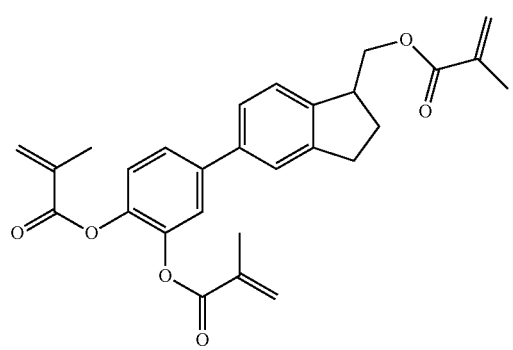
I-14-3
I-15-4
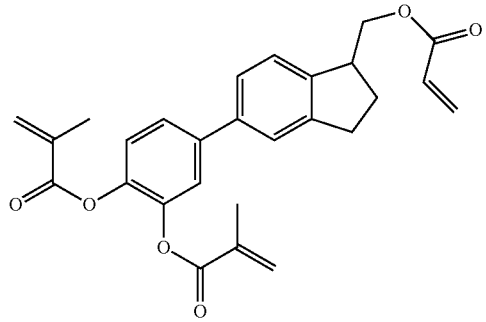
I-16-1
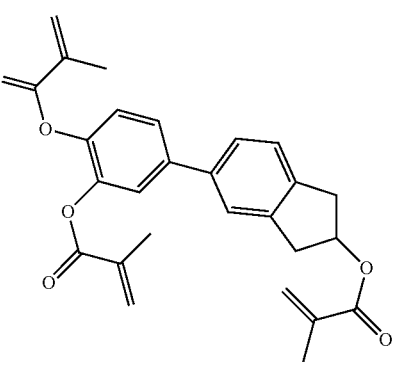
I-15-1
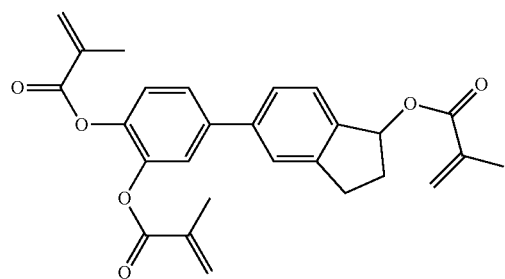
I-16-2
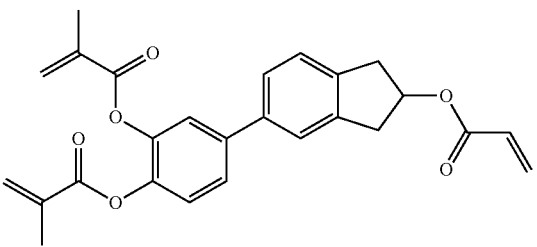

I-16-3
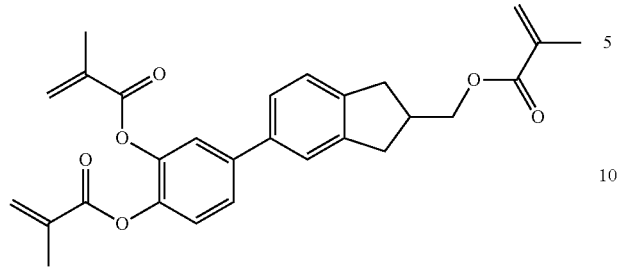
I-16-4
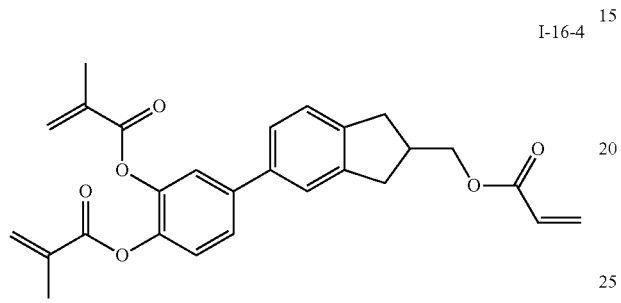
I-17-1
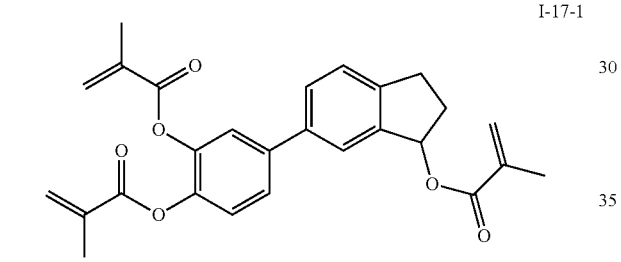
I-17-2
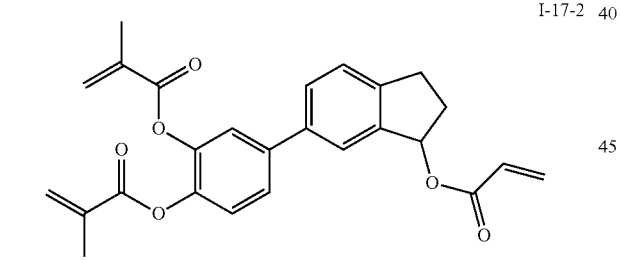
I-17-3
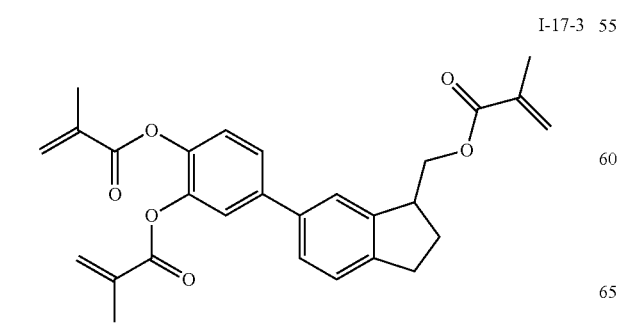
I-17-4
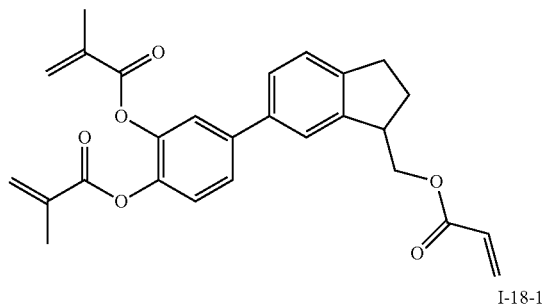
I-18-1
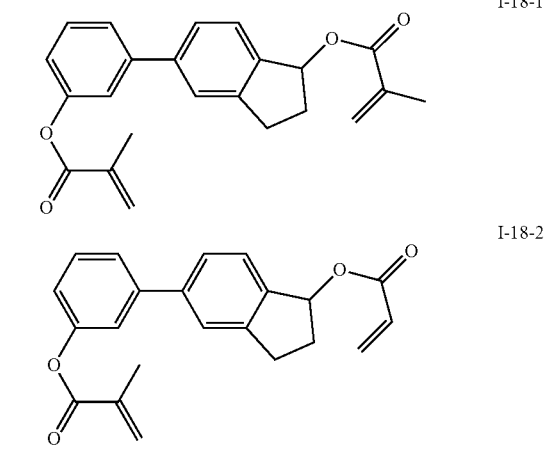
I-18-2
I-18-3
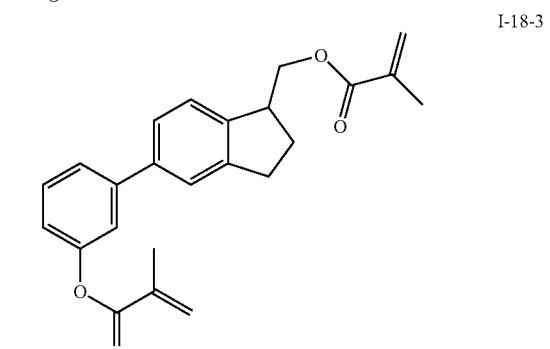
I-18-4
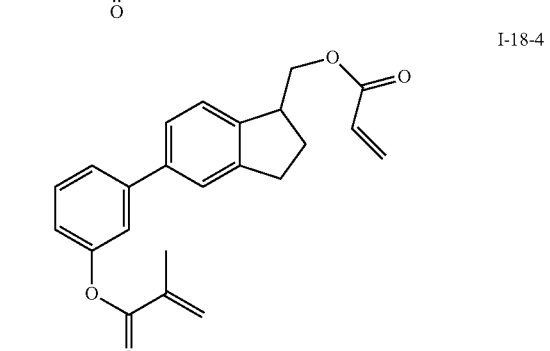
I-18-5
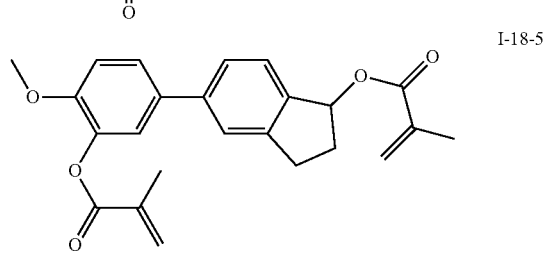

I-18-6
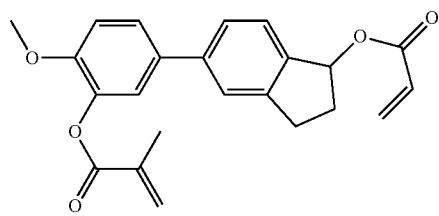
I-18-7
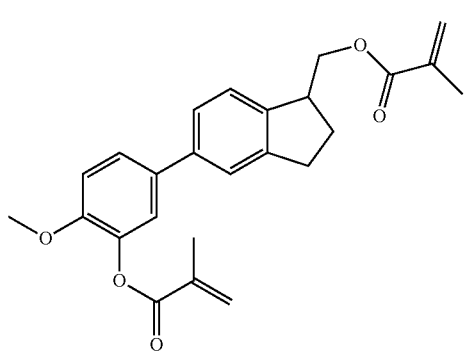
I-18-8
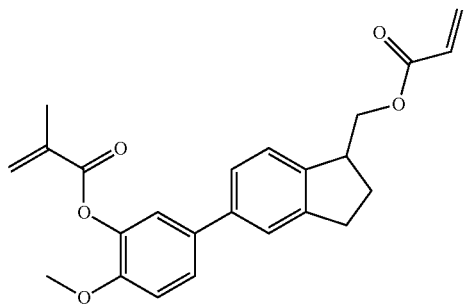
I-19-1
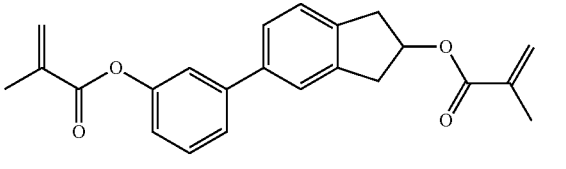
I-19-2
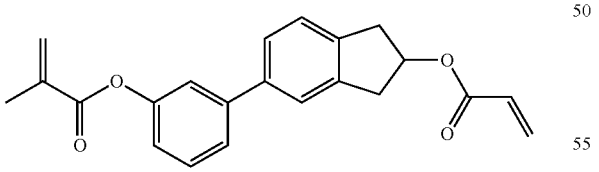
I-19-3
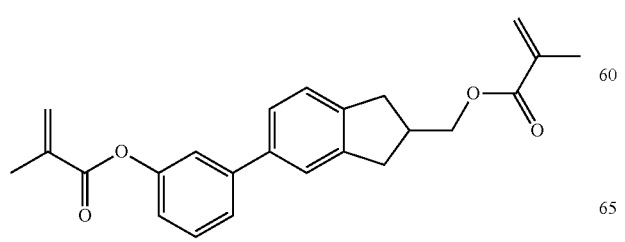
I-19-4
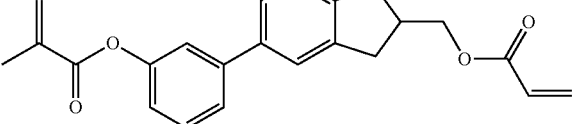
I-19-5
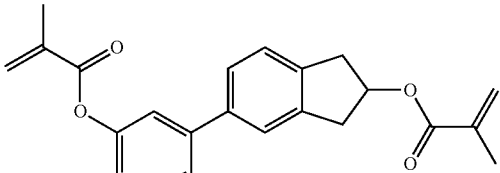
I-19-6
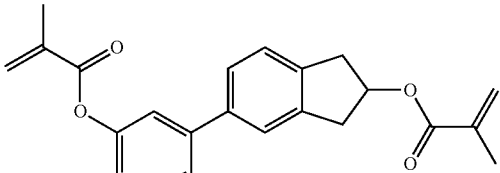
I-19-7
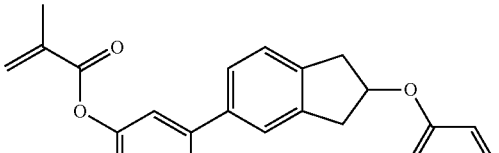
I-19-8
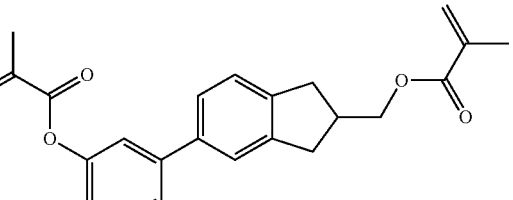
I-20-1
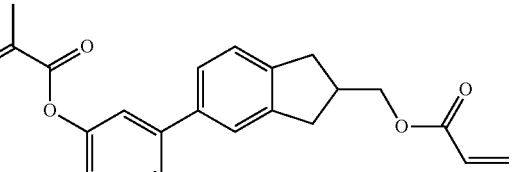

-continued
I-20-2
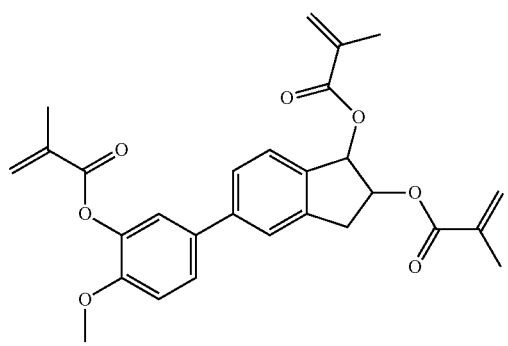
I-20-3
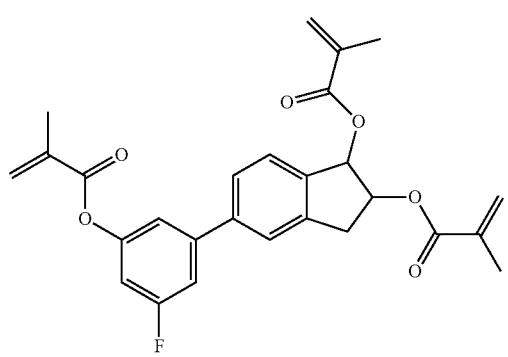
I-21-1
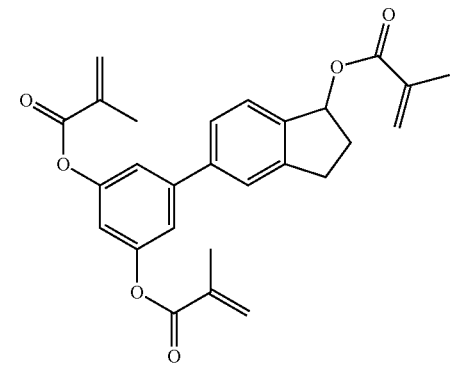
I-21-2
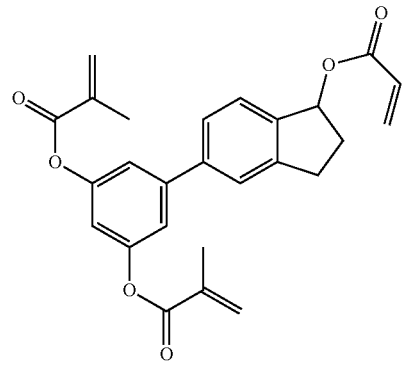
-continued
I-21-3
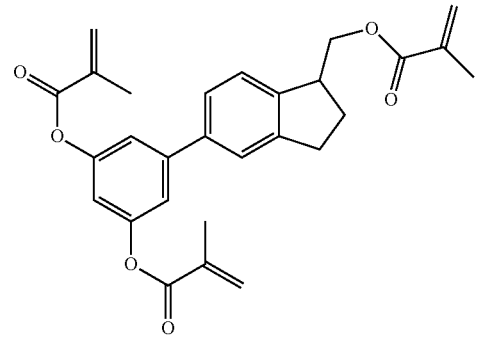
I-21-4
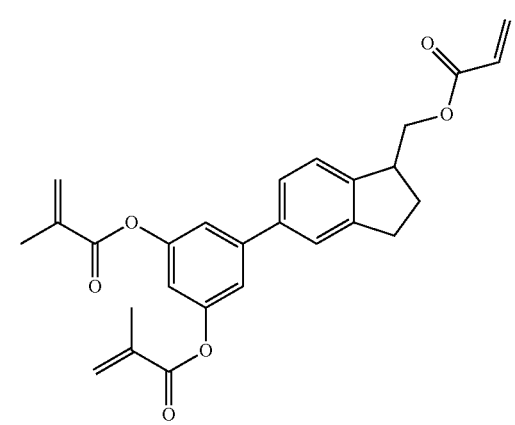
I-22-1
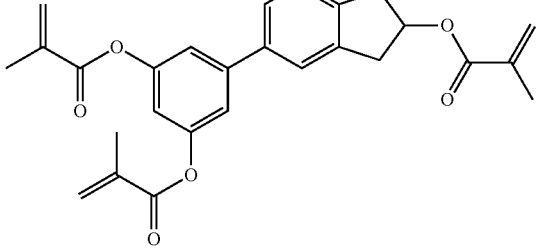
I-22-2
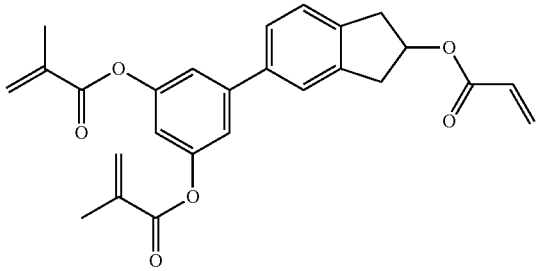

I-22-3

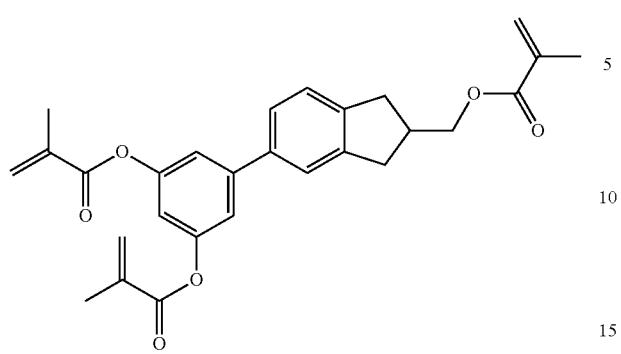

I-22-4

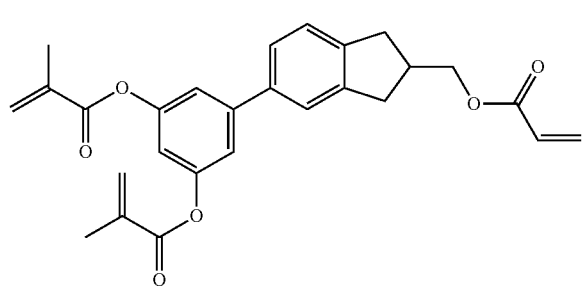

I-23-1

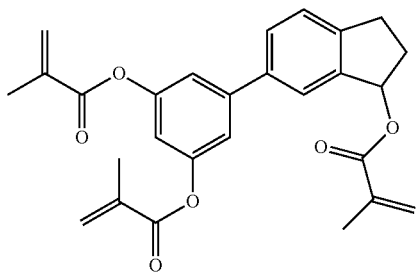

I-23-2

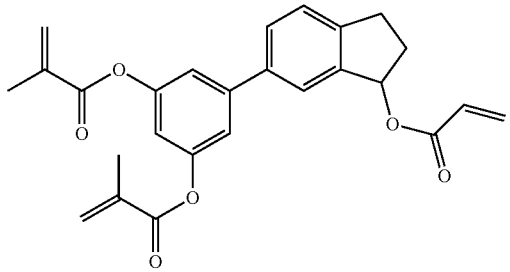

I-23-3

I-23-4

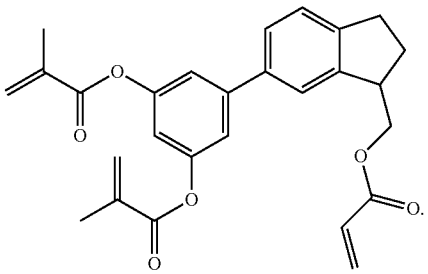

3. A liquid crystal composition, comprising one or more compounds represented by formula I-1 to I-23 of claim 1 as a first component, one or more compounds represented by formula II as a second component, and one or more compounds represented by formula III as a third component:

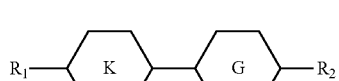

II

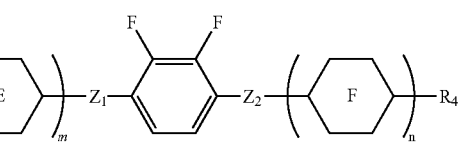

III wherein $R_1$, $R_2$, $R_3$, and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more unconnected $CH_2$ in the groups represented by $R_3$ and $R_4$ may be substituted with cyclopentyl, cyclobutyl or cyclopropyl;

$Z_1$ and $Z_2$ each independently represent a single bond, —$CH_2CH_2$— or —$CH_2O$—;

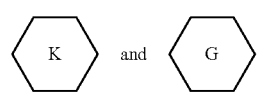

each independently represent

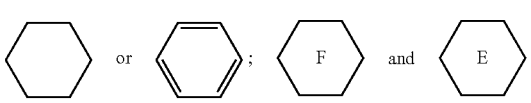

each independently represent one or more of

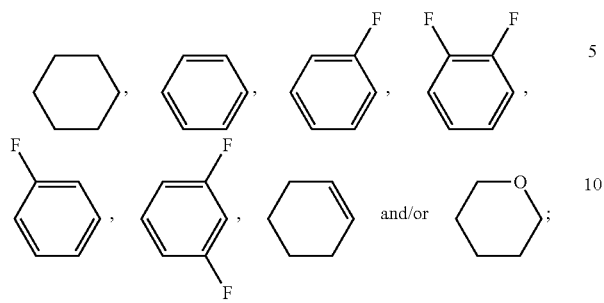

m represents 1 or 2; and
n represents 0, 1 or 2.

4. The liquid crystal composition according to claim 3, wherein in said liquid crystal composition, a total mass content of the compounds represented by formula I-1 to I-23 is 0.01-1%, a total mass content of the compounds represented by formula II is 15-60%, and a total mass content of the compounds represented by formula III is 20-60%.

5. The liquid crystal composition according to claim 3, wherein said one or more compounds represented by formula II are one or more compounds represented by formulas II-1 to II-15; and said one or more compounds represented by formula III are one or more compounds represented by formulas III-1 to III-12:

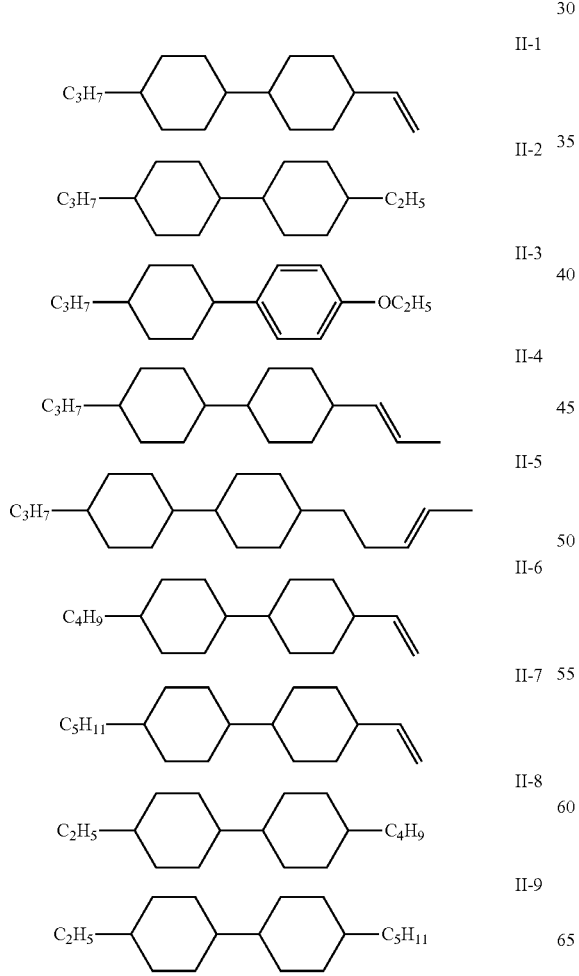

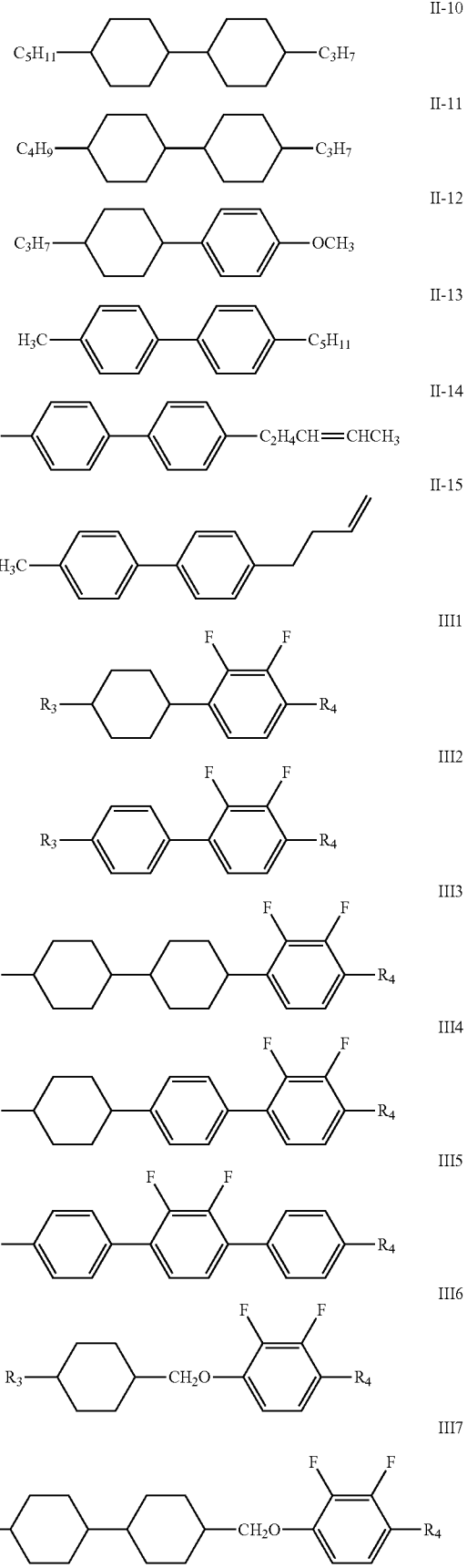

-continued

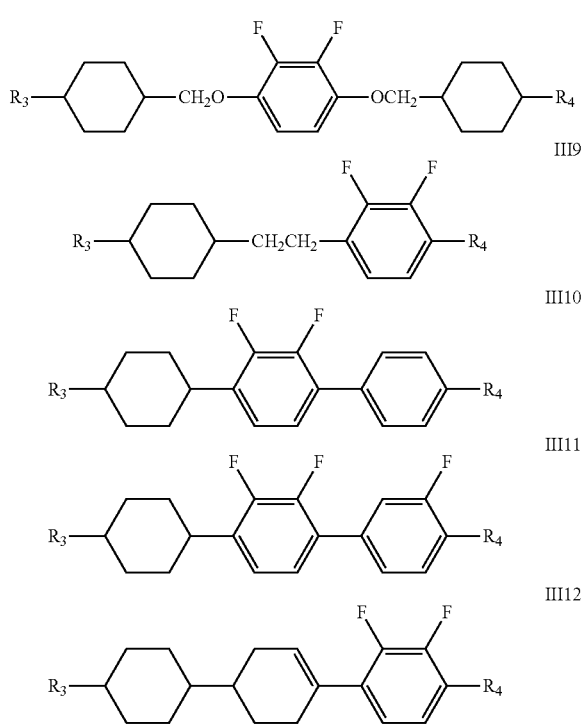

wherein
- $R_3$ and $R_4$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more unconnected $CH_2$ in the groups represented by $R_3$ and $R_4$ may be substituted with cyclopentyl, cyclobutyl or cyclopropyl.

6. The liquid crystal composition according to claim 3, wherein said liquid crystal composition is a negative liquid crystal composition, and further comprises one or more compounds represented by formula IV:

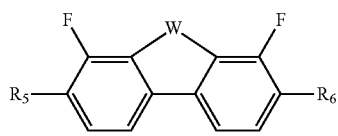

wherein
- $R_5$ and $R_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or a fluorine-substituted alkenoxy group having a carbon atom number of 3-8, and any one or more $CH_2$ in the groups represented by $R_5$ and $R_6$ may be substituted with cyclopentyl, cyclobutyl or cyclopropyl;
- and W represents O, S or —$CH_2$O—.

7. The liquid crystal composition according to claim 3, wherein said liquid crystal composition is a negative liquid crystal composition, and further comprises one or more compounds represented by formula V:

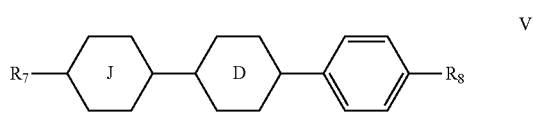

wherein
- $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8;

and

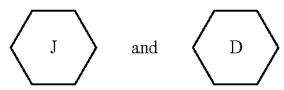

each independently represent 1,4-phenylene, 1,4-cyclohexylene or 1,4-cyclohexenylene.

8. The liquid crystal composition according to claim 3, wherein said liquid crystal composition is a negative liquid crystal composition, and further comprises one or more compounds represented by formula VI,

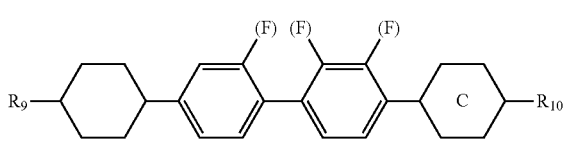

wherein
- $R_9$ and $R_{10}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8;

represents 1,4-phenylene, 1,4-cyclohexylene or 1,4-cyclohexenylene;

and each (F) independently represents H or F.

9. A liquid crystal display element or liquid crystal display comprising the liquid crystal composition of claim 3, wherein said display element or display is an active matrix display element or display or a passive matrix display element or display.

10. The liquid crystal display element or liquid crystal display according to claim 9, wherein said active matrix display element or display is a PSVA-TFT liquid crystal display element or display.

* * * * *